United States Patent [19]

Wells et al.

[11] 3,898,390

[45] Aug. 5, 1975

[54] MULTIPLE ZONE COMMUNICATIONS SYSTEM AND METHOD

[75] Inventors: Joel D. Wells, Orlando; George F. McClure, Winter Park; Lionel D. Freeman, Orlando; John R. Endicott, Maitland; Marion L. Cunningham, Orlando, all of Fla.

[73] Assignee: Martin Marietta Corporation, Rockville, Md.

[22] Filed: May 15, 1973

[21] Appl. No.: 360,560

[52] U.S. Cl. .................... 179/41 A; 325/15; 325/55

[51] Int. Cl. ............................................ H04q 7/00

[58] Field of Search ........ 179/41 A; 325/15, 53, 55, 325/64

[56] References Cited

UNITED STATES PATENTS

| | | | |
|---|---|---|---|
| 2,694,141 | 11/1954 | Mitchell | 179/41 A |
| 3,539,924 | 11/1970 | Daskalakis et al. | 325/53 |
| 3,588,371 | 6/1971 | Monte et al. | 179/41 A |
| 3,590,166 | 6/1971 | Anschutz et al. | 179/41 A |
| 3,663,762 | 5/1972 | Joel et al. | 179/41 A |
| 3,764,915 | 10/1973 | Cox et al. | 179/41 A |

*Primary Examiner*—Kathleen H. Claffy
*Assistant Examiner*—Gerald L. Brigance
*Attorney, Agent, or Firm*—Burns, Doane, Swecker Mathis

[57] ABSTRACT

A method and system for more efficiently utilizing presently available and prospectively available two-way communication channels for communication between mobile telephones and either fixed telephones or mobile telephones. A large mobile telephone service area is divided into a plurality of smaller zones, and channels are assigned to the zones in a manner which permits the reuse of channels in zones on a non-interfering basis. A control signal is broadcast over a designated one of the channels assigned to each zone by equipment at a fixed station in each zone under the control of a central control unit. Each mobile telephone monitors one of the designated control channels in accordance with the signal reception characteristics thereof. When a call is placed over the designated control channel, a service or talking channel is assigned to serve the call and the mobile unit is remotely tuned to the assigned talking channel. Provision is made for using the designated control channel as a talking channel if necessary, for assigning additional channels to a fixed station on the basis of user density, and for maintaining communications between two parties as a mobile unit moves from one zone to another. A novel mobile telephone unit operable in accordance with the techniques of the present invention and providing simplified call placement and control is also disclosed.

41 Claims, 49 Drawing Figures

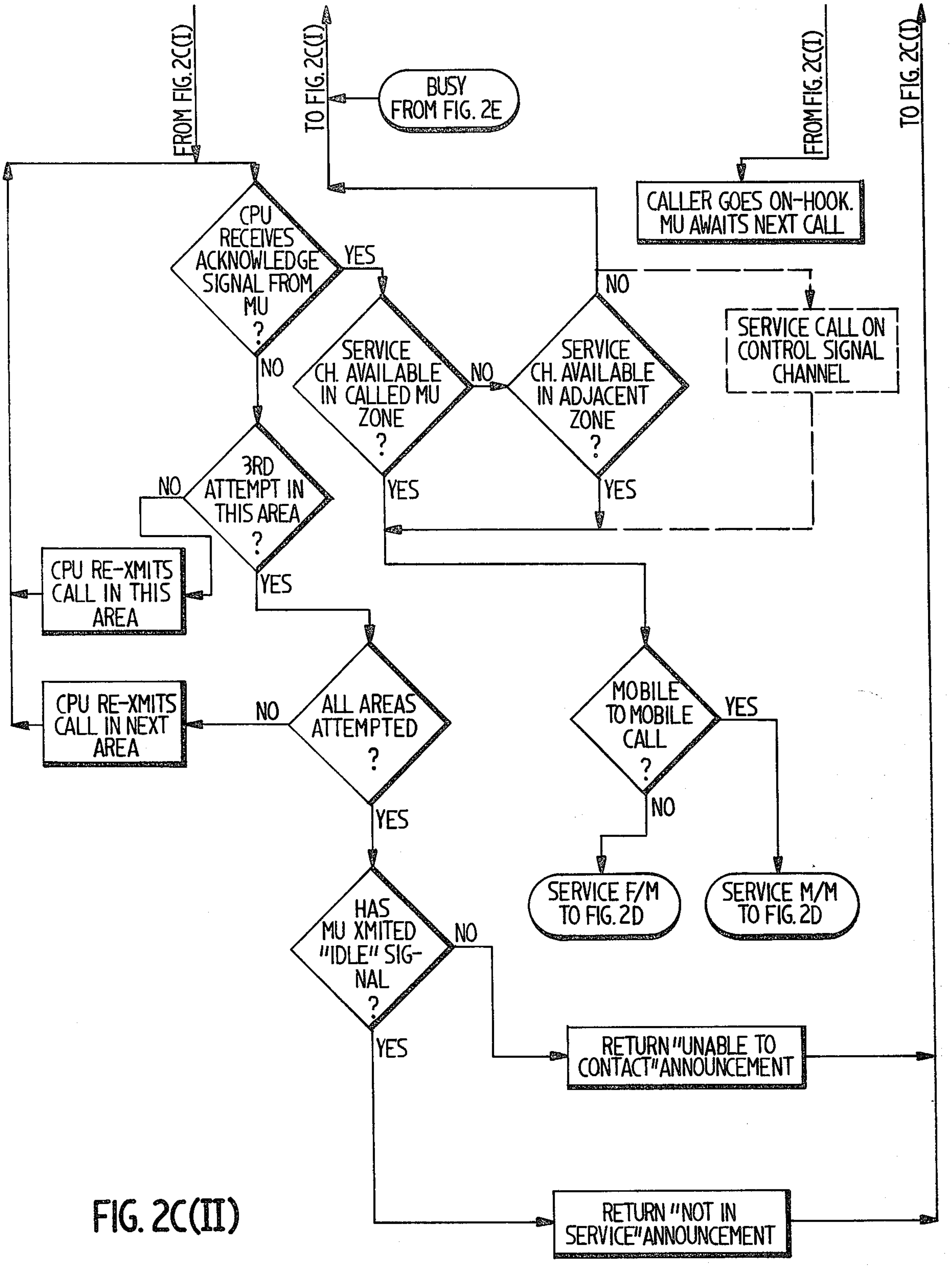
FIG. 2C(II)

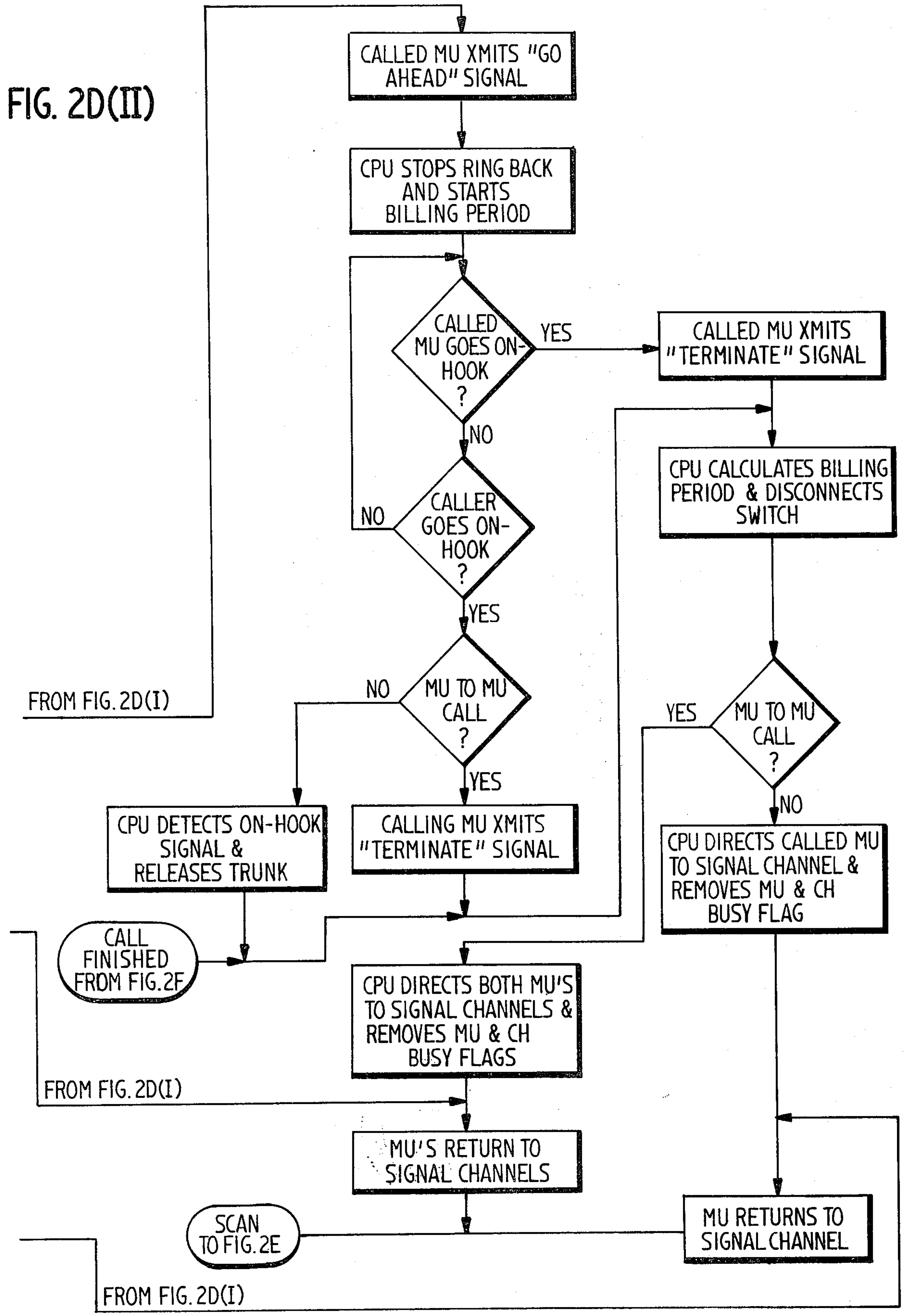
FIG. 2D(II)

FIG. 2E(II)
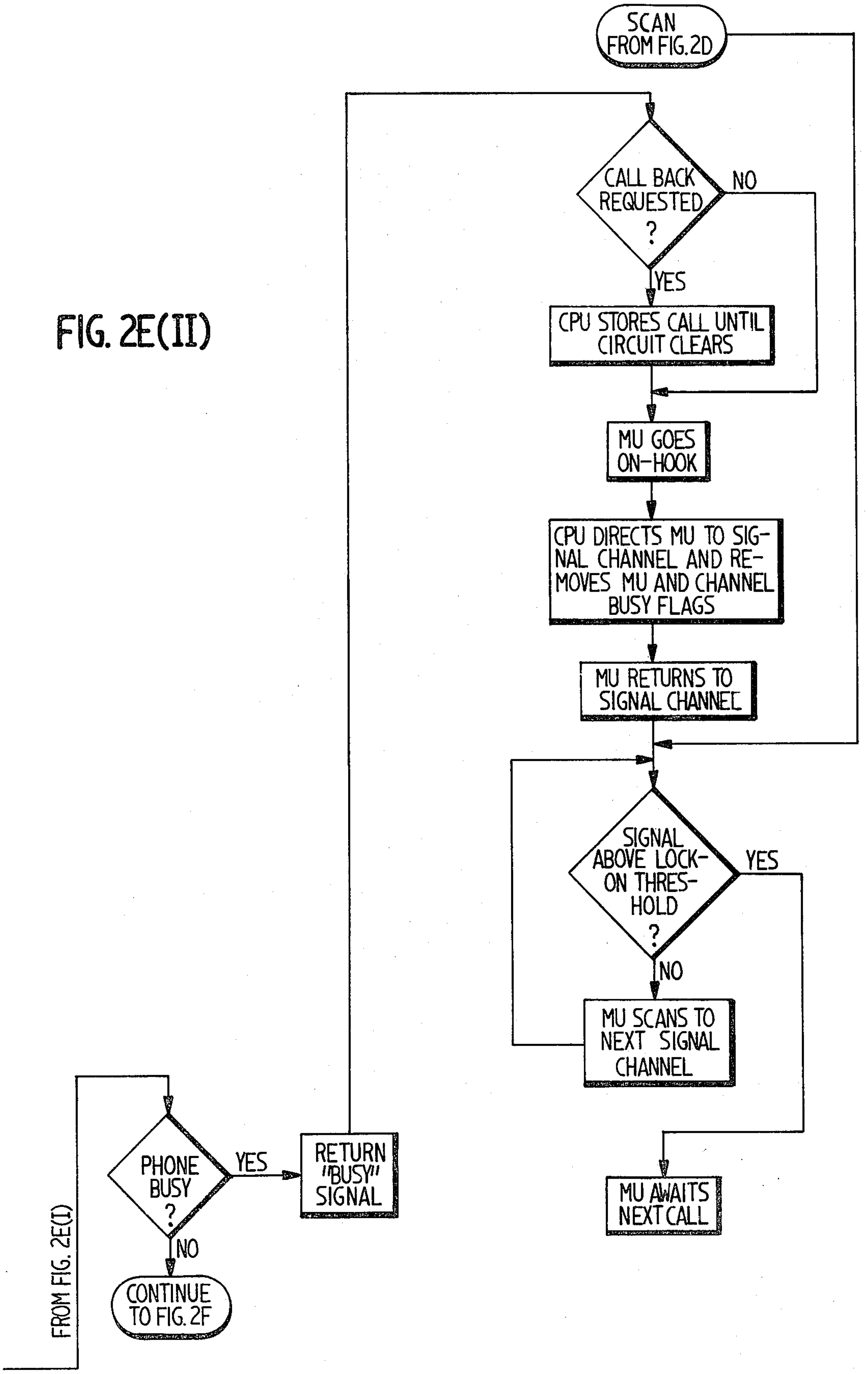

CENTRAL CONTROL TERMINAL

FIG. 10A(II)
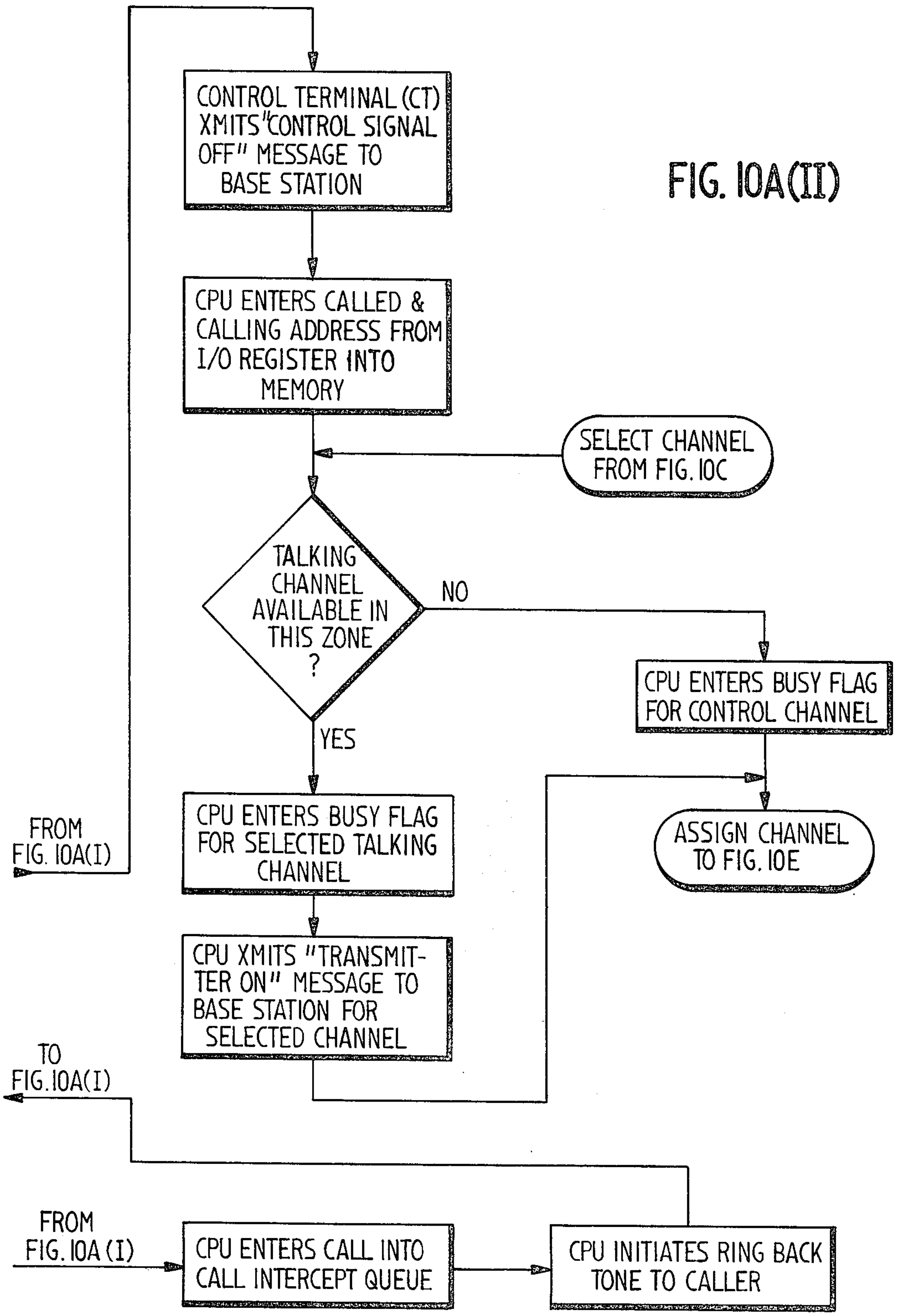

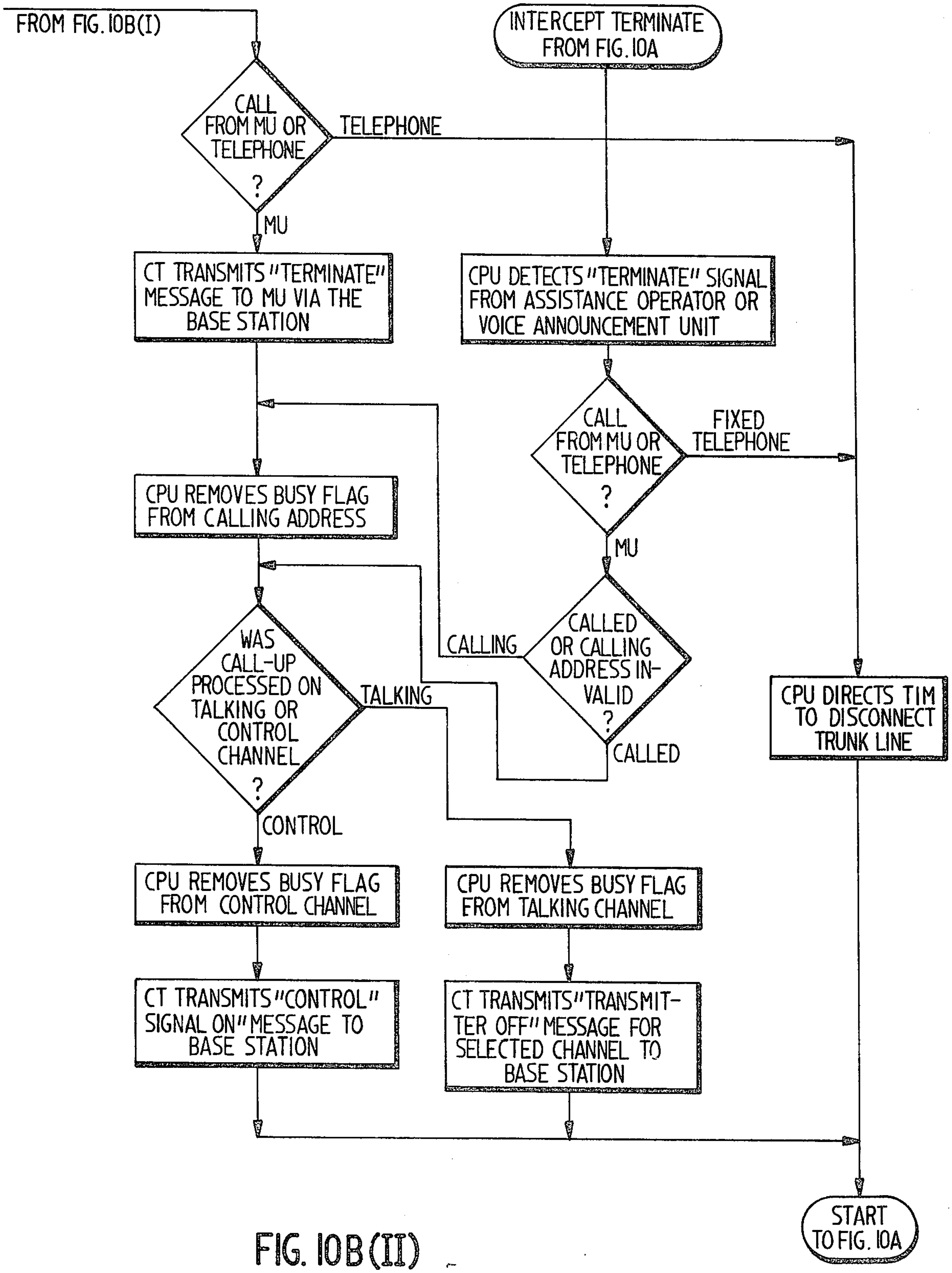
FIG. 10B (II)

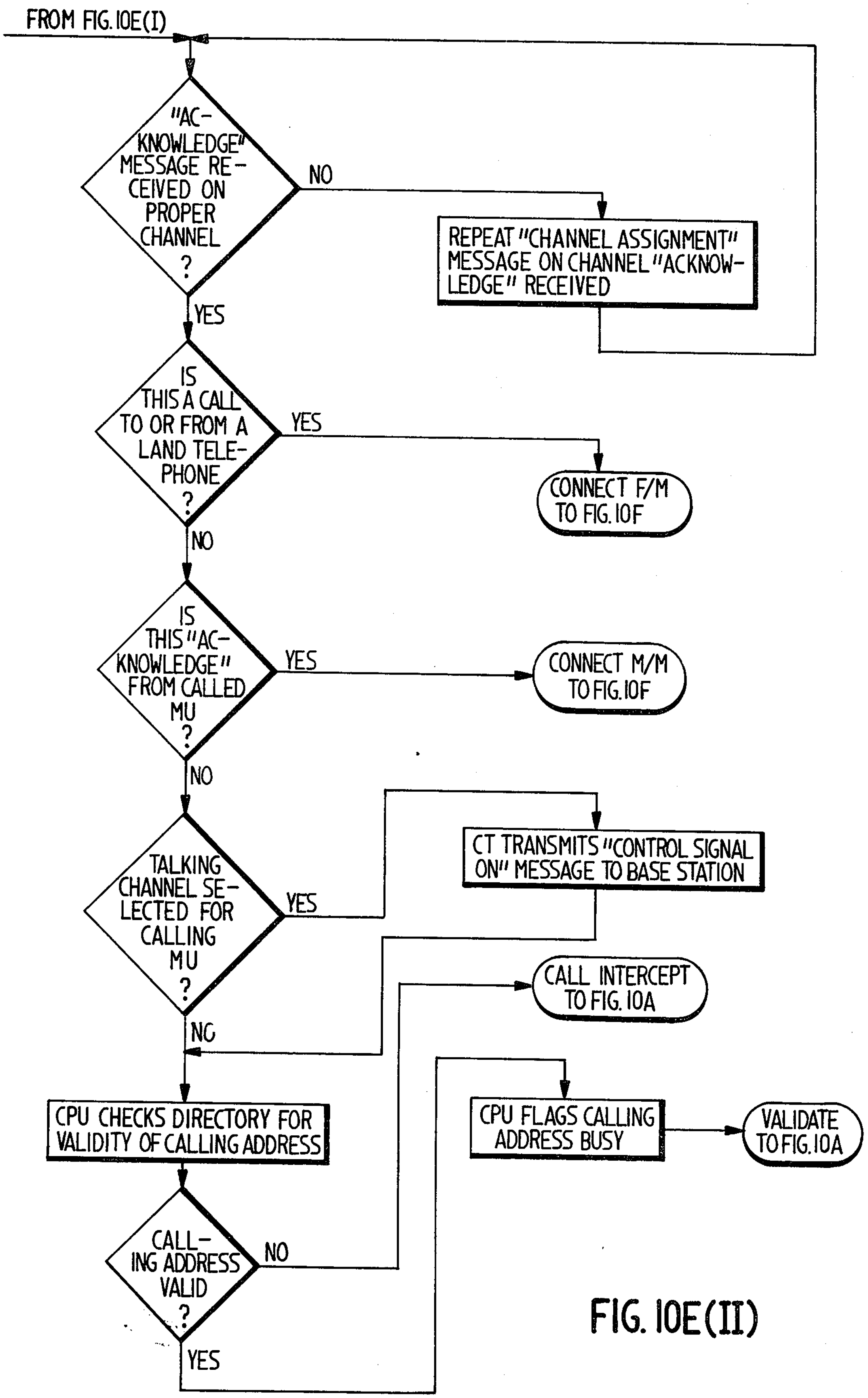
FIG. 10E(II)

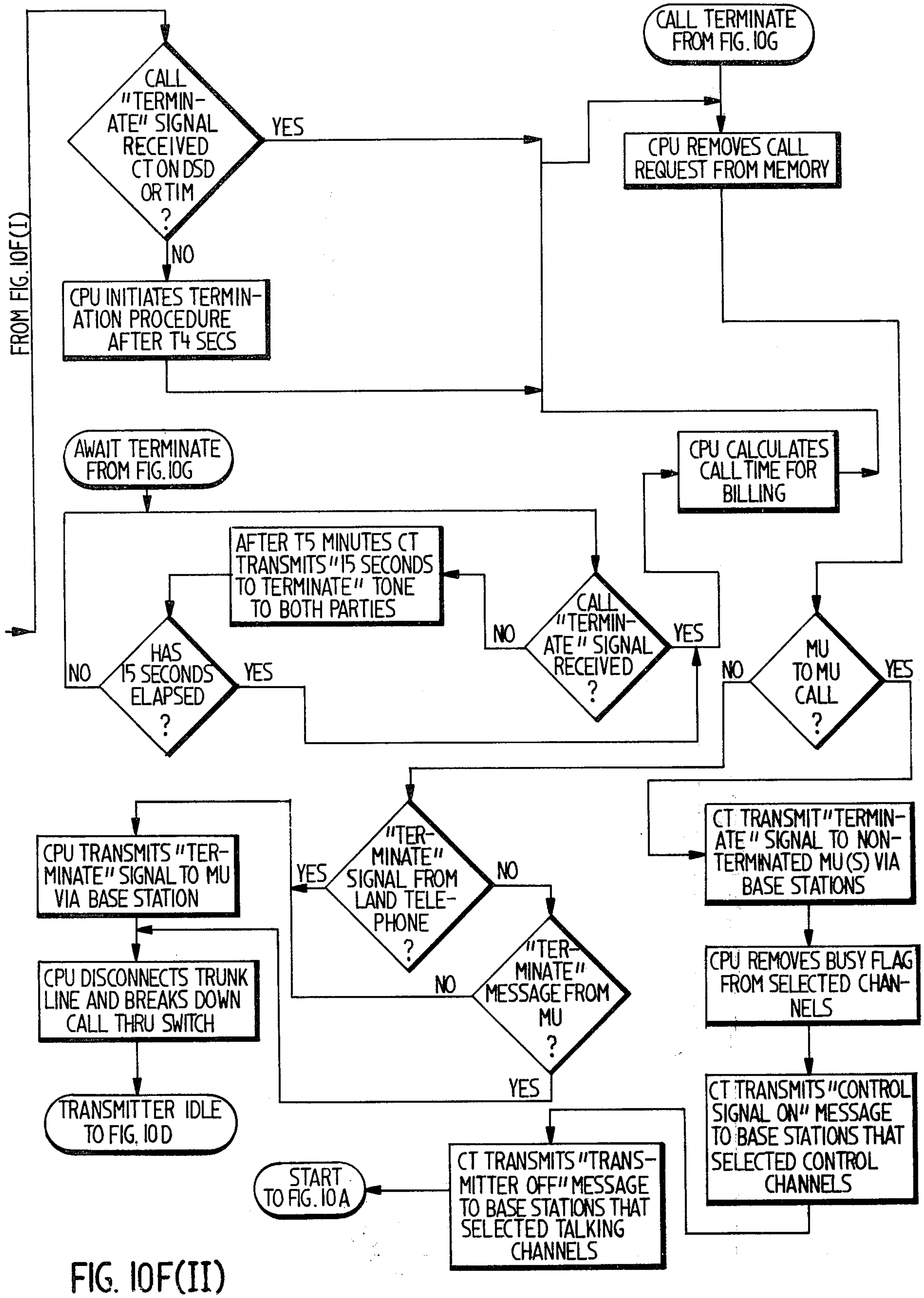
FIG. 10F(II)

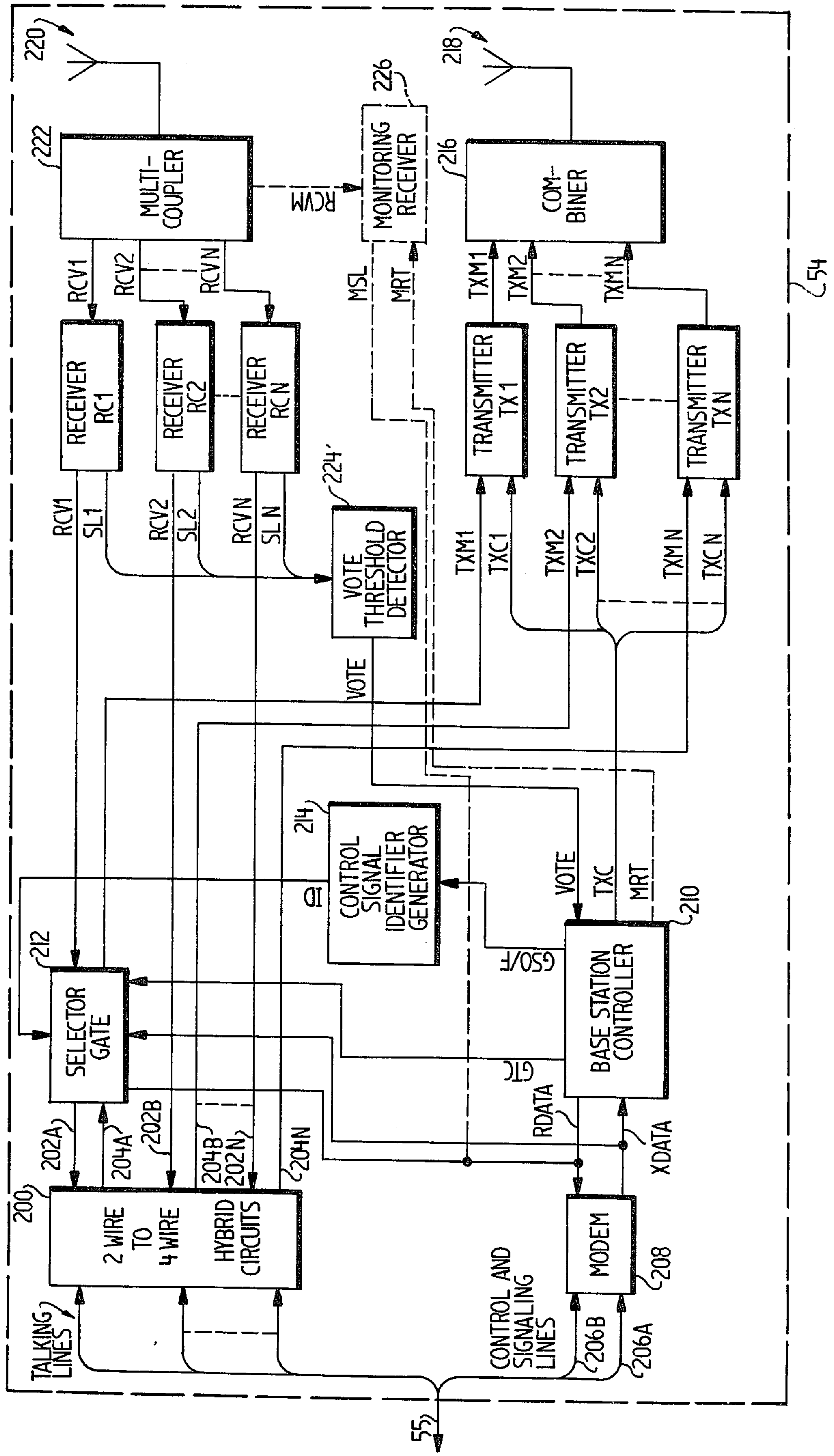
FIG.11 BASE STATION

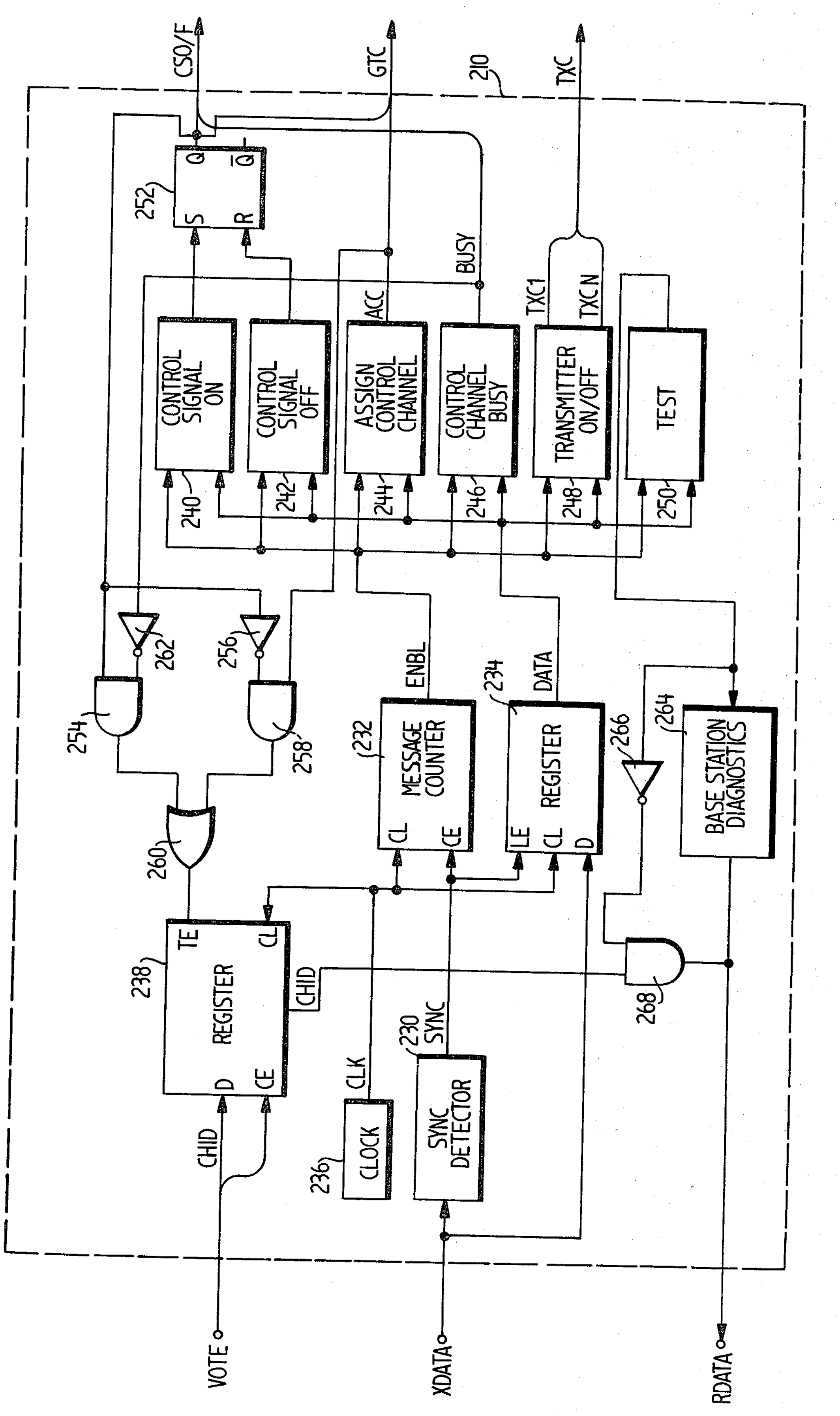
FIG. 12 BASE STATION CONTROLLER

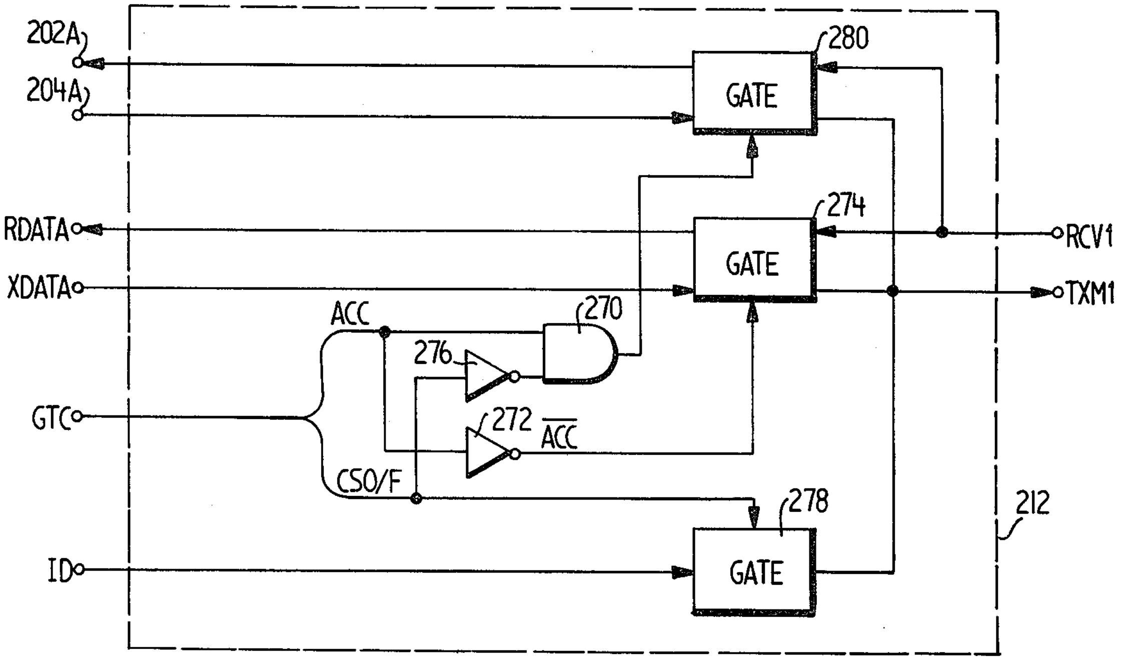
FIG. 13 SELECTOR GATE
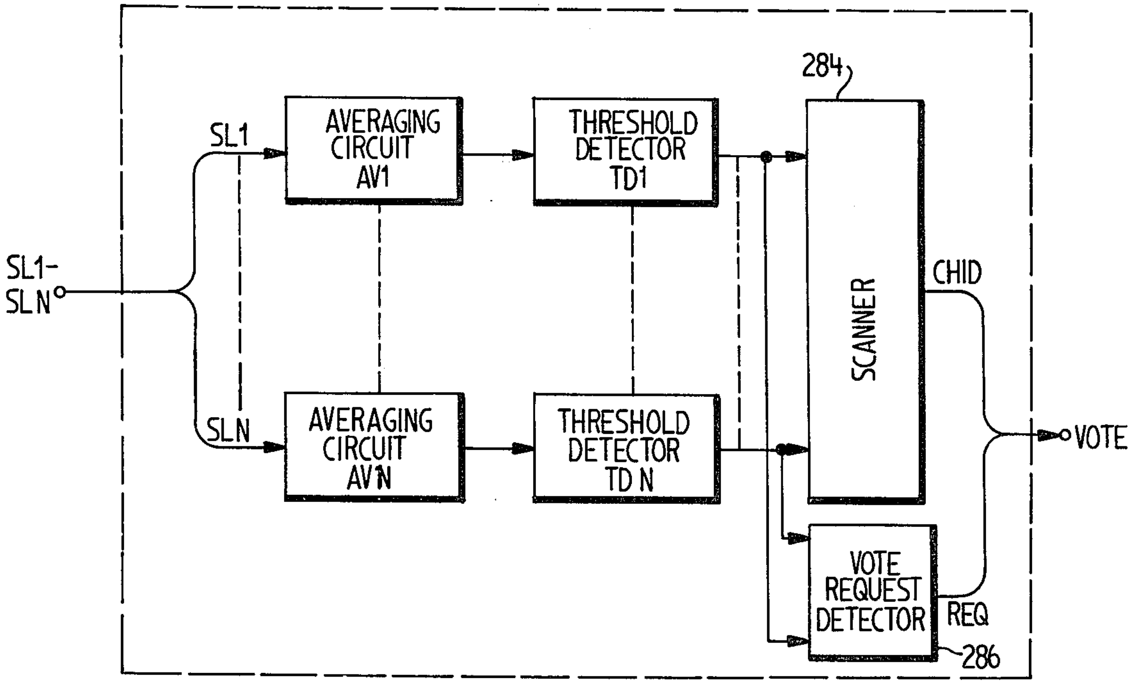
FIG. 14 VOTE THRESHOLD DETECTOR

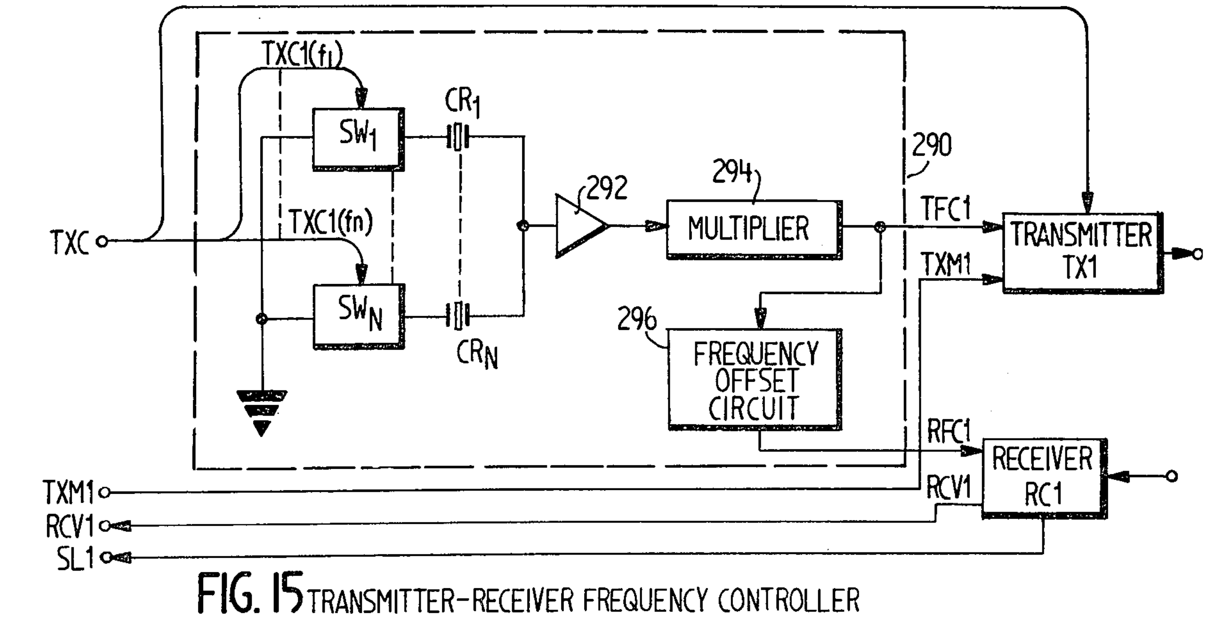
FIG. 15 TRANSMITTER-RECEIVER FREQUENCY CONTROLLER
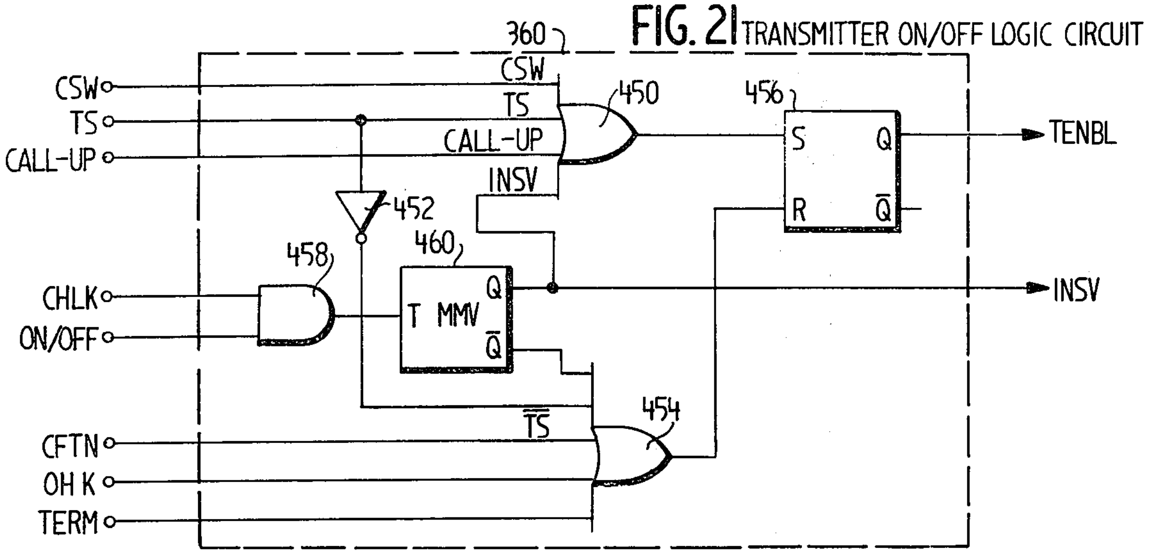
FIG. 21 TRANSMITTER ON/OFF LOGIC CIRCUIT
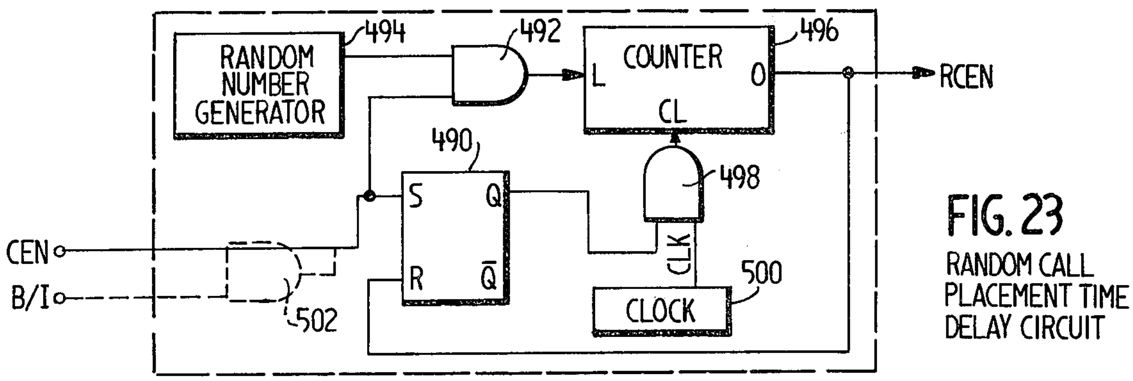
FIG. 23 RANDOM CALL PLACEMENT TIME DELAY CIRCUIT

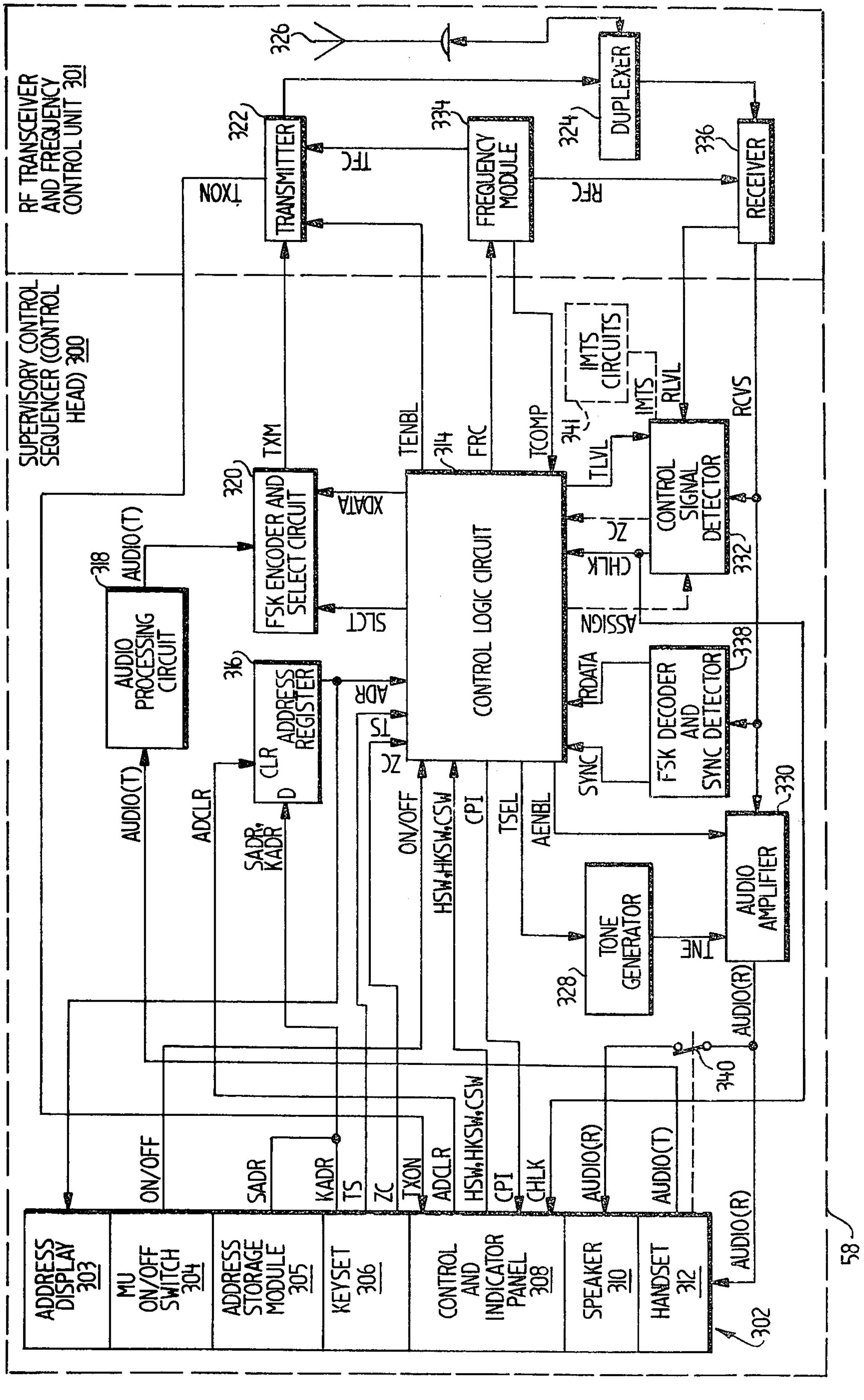
FIG. 16 MOBILE UNIT

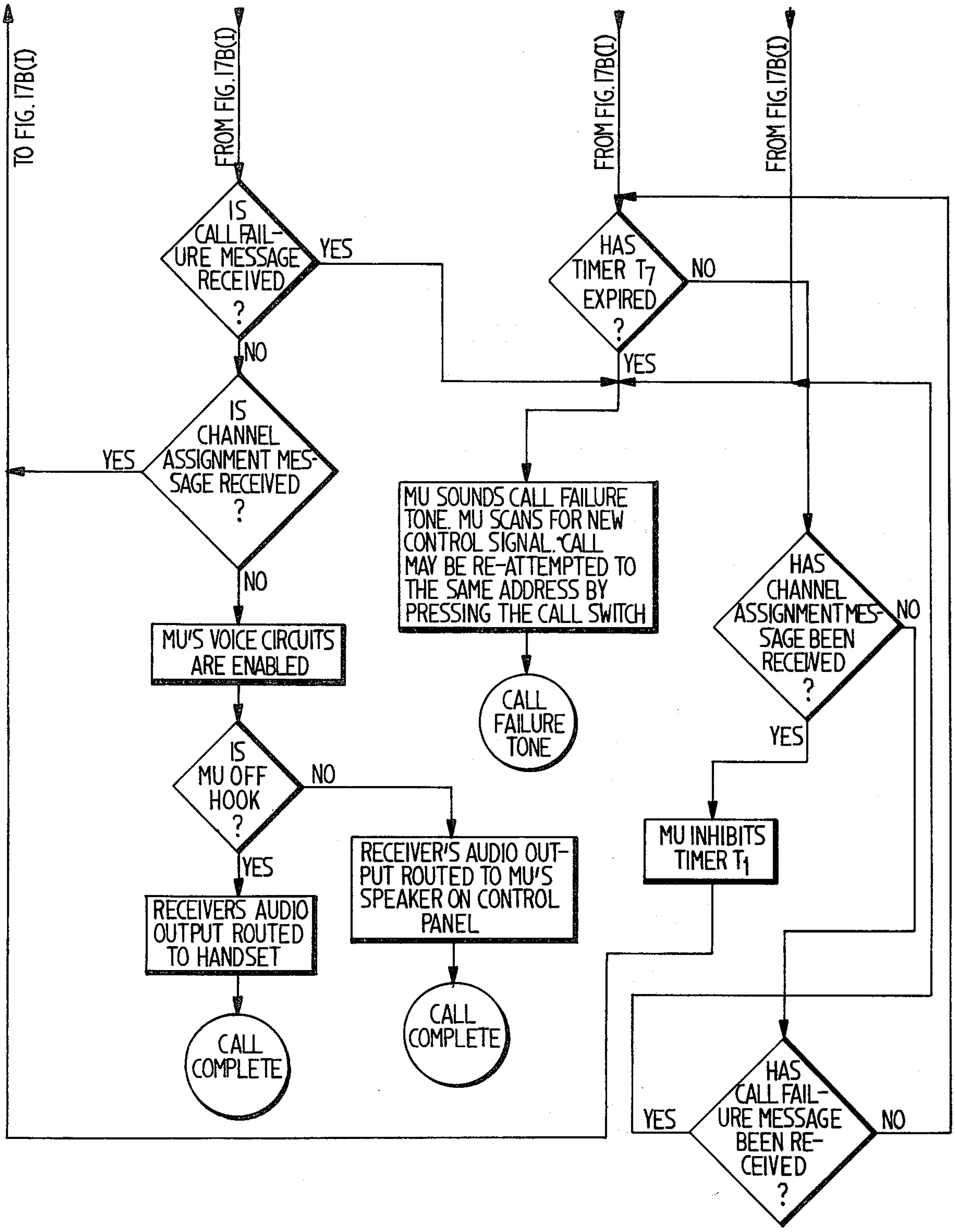
FIG. 17B(II)

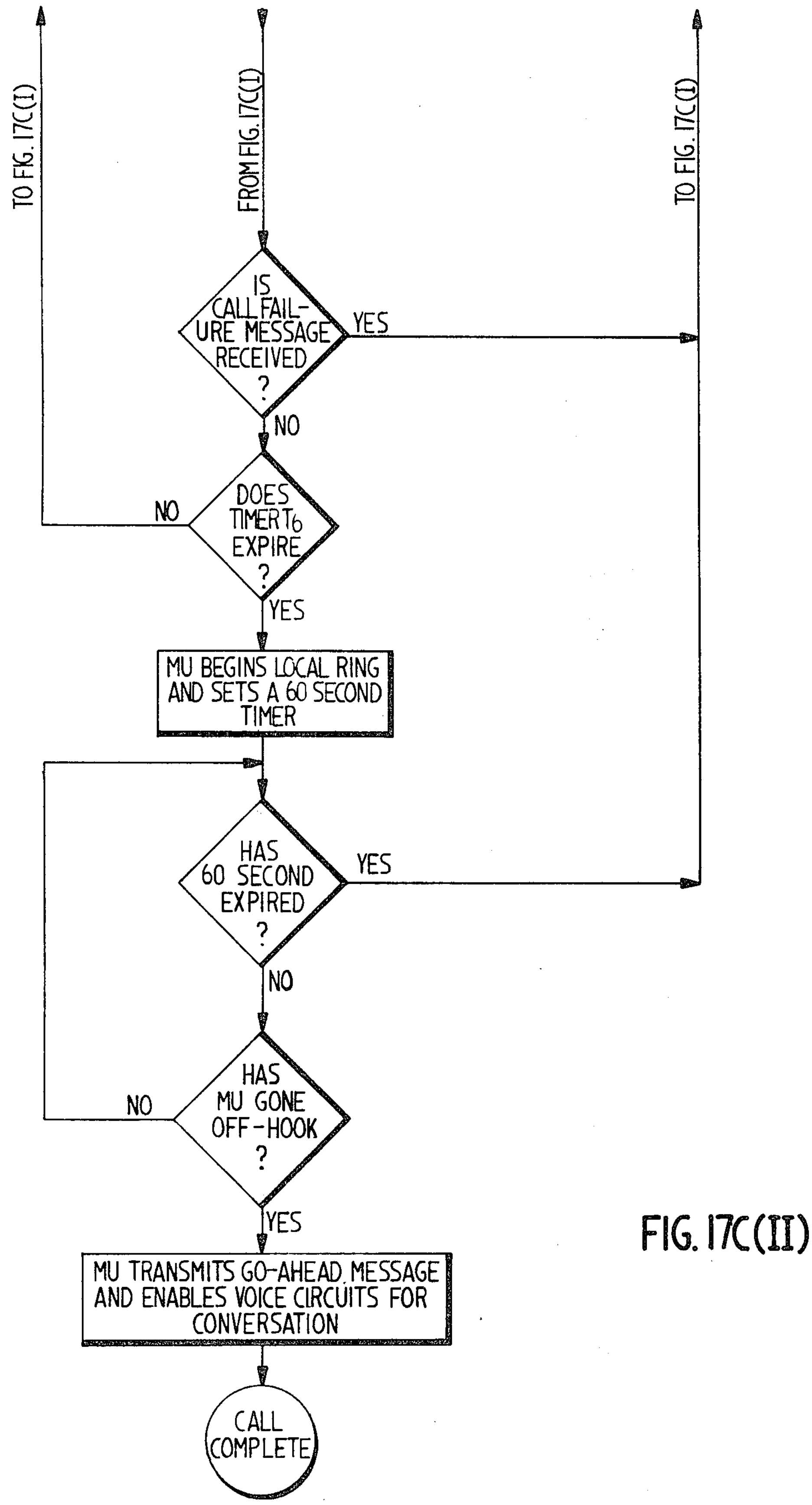
FIG. 17C(II)

FIG. 18 MOBILE UNIT INPUT/OUTPUT PANEL
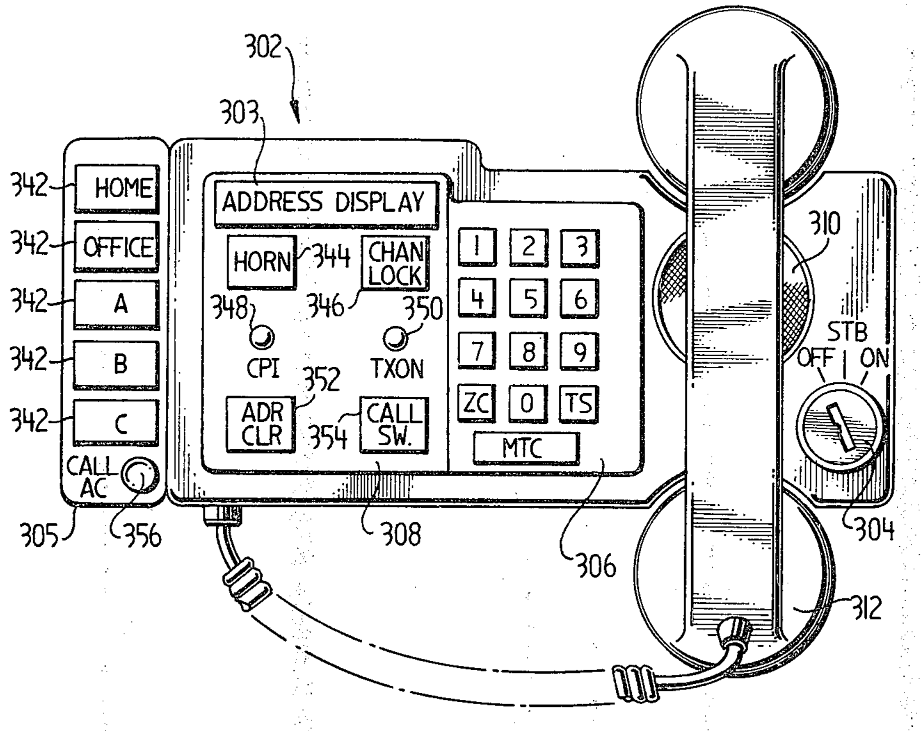
FIG. 22 CALL PLACEMENT LOGIC CIRCUIT
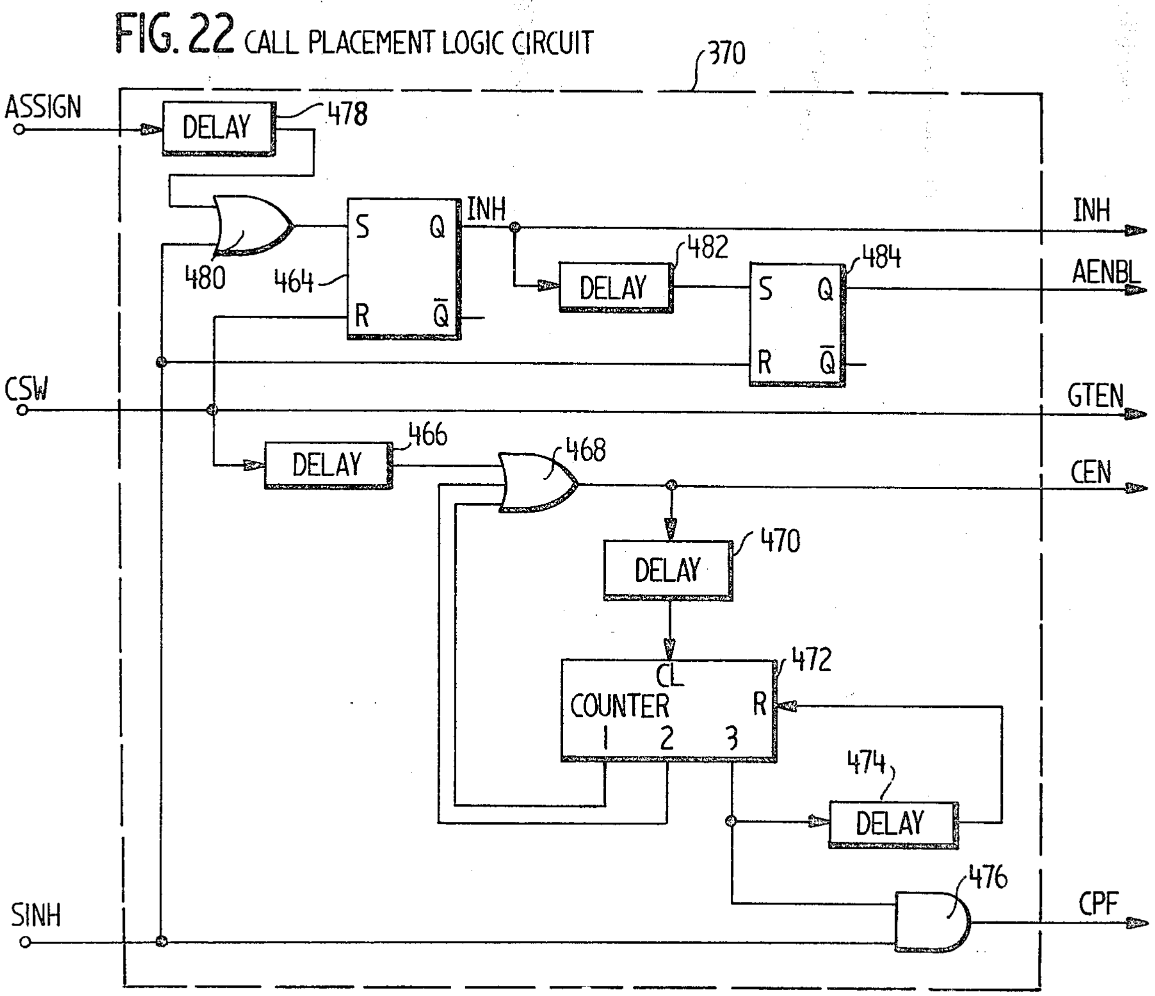

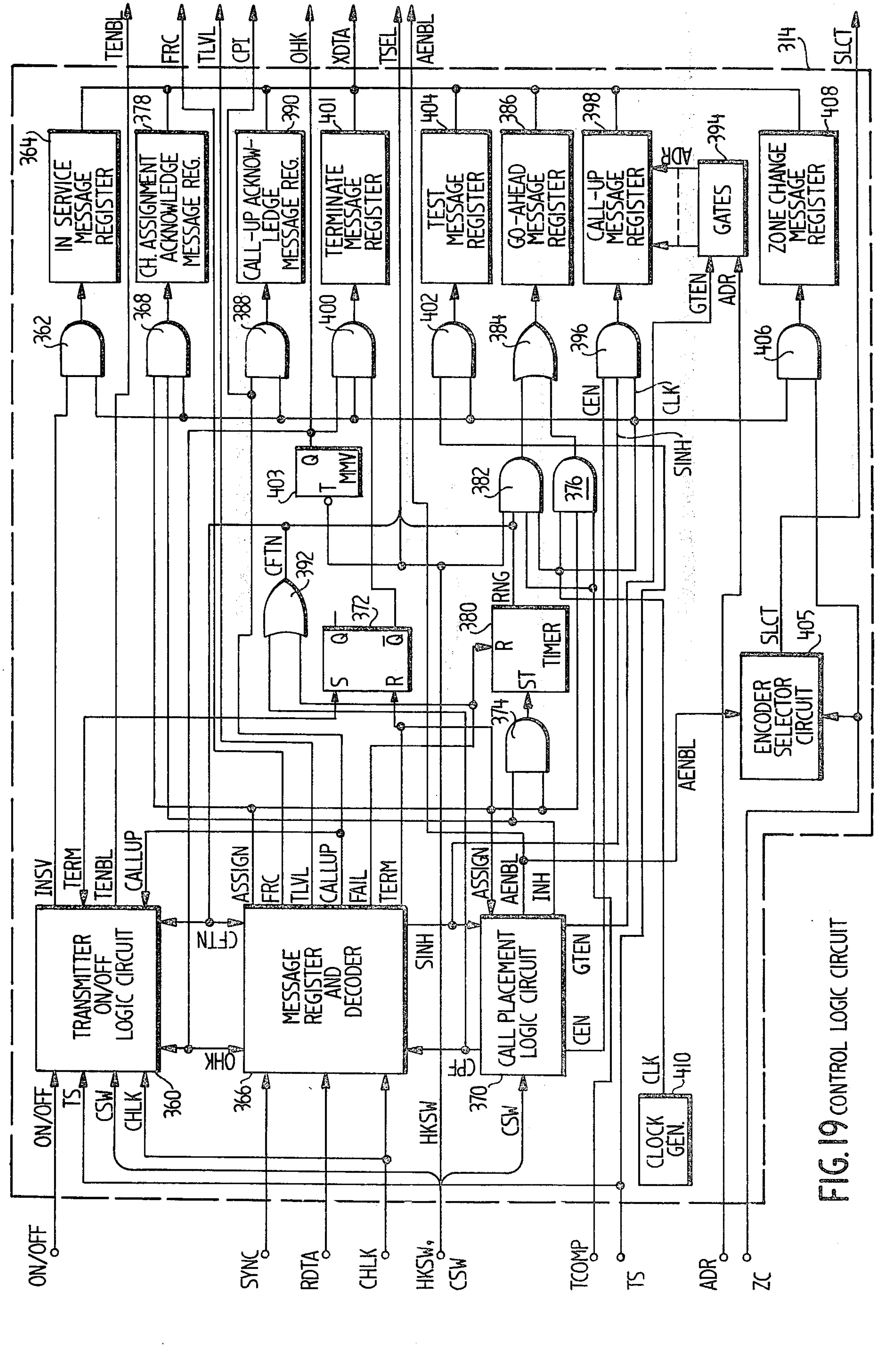
FIG. 19 CONTROL LOGIC CIRCUIT

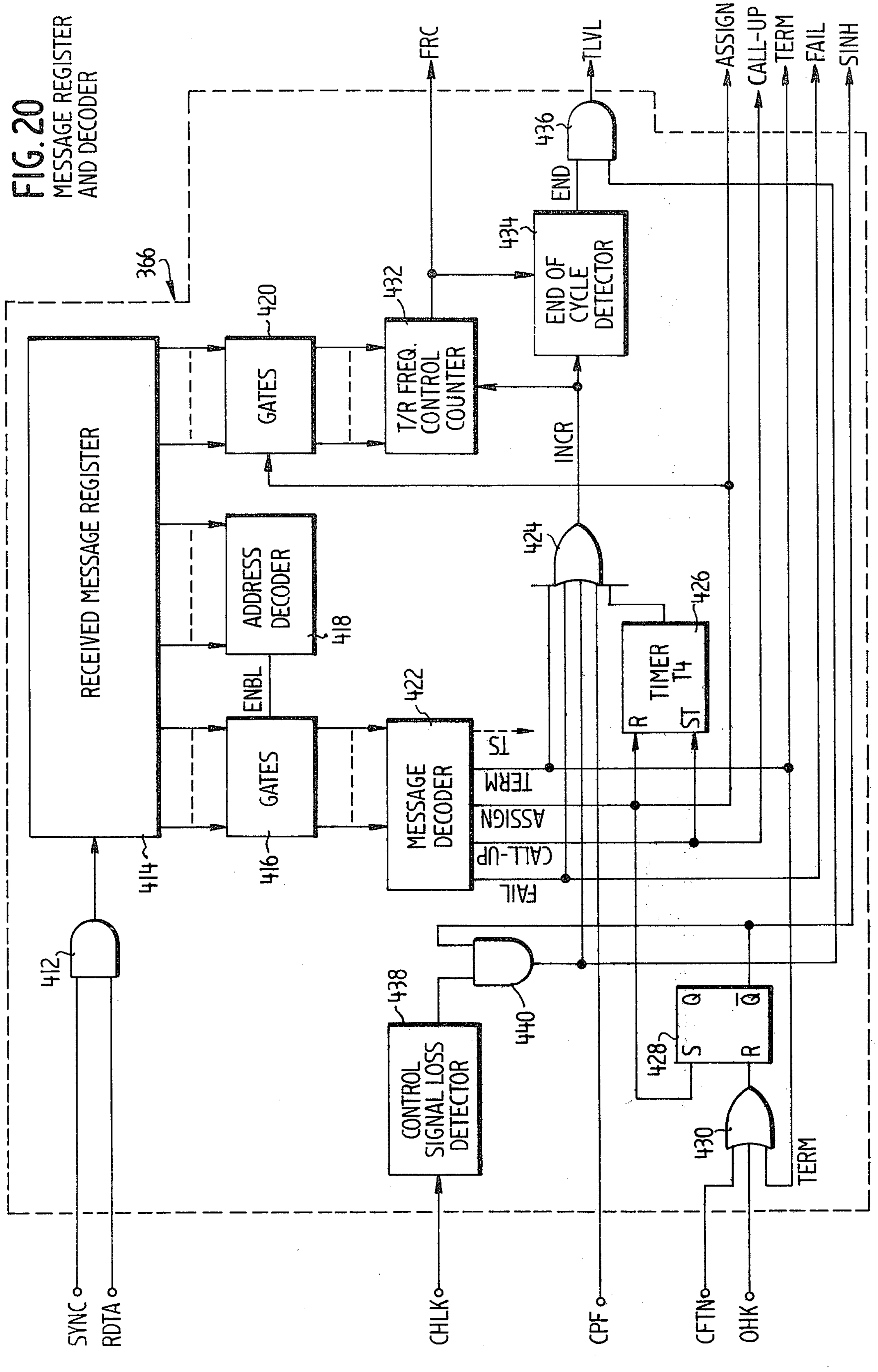
FIG. 20 MESSAGE REGISTER AND DECODER

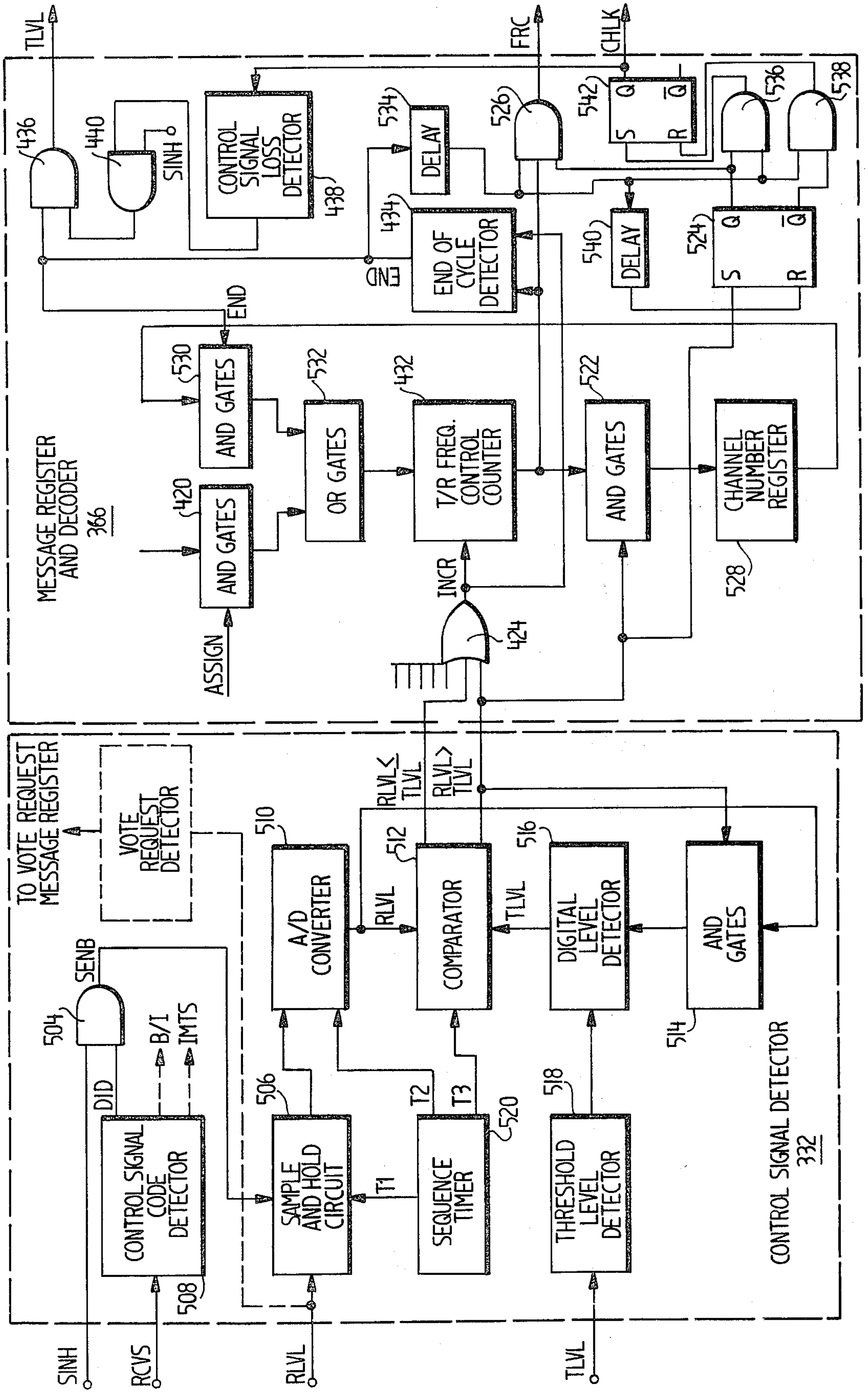
FIG. 24 CONTROL SIGNAL SELECTOR

RF TRANSCEIVER AND FREQUENCY CONTROL UNIT

MULTIPLE ZONE COMMUNICATIONS SYSTEM AND METHOD

BACKGROUND OF THE INVENTION

The present invention relates to mobile radio communications systems and, in particular, to a method and system for increasing the effective use of communication channels in a small zone communication system.

Aproximately twelve communication channels, each including two distinct frequencies for two-way communications (an up-link and a down-link), are typically available for use in present day mobile telephone systems. In one known system, usually referred to as improved Mobile Telephone Service (IMTS), communication is established over the available channels from a wire line telephone system to mobile units through the use of transmitters which transmit omnidirectionally throughout a large geographical area or zone from an antenna approximately centered in the area. A plurality of satellite receivers are spaced throughout the geographical area to receive transmissions from the mobile units and relay the transmissions to the central location. Calls are established through seizure of a marked idle channel by a mobile unit and by placing or receiving a call over the seized marked idle channel.

With only twelve channels available for use in this type of system, only twelve simultaneous conversations are possible and, not only is the total number of subscribers in a service area necessarily limited, but also the subscribers who do not obtain service tend to find circuits busy a very high percentage of the time when attempting to place a call. It can thus be seen that 12-channel systems based upon large zone coverage from a central location have been unable to meet present user demands, let alone future requirements for mobile radiotelephone service.

It has been proposed that a large number of channels in about the 900MHz. band be allocated for mobile telephone use. This increase in the number of available channels will, of course, result in an increase in the number of users that the system is capable of serving. However, known systems do not lend themselves to the effective use of this larger channel allocation particularly in view of the signaling approaches employed. Moreover, known systems do not provide the degree of flexibility which will eventually be desired in mobile telephone systems having a large number of subscribers who are, to at least some extent, free to move over relatively long distances within and/or between one or more distinct mobile telephone systems.

It is accordinly an object of the present invention to provide a method and communication system for increasing the effective use of available communication channels.

It is an object of the present invention to provide a novel method and mobile communication system for more effectively employing a large number of communication channels allocated to the system.

It is a further object of the present invention to provide a novel method and system for establishing and maintaining mobile telephone communication with a mobile unit through one or more base stations in predetermined zones of a service area.

It is still a further object of the present invention to provide a novel method and system for providing two-way communication to and from mobile units over channels adaptively assigned in accordance with user density.

It is another object of the present invention to provide a novel method and mobile telephone system in which a designated control channel is employed for initial call-up signaling to and from mobile units and for talking channel assignment.

It is yet another object of the present invention to provide a novel method and system for establishing mobile telephone communications over any communication channel assigned for use in the system including control channels when required.

It is still another object of the present invention to provide a novel method and mobile telephone unit operable in conjunction both with advanced signaling techniques and with known techniques.

It is still a further object of the present invention to provide a novel mobile telephone supervisory control sequencer and method for simplified placement and reception of calls by the mobile unit operator.

These and other objects and advantages are accomplished in accordance with the present invention as will become apparent to one skilled in the art to which the invention pertains from a perusal of the following detailed description and claims when read in conjunction with the drawings.

BRIEF DESCRIPTION OF THE DRAWINGS

FIG. 11 is a functional block diagram of one embodiment of the base station of FIG. 1;

FIG. 12 is a functional block diagram of one embodiment of the base station controller of FIG. 11;

FIG. 13 is a functional block diagram of one embodiment of the selector gate of FIG. 11;

FIG. 14 is a functional block diagram of one embodiment of the vote threshold detector of FIG. 11;

FIG. 15 is a functional block diagram of one embodiment of a transmitter-receiver frequency controller for controlling the frequency of each transceiver at the base station of FIG. 11;

FIG. 16 is a functional block diagram of one embodiment of a mobile unit operable in accordance with the present invention;

FIG. 18 is a pictorial representation of one embodiment of the input/output panel of the mobile unit of FIG. 16;

FIG. 19 is a functional block diagram of one embodiment of the control logic circuit of FIG. 16;

FIG. 20 is a functional block diagram of one embodiment of the message register and decoder of FIG. 16;

FIG. 21 is a functional block diagram of one embodiment of the transmitter on/off logic circuit of FIG. 16;

FIG. 22 is a functional block diagram of one embodiment of the call placement logic circuit of FIG. 16;

FIG. 23 is a functional block diagram of one embodiment of a random call placement time delay circuit for use with the mobile unit of FIG. 16;

FIG. 24 is a functional block diagram of one embodiment of a control signal detector for use in selecting a control signal channel having the highest signal level of those signal channels received by the mobile unit of FIG. 16.

DETAILED DESCRIPTION

A preferred embodiment of the method and apparatus of the present invention in the environment of a mobile telephone system is set out hereinafter in accordance with the following Table of Contents.

TABLE OF CONTENTS

Figure 7:
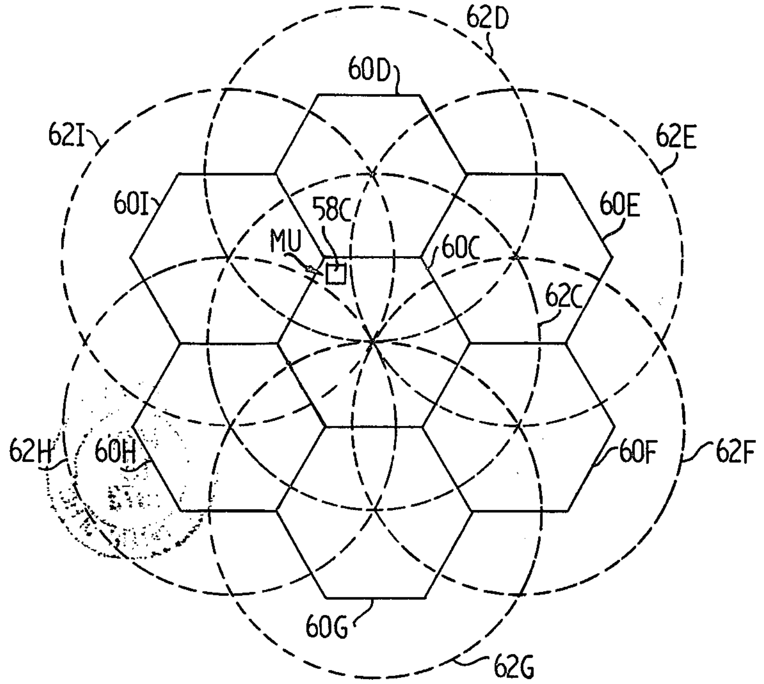
Figure 25:
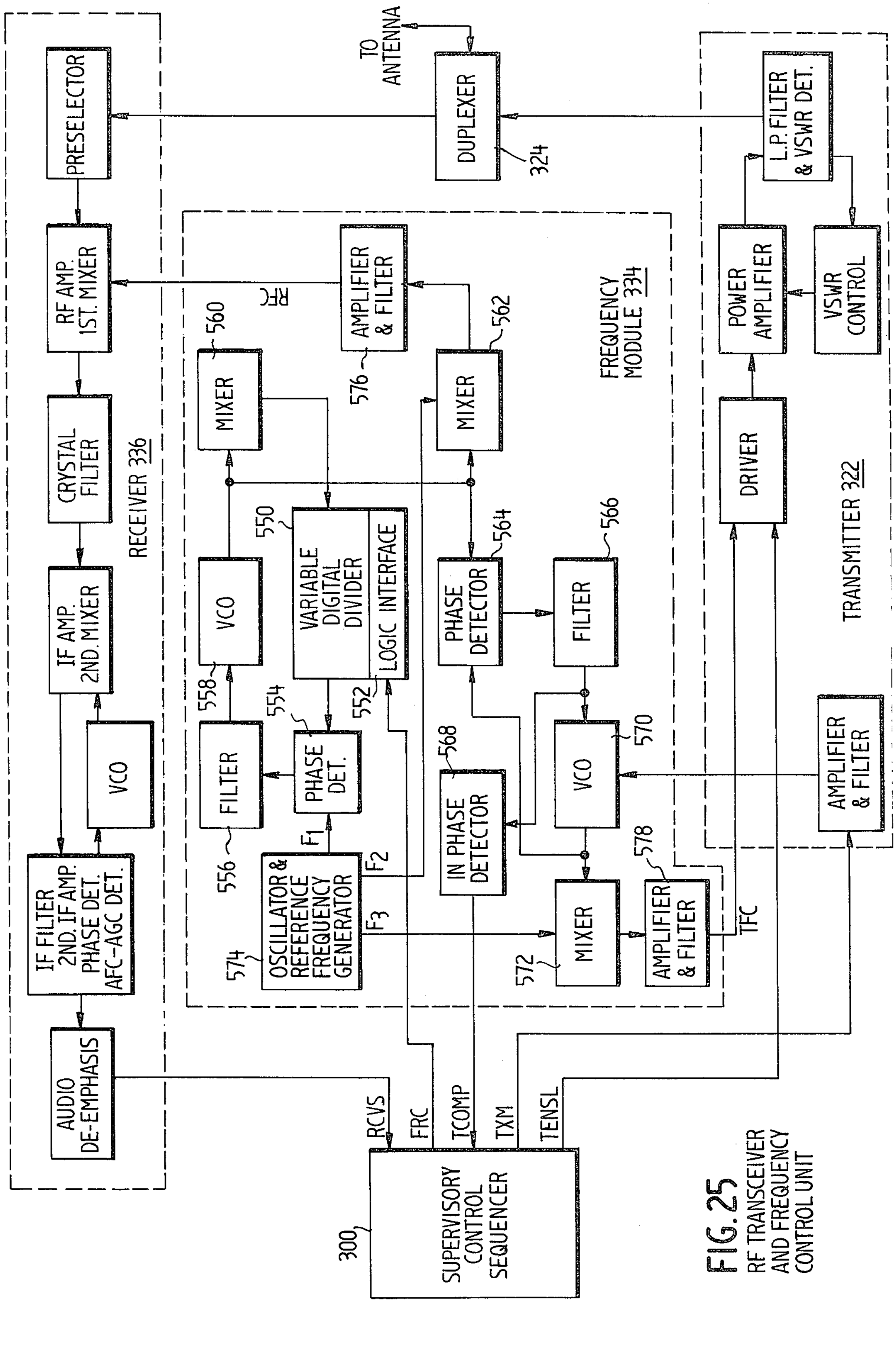
FIG. 25 is a functional block diagram of one embodiment of the RF transceiver and frequency control unit of the mobile unit of FIG. 16.

I. Basic System Description (FIGS. 1–8)
A. Initial Contact with Mobile Unit (FIG. 2A)
B. Call Placement to Mobile Unit (FIGS. 2B – 2D)
C. Call Placement from Mobile Unit (FIGS. 2E and 2F)
D. Zone Configuration and Channel Assignment (FIGS. 3-6)
E. Inter-Zone Channel Borrowing (FIG. 7)
F. Call Maintenance During Inter-Zone Travel (FIG. 8)
II. Control Data and Signaling Format (FIGS. 9A and 9B)
III. Central Control Termainal Description (FIGS. 10 and 10A–10G)
IV. Base Station Description (FIGS. 11–15)
A. Base Station Controller (FIG. 12)
B. Selector Gate (FIG. 13)
C. Vote Threshold Detector (FIG. 14)
D. Transmitter - Receiver Frequency Controller (FIG. 15)
v. Mobile Unit Description (FIGS. 16 – 24)
A. Control Head (FIG. 18)
B. Control Logic Circuit (FIG. 19)
C. Message Register and Decoder (FIG. 20)
D. Transmitter On/Off Logic Circuit (FIG. 21)
E. Call Placement Logic Circuit (FIG. 22)
F. Random Call Placement Time Delay Circuit (FIG. 23)
G. Control Signal Selector (FIG. 24)
H. RF Transceiver and Frequency Control Unit (FIG. 25)

I. BASIC SYSTEM DESCRIPTION

In accordance with the invention, two-way calls such as telephone calls and dispatch services may be readily established between fixed units and mobile units as well as between two mobile units. As will become apparent from the following detailed description, the use of available communication channels is maximized with a minimum of equipment. The simplified signaling format and procedures of the invention further maximize channel use and provide further advantages which will hereinafter become apparent to one skilled in the art to which the invention pertains.

Figure 1:
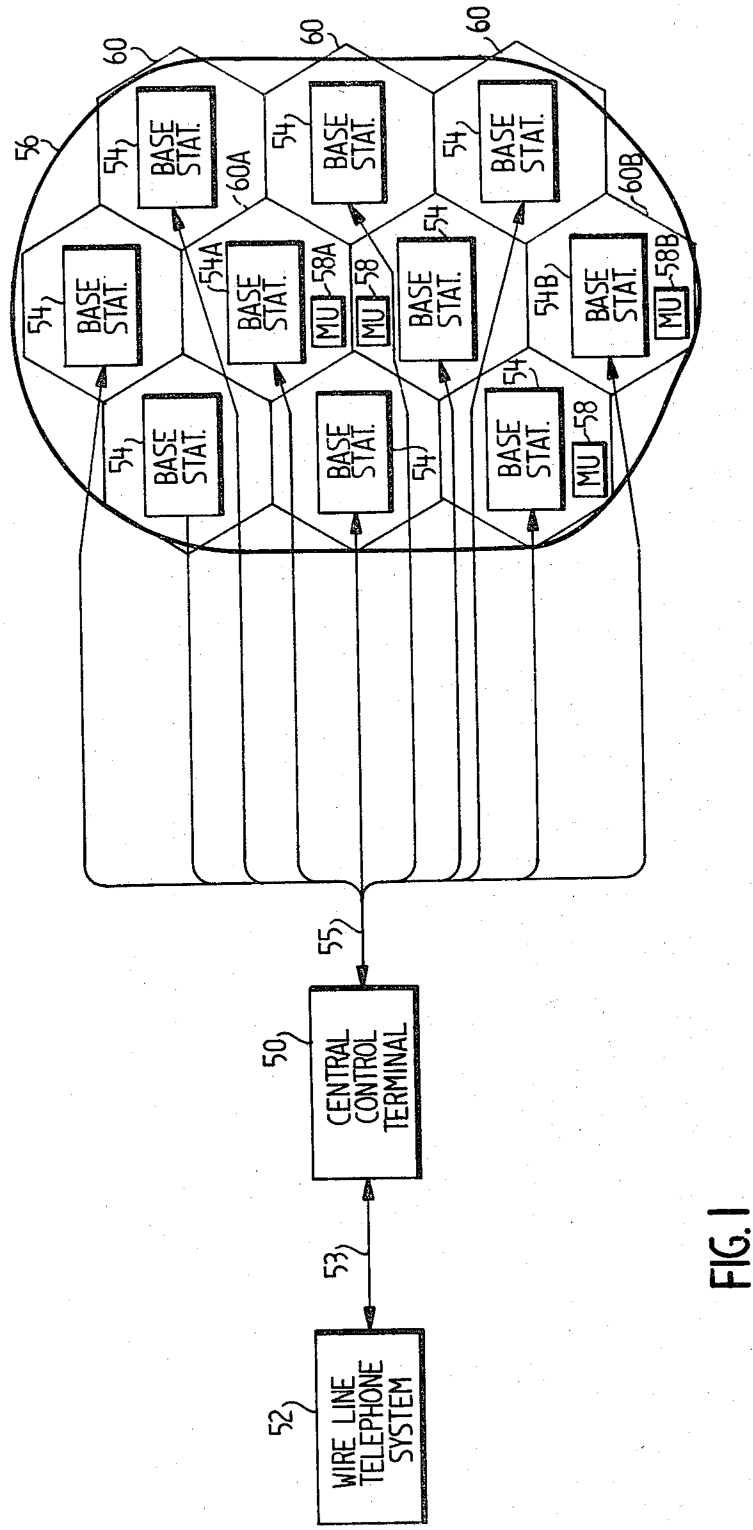
FIG. 1 is a functional block diagram of one embodiment of a mobile telephone system according to the present invention.

With reference now to FIG. 1 wherein the basic mobile telephone system embodiment of the present invention is illustrated, a central control terminal 50 provides centralized control of the system. The central control terminal 50 may be accessed through any suitable switching system such as the illustrated commercially installed wire line telephone system 52 and may receive and transmit telephone calls over the commercially installed telephone lines and exchanges of the system 52.

A plurality of trunk lines 53 may selectively connect subscribers of the wire line telephone system 52 to the central control terminal 50 in a conventional manner and a plurality of commercially installed, two-wire or other suitable transmission lines 55 may link the central control terminal 50 to each of a plurality of base stations 54 spaced throughout a mobile telephone service area generally indicated at 56. Each base station 54 may be connected to the central control terminal over a plurality of the telephone lines 55 designated as talking lines or links and over one pair of the two-wire telephone lines 55 designated as control and signalling lines or links.

Telephone calls may be selectively placed through the central control terminal 50 and the base station 54 between the wire line telephone system subscribers and mobile telephone units 58 as will become apparent from the subsequent description of the invention. The central control terminal 50 may provide the necessary supervisory and control function of one or more systems from a convenient control location. The control terminal 50 may assign calls to zone base stations on any available channels on a noninterfering basis, perform necessary switching and interfacing functions for fixed-to-mobile or mobile-to-mobile call connection, perform statistical traffic data collection from which changes in system configuration may result and perform message accounting and billing functions.

Calls may be established between subscribers to the wire line telephone system 52 and the mobile units 58 in the service area 56 under the control of the central control terminal 50 over a plurality of radio communication channels assigned to the system. As is subsequently described in greater detail, calls between the fixed telephones of the telephone system 52 and the mobile units 58 are routed through the central control terminal 50 and one of the base stations 54 serving an appropriate small zone 60 within the service area 56. Similarly, callss between two mobile units may be routed through the central control terminal 50 and base stations 54.

Each of the base stations 54 may include a plurality of transmitters and a plurality of receivers and other equipment required to serve one and preferably several mobile units 58 simultaneously engaged in calls. As will hereinafter be described in greater detail, each base station 54 is preferably assigned one or more radio communication channels on a noninterfering basis since the areas served by the base stations preferably overlap. Each communication channel includes two distinct frequencies (an up-link and a down-link) so that two-way radio communications may be simultaneously carried on as in ordinary wire line telephone systems. Each mobile unit 58 preferably include a single transmitter and a single receiver (e.g., a transceiver), both of which may be tunable through the frequency band of the channels assigned to the system.

In a prferred embodiment of the invention, one of the channels assigned to each base station 54 is designated as a control signal channel and differs in frequency from at least the control signal channels assigned to immediately adjacent base stations. As will subsequently be described in detail, the establishing of calls and other control functions may be accomplished over the control channel in each small zone 60 and the control signal channel may be employed for conservation, i.e., assigned to a call, in the event, for example, that no other channels are available.

As an example of signaling over the designated control signal channels, the mobile units may all search for and lock onto an appropriate control signal channel as is subsequently described in detail. A call may be initiated to a mobile unit 58 over the wire line telephone system 52 and the call may then be transmitted to one or more appropriate base stations 54 via the central control unit 50 over the appropriate control and signaling links of the telephone lines 55. The address of the called mobile unit 58 may be selectively broadcast over the control signal channels serving one or more of the zones 60 as required and, when the central control terminal 50 receives an indication that the called mobile unit has received the initial calling or call-up signal over a particular control signal channel, the central control terminal 50 may assign an available one of the remaining base station channels, i.e., a talking channel, to that call.

Similarly, when a call is placed from a mobile unit 58 to a subscriber of the wire line telephone system 52, the call is initiated over a base station control signal channel and the control and signaling link connecting the base station to the control terminal 50. An available one of the talking channels assigned to the base station 54 through which the call is established is then assigned to the call. It can thus be seen that all initial signaling involved in establishing a call between the wire line telephone system 52 and a mobile unit 58 in a particular zone 60 may be accomplished over a designated control signal channel serving that zone. As will hereinafter become apparent, a minimum amount of signaling is accomplished over the control signal channel 50 so that one control signal channel may effectively accommodate a relatively large number of users in a zone 60. Moreover, to avoid signaling collisions, provision is made to assure that the control channel is not accessed simultaneously by more than one mobile unit 58 repeatedly as is subsequently described in detail.

Reuse of channels in separated zones 60 of the service area 56 is permissible as long as sufficient separation exists between the zones 60 assigned the same channels. For example, channels assigned for use in zone 60A of FIG. 1 may also be assigned for use in zone 60B if undesirable interference does not result. Moreover, channels may be assigned to the zones dynamically on a noninterfering basis depending upon current user density in the various zones. As another aspect of the invention, the coverage areas of the zones 60 may overlap in a predetermined manner to provide service to a mobile unit 58 in one zone 60 through a base station 54 in an adjacent zone when no channels are available in the zone in which the mobile unit is located and locked to a control signal channel. These and other aspects of the invention are described hereinafter in greater detail in connection with subsequent figures.

To facilitate a general understanding of the overall operation of the system, various functional aspects of the system of FIG. 1 are described hereinafter in connection with the flow diagrams of FIGS. 2A–2F.

A. Initial Contact with Mobile Unit

Figure 2A:
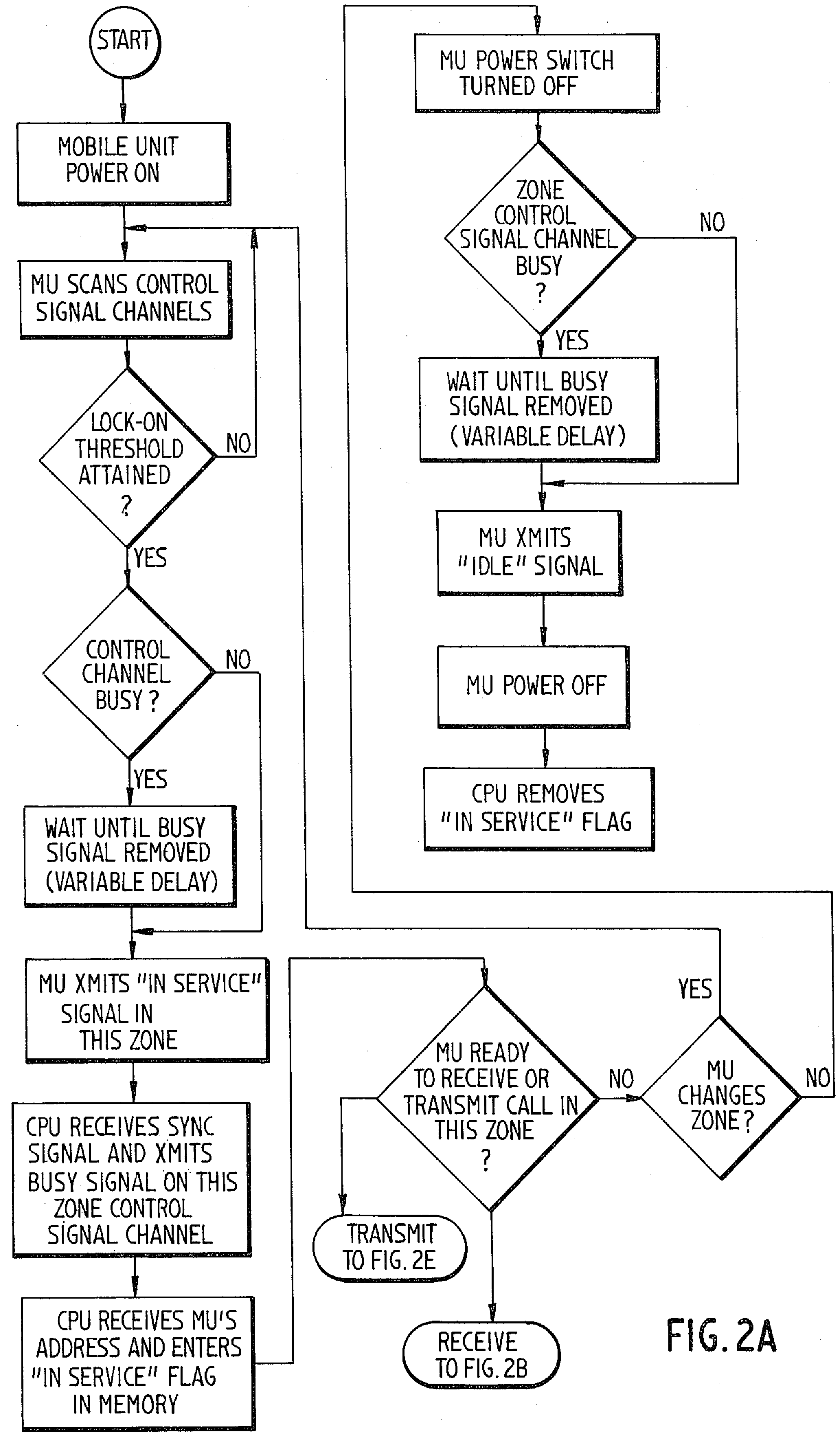
FIGS. 2A–2F are flow diagrams illustrating the operation of the system of FIG. 1.

In FIG. 2A there is illustrated a flow diagram of the operation of the system according to one embodiment of the invention when a mobile unit 58 first enters or is energized in a particular zone 60 of the service area 56. With continued reference to FIG. 1 and with reference to FIG. 2A, when a mobile unit 58A enters or is first energized in a zone 60A of the service area 56, the mobile unit scans the control signal channels and continues to scan until a predetermined lock-on threshold is attained. As will hereinafter be described in greater detail, each control signal channel may be identified by a predetermined digital identifier code, and the mobile unit may decode the control channel identifier code transmitted over the control signal channels to insure that the mobile unit locks onto an appropriate control channel. If the mobile unit-to-base station link of the control signal channel is busy and thus marked by a "busy" signal when lock-on is attained, the mobile unit waits until the busy signal is removed from the control signal channel and then transmits an "in service" signal to notify a central processing unit (CPU) at the central control terminal 50 that the mobile unit has entered the service area. If the signal channel is not busy, the mobile unit may immediately transmit the "in service" signal without waiting.

The in service signal may include a sync portion and the address of the mobile unit 58A and may be received by a receiver at the base station 54A serving the zone 60A. The received in service signal may then be relayed from the base station 54A to the central processing unit CPU at the central control terminal 50 over the appropriate control and signaling link of the plurality of telephone lines 55 serving the base station 54A. The CPU may then transmit a busy signal on the appropriate zone control signal channel in response to receipt of the sync portion of the in service signal. The CPU also receives the address portion of the in service signal and enters an in service flag in memory thereby indicating that the mobile unit 58A is in service in the zone 60A of the service area 56.

After this initial signal by the mobile unit when it is first energized or first enters the service area, the mobile unit 58A may receive or transmit calls by way of the equipment at the base station 54A in the zone 60a providing that the mobile unit remains locked onto the control signal channel from the base station 54A. If the mobile unit 58A does not transmit or receive and in the interim either changes zones or is deenergized, the appropriate action is taken to either find a new control signal channel or to report the change in status to the CPU.

For example, if the mobile unit changes zones the mobile unit may reacquire a control signal channel in the new zone and the central control unit may again store an indication that the mobile unit is in service in the new zone as is illustrated in FIG. 2A. Alternatively, the mobile unit may merely find and lock onto a new control signal channel of sufficient signal strength without reporting the zone change to the central processing unit. If the mobile unit power switch is turned off, the mobile unit transmits an "idle" signal either immediately or, if the control signal channel is busy when the power switch is turned off, after the busy signal is removed from the control signal channel. After the idle signal is transmitted by the mobile unit, the mobile unit is deenergized and the central processing unit removes the in service flage for that particular mobile unit.

The central control terminal may thus maintain in storage the in service or idle status of all mobile units in a particular system. The zone location of each energized mobile unit may also be stored and may be updated as a mobile unit moves about the service area. The zone locations of deenergized mobile units will not, of course, be known.

B. Call Placement to Mobile Unit

Once the mobile unit 58A is locked onto a control signal channel and is ready to place and receive calls, the mobile unit may provide an appropriate indication of control signal channel lock-on and may place and receive calls either to or from fixed or mobile telephone subscribers.

Figure 2B:
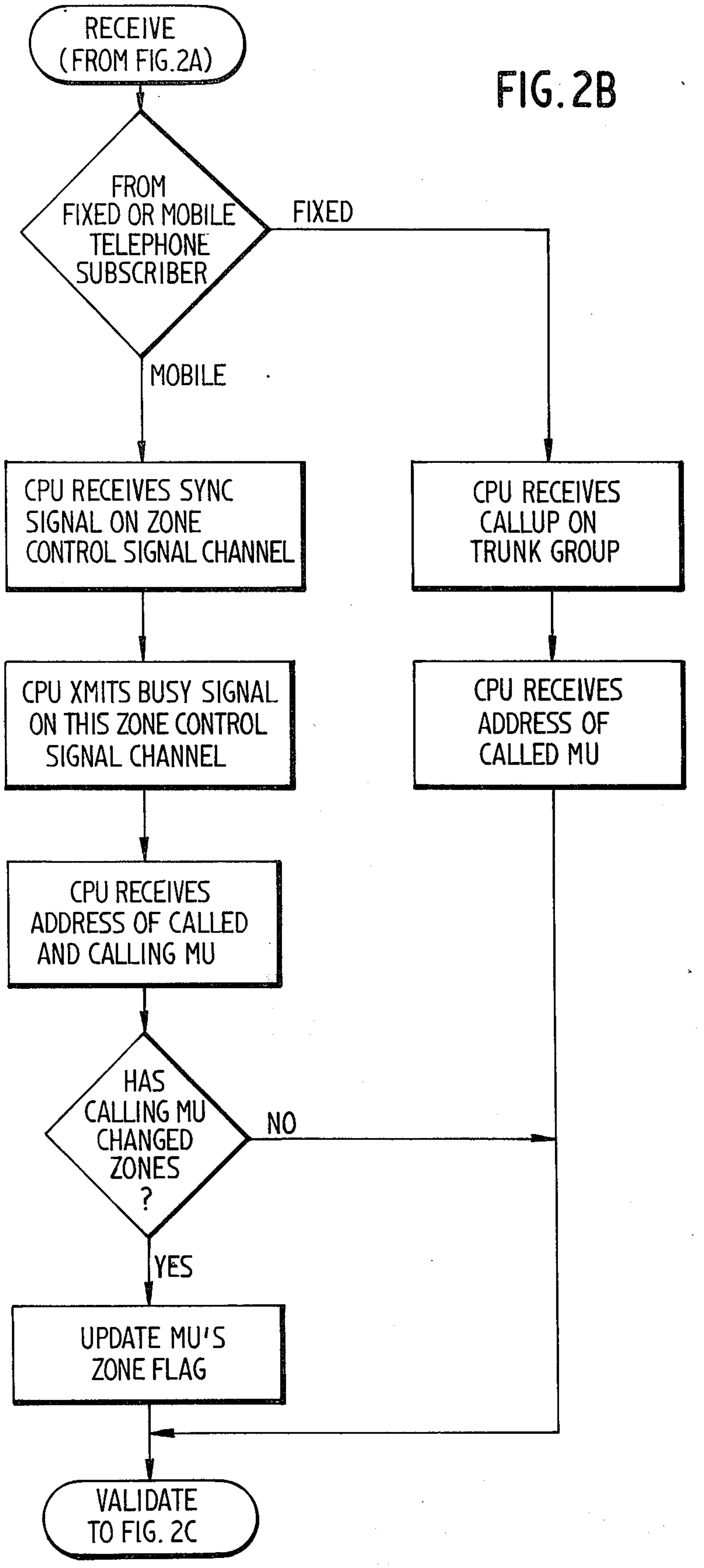

Referring now to FIG. 2B, if a call is initiated from a mobile telephone subscriber to the mobile unit 58A, the central processing unit (CPU) at the control terminal 50 receives a "call request" or "call-up" message. The "call-up" message includes a mobile unit initated sync signal and is ordinarily received on the control signal channel serving the zone 60 in which the calling mobile unit is located by way of the base station 54 serving that zone. The CPU immediately effects the transmission of the busy signal of this zone control signal channel. The CUP then receives the addresses of both the called and calling mobile units and updates the zone flag of the calling mobile unit if it has changed zones and the zone changes was not previously detected and stored.

If a call to the mobile unit is being placed from a fixed telephone subscriber, i.e., a subscriber to the wire line telephone system 52, the CPU receives the appropriate call-up signals resulting in seizure of one of the trunk lines 53 of FIG. 1 and receives the address of the called mobile unit. After this initial call request signaling illustrated in FIG. 2B, certain validation functions may then be accomplished as is illustrated in FIG. 2C for either mobile-to-mobile or fixed-to-mobile calls.

Figure 2C:
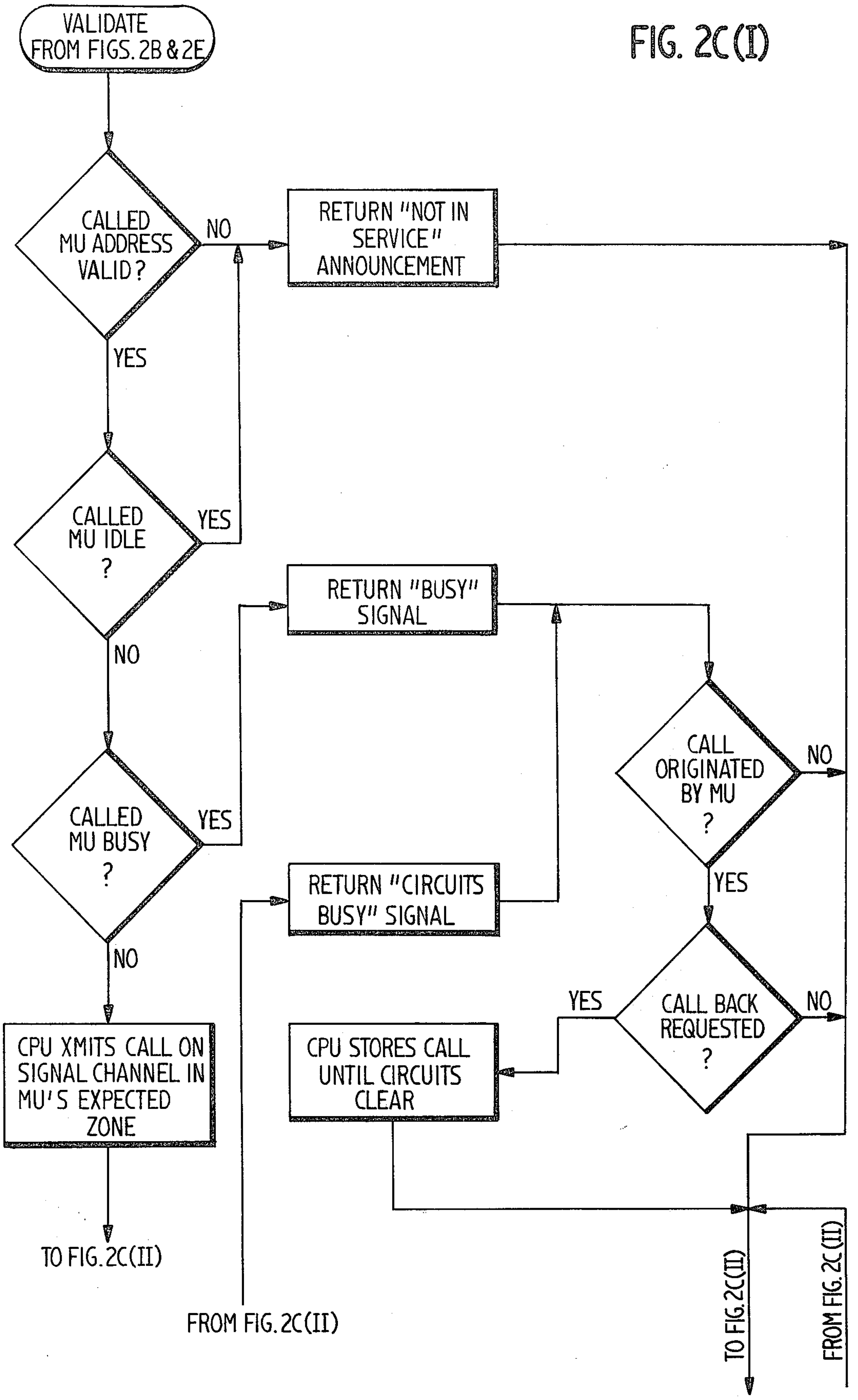

Referring now to FIG. 2C, the address of the called mobile unit may be checked against those mobile unit addresses stored in memory and those flagged as being in service after the inital call-up signaling described in connection with FIG. 2B. If the called mobile unit address is not valid or the called mobile unit is not in service, a "not in service" announcement may be returned to the calling party or caller and the caller may thereafter go back "on-hook" so that caller's telephone is operable to receive calls. Similarly, if the calledl mobile unit address is valid and the called mobile unit is in service but is busy, the central processing unit may return a busy signal or tone to the calling party. In the event that the call was originated by a mobile unit and a call-back is requested, the central processing unit may store the call until circuits are clear and then notify the mobile unit of the availability of circuits at a later time.

After it has been determined that the called mobile unit address is valid, that the called mobile unit is in service and that the called mobile unit is not currently engaged in a call, the central processing unit transmits the called mobile unit address on the control signal channel in the mobile unit's expected zone (or actual zone if continuously updated as in FIG. 2A). Until the central processing unit receives an "acknowledge" signal or message from the called mobile unit, the call is retransmitted in the expected zone and may eventually be transmitted in surrounding zones. If an acknowledge signal is never received, the central processing unit returns a not in service announcement or an "unable to contact" announcement to the calling party as is appropriate.

Once the central processing unit receives an acknowledge signal from the mobile unit, a service or talking channel is assigned to the call if the mobile unit has remote channel assignment capabilities. If the mobile unit cannot be remotely commanded to a new channel for talking, e.g., the mobile unit is an IMTS mobile unit, or if not talking channels are available for assignment, the CPU may assign the call to the control signal channel as is hereinafter described.

With continued reference to FIG. 2C, the central processing unit first attempts to assign the call to an available service or talking channel in the zone in which the called mobile unit is locked onto the control signal channel. If no service channels are available in that zone, the central processing unit next attempts to assign a service channel available in one of the adjacent zones. For example, the called mobile unit may be the mobile unit 58A in zone 60A served by the base station 54A. If all talking channels assigned for use in zone 60a are in use and no additional channels are available for dynamic assignment, e.g., all equipment at the base station 54A is in use, the CPU may assign the call to a talking channel in one of the six adjacent zones and an available channel may be "borrowed" from an adjacent zone as is hereinafter described.

If the central processing unit fails in one or both attempts to assign a service channel, the central processing unit may service the call on the control signal channel over which the acknowledge signal was received from the mobile unit. Alternatively, the central processing unit may return a "circuits busy" signal which may be returned to the calling party or may effect the storage of the call for later placement.

Figure 2D:
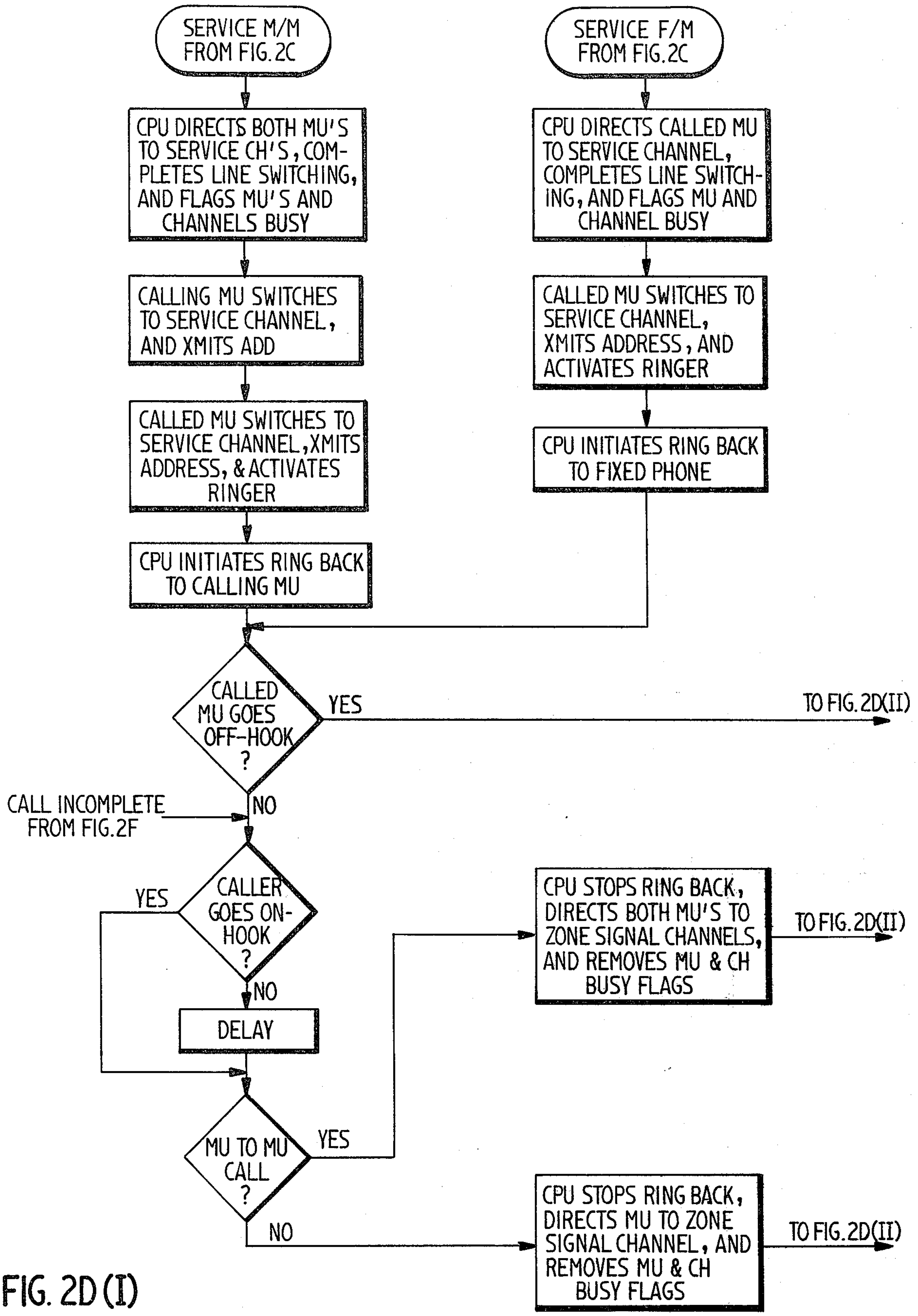

When an available service channel has been assigned to service the call, the call to the mobile unit may be established as is illustrated in FIG. 2D. Referring now to FIG. 2D, a mobile-to-mobile call (SERVICE M/M) is established by first directing both mobile units to the appropriate service channels and completing appropriate control functions and swithing at each of the base stations 54 serving the mobile units and at the central control terminal 50 as is hereinafter described. The mobile units and the assigned service channels are flagged as being busy and the calling and called mobile units tune to the assigned service channels to transmit their respective addresses. The called mobile unit activates a ringing circuit in the mobile unit so that the subscriber is notified of the call and the central processing units initiates a "ring back" tone to the calling mobile unit to indicate that the other party is being notified of the call.

If the call is placed from a fixed telephone to a mobile unit (SERVICE F/M) the central processing unit directs the called mobile unit to the assigned service channel, completes the required control functions and switching both at the base station serving the mobile unit and at the central control unit, and flags the mobile unit and the assigned service channel as busy. The called mobile unit tunes to the assigned service channel, transmits its address and activates the ringing circuit to notify the mobile unit subscriber of the call. The central processing unit thereafter initiates the ring back tone to the fixed phone.

If the called mobile unit does not go off-hook, a CALL INCOMPLETE sequence is initiated as will hereinafter be described. If the mobile unit does go off-hook, the called mobile unit transmits a "go-ahead" signal and the central processing unit stops the ring back signal and starts the billing period. When the called mobile unit goes back on-hook at the completion of the call prior to the calling party going on-hook, the called mobile unit transmits a terminate signal and the central processing unit calculates the billing period and disconnects the previously connected communication path. The central processing unit may thereafter indicate to the mobile unit (or the mobile units if a mobile-to-mobile call) that it may tune to the approporiate control signal channel and may remove the mobile unit and channel busy flags from memory. The mobile unit (or units) may thereafter return to the control signal channel through the scan routine illustrated in FIG. 2E or may be remotely commanded to the appropriate control signal channel by the CPU.

With continued reference to FIG. 2D, after the call is established and the billing period has commenced, a similar termination process is initiated, if the called mobile unit does not go on-hook before the calling mobile unit or calling fixed telepphone goes on-hook. With a mobile-to-mobile call, the calling mobile unit transmits a terminate signal when it is on-hook and the calling and called mobile units are directed to appropriate control signal channels as was previously described. Similarly, if the fixed telephone goes on-hook, the CPU detects the resultant on-hook signal from the wire line telephone system 52 and releases the trunk previously seized for the call. The called mobile unit is then directed to the control signal channel as was previously described.

If the called mobile unit does not go off-hook when called (and in other situations described hereinafter), a CALL INCOMPLETE routine may be initiated. For example, if the calling mobile unit goes on-hook, e.g., after determining that the called party is not going to answer, or if after a predetermined period of time the called party has not answered, the central processing unit may stop the ring back signal to the calling mobile unit and direct the mobile unit (or mobile units in a mobile-to-mobile call) to return to a control signal channel. The mobile unit and channel busy flags may be removed from memory and the mobile unit may thereafter search for the control signal channel broadcast in its zone in accordance with the SCAN routine of FIG. 2E.

It can thus be seen that calls may be readily established to an energized mobile unit without operator intervention and with a minimum of signaling over the control signal channel. A call may be established over any one of a number of available channels and the established call may be automatically monitored for billing and traffic data collection purposes. Moreover, various timing procedures for call termination and for other timed funcitons may be provided automatically thereby minimizing overloading aid resultant unavailability of communication channels.

C. Call Placement From Mobile Units

Figure 2E:
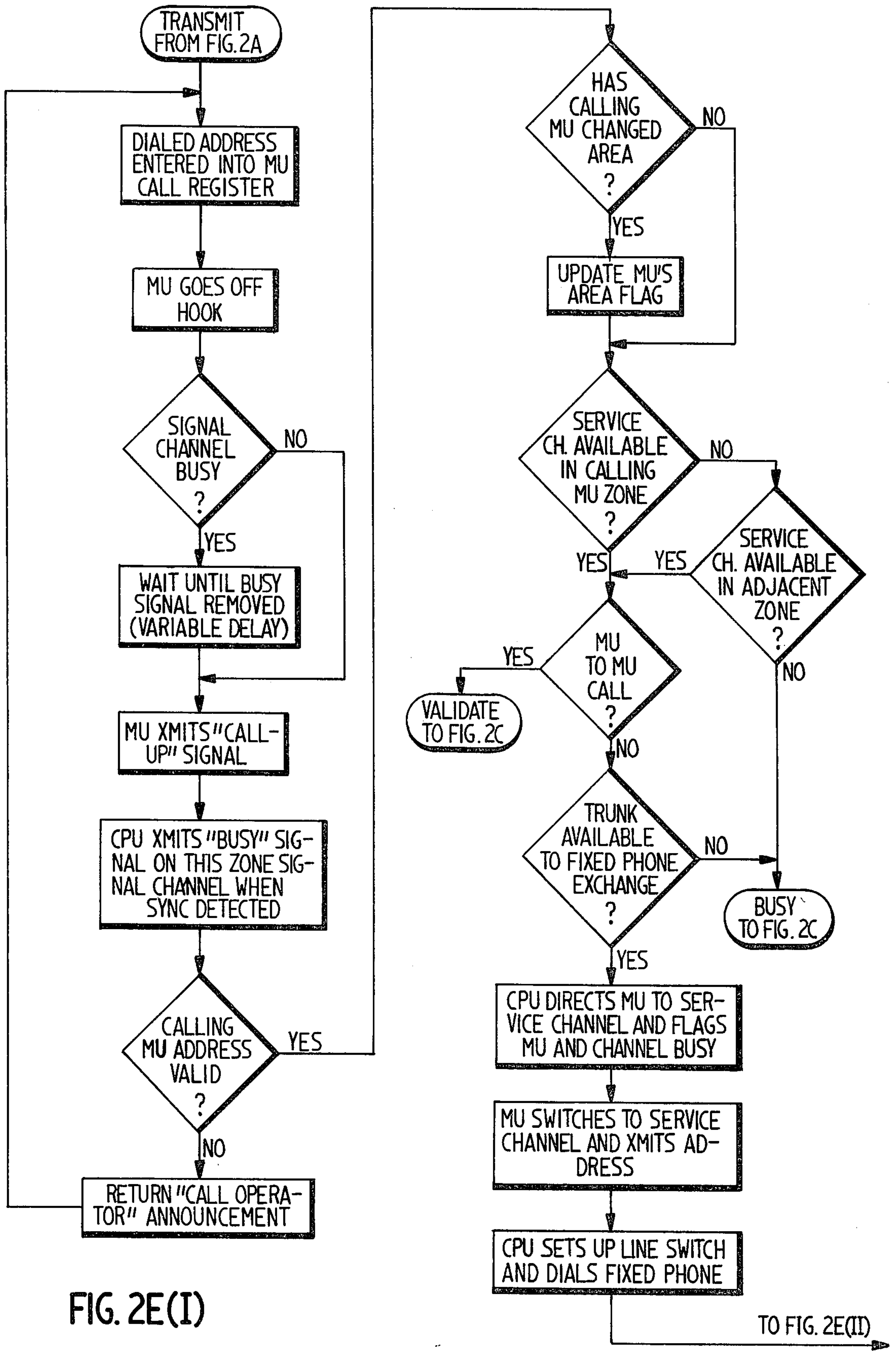

A mobile unit may initiate a call, i.e., transmit a request for service, as is illustrated in FIG. 2E. Referring now to FIG. 2E, the mobile unit subscriber may initiate the TRANSMIT sequence by first entering an address, i.e., a telephone number of another fixed telephone or mobile teelphone subscriber, into a call register in the mobile unit. The mobile unit may then go off-hook and may either immediately or shortly thereafter (depending upon the condition of te control signal channel serving the zone) seize the control signal channel and transmit a call-up signal as is hereinafter described. The call-up signal may be received by the control signal channel receiver at the base station serving the zone and transmitted to the central control terminal 50 over the control and signaling link of the lines 55 connected to the base station. When a sync portion of the call-up signal is detected by the central processing unit, a busy signal may be transmitted by the central processing unit on the seized zone control signal channel.

The call-up signal includes the address of the calling mobile unit and the calling address may be validated by the central processing unit (CPU). For an invalid calling address, e.g., a mobile unit from another system, the CPU may return a "call operator" announcement to the calling mobile unit. If the calling mobile unit address is valid, the zone flag of the calling mobile unit updated, if necessary, and the CPU may then attempt to locate an available service or talking channel to serve the call, first in the calling mobile unit's zone and then in adjacent zones if no channels are assignable in the calling mobile unit's zone. If no service channels are available in either the zone serving the calling mobile unit or in adjacent zones, the CPU may assign the control signal channel to service the call or initiate the BUSY routine previously described in connection with FIG. 2C. If it is determined by the CPU that the mobile unit requesting service does not have remote channel assignment capability, e.g., is an IMTS mobile, the CPU may assign the control signal channel for talking whether or not a service channel is available.

It the called party is also a mobile unit subscriber, the call may be placed as was previously described in connection with FIG. 2C commencing with the VALIDATE routine. If the called party is a fixed telephone subscriber, the central processing unit attempts to seize an available trunk 53 of the wire line telephone system. If no trunks are available, the BUSY routine of FIG. 2C may be initiated.

After a wire line telephone system trunk line has been seized, the central processing unit may direct the mobile unit to an available service or talking channel and flag both the mobile unit and the talking channel as busy. The mobile unit may then tune to the service channels in response to a channel assignment message from the CPU and may then transmit its address. The CPU may thereafter effect the necessary switching to connect the appropriate base station equipment serving the assigned service channel to teh seized trunk line 53. The CPU may then dial the address of the called fixed telephone subscriber in a manner compatible with the wire line telephone system 52.

If the called wire line telephone is busy, a busy signal is returned from the wire line telephone sustem and the CPU may either store the call until the circuit clears or merely await an on-hook indication from the mobile unit. When the mobile unit goes on-hook, the CPU directs the mobile unit to search for a control signal channel and removes the mobile unit and channel busy flags from memory. The mobile unit thereafter returns to a control signal channel of sufficient signal strength in accordance with the previously described SCAN routine and awaits the next call.

Figure 2F:
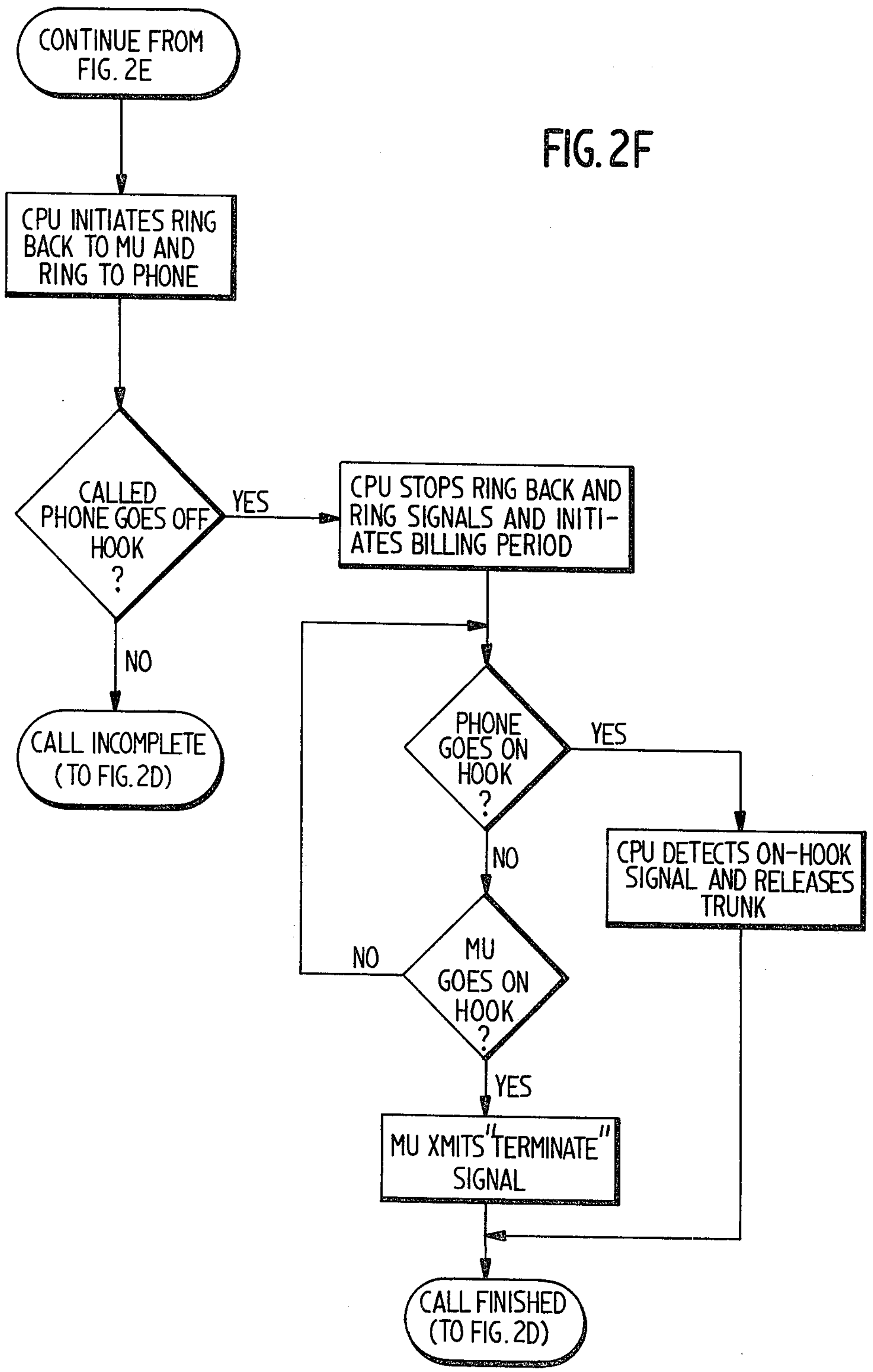

If the fixed telephone is not busy, the mobile initiated calling routine continues as is illustrated in FIG. 2F. Referring to FIG. 2F, the CPU initiates a ring back to the mobile unit and appropriate ringing signals to the wire line telephone system subscriber. When the called telephone goes off-hook, the CPU stops the ring back and ringing signals and initiates the billing period. If the fixed telephone goes on hook, the CPU detects the on-hook condition and releases the seized trunk. The CALL FINISHED routine previously described in connection with FIG. 2D is thereafter initiated. If the mobile unit goes on-hook, the mobile unit transmits a terminate signal and the CALL FINISHED routine of FIG. 2D is initiated. In the event that the fixed telephone does not go off-hook, the CALL INCOMPLETE routine of FIG. 2D may be initiated.

It can be seen from the foregoing that in accordance with the present invention calls may be readily established between fixed telephones and mobile units and between two mobile units. The use of available channels in maximized with a minimum amount of equipment and the simplified signaling ties up the designated control channel for a minimal amount of time. Additional advantages will become apparent from the more detailed description of the invention hereinafter.

D. Zone Configuration and Channel Assignment

As is briefly described above in connection with FIGS. 1 and 2A–2F, the mobile telephone service area 56 is divided into small zones or cells 60 each including a base station 54 serving those mobile users within communicating distance from the base station. Each of the zones or cells 60 may be omnidirectionally served from approximately centrally thereof so that each cell 60 may be defined essentially as a circular area with a slight overlap of coverage between adjacent cells. Of course, the exact "shape" of a zone is determined by many propagation factors and may not be definable as any simple geometric shape since the zone "shape" is a function of signal reception. However, to facilitate a description of the configuration of the cell pattern, the cells 60 are represented schematically as hexagonal in shape with a diagonal dimenison approximately equal to the diameter of the essentially circular coverage pattern served by the centrally disposed base stations unless otherwise specified.

Figure 3:
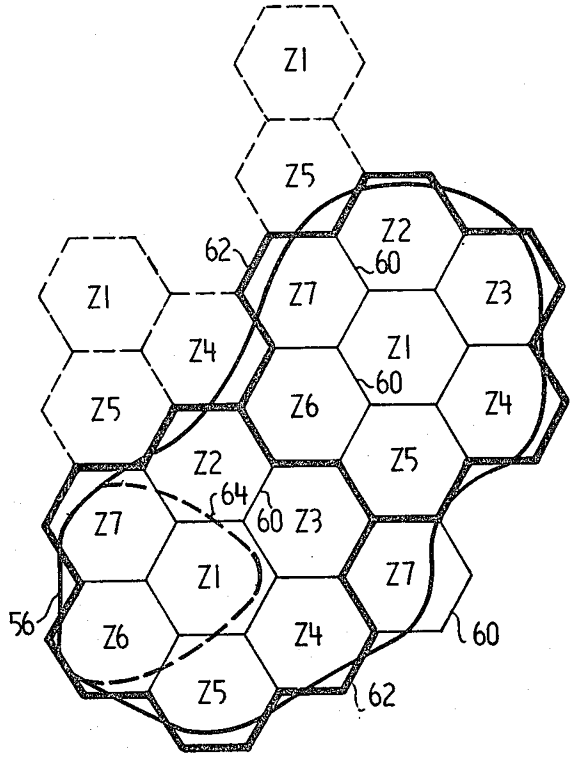
FIGS. 3–7 are plan views of a mobile telephone service area illustrating embodiments of communication coverage patterns of the system of FIG. 1.

As is illustrated in FIG. 3, the large service area 56 may be served by a repeating pattern of seven different zones or cells designated Z1–Z7, the repeating pattern being generally indicated at 62. By dividing the large service area 56 in this manner, reuse of the same communication channels in like designated zones or cells is permissible. Thus, for example, the same frequency channels can be assigned for use in all zones designated Z1 on a noninterfering basis because of the physical separation between like designated zones.

Channels may be assigned to the zones Z1–Z7 in groups, as frequency sets, interleaved in the band with other groups or sets. The number of frequency sets may be chosen on the basis of the co-channel interference which can be tolerated by a mobile unit operating in any zone. The number of frequency sets available determines the separation possible between zones reusing the same frequencies. Thus, with the seven frequency sets corresponding to the seven zones Z1–Z7 in FIG. 3, the separation between cell base stations reusing the same frequency channels is approximately 4.6 zone radii. In other words, with the small zone pattern of FIG. 3, the distance between base sations in like designated zones transmitting at the same frequencies is approximately 4.6 radii.

As can be seen in FIG. 3, the service area can be readily expanded to accommodate growth through the addition of base station equipment to provide additional zones illustrated in phantom. In those portions of the service area 56 in which user density is high, the maximum number of available channels may be employed in each zone. Where user density is sparce, a fewer number of channels may be employed and the number of channels (and the base station equipment required for each channel) may be increased as user density increases. For example, if 28 communication channels are available for use in the system, four different channels may be assigned for use in each zone. Thus, channels 1–4 may be employed at a plurality of locations within the service area 56 in each zone designated Z1. Alternatively, the 28 available communication channels may be dynamically assigned for use in the zones 60 as a function of user density as will hereinafter be described in greater detail.

Figure 4:
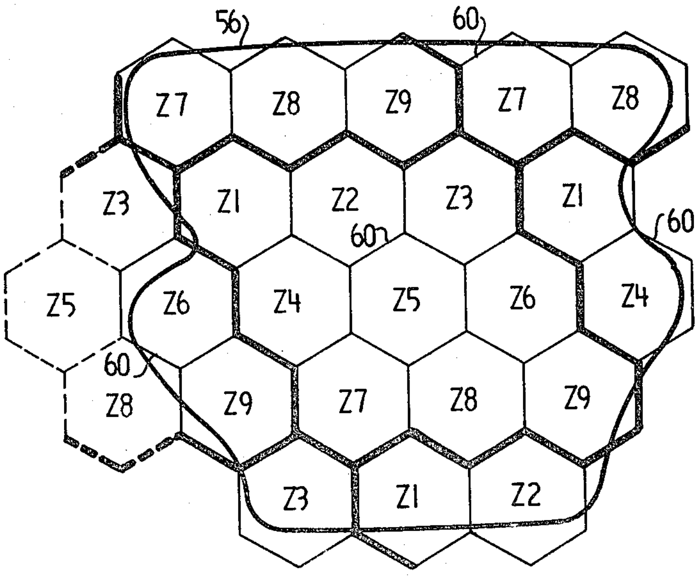

In FIG. 4, a repeating pattern of nine small cells or zones is illustrated. The nine zone pattern of FIG. 4 provides additional separation betwen like designated zones employing the same channels and may permit additiional zone overlap if desired. For example, the separation between base stations serving the like designated zones Z1 in the nine zone pattern is approximately 5.2 radii.

Figure 5:
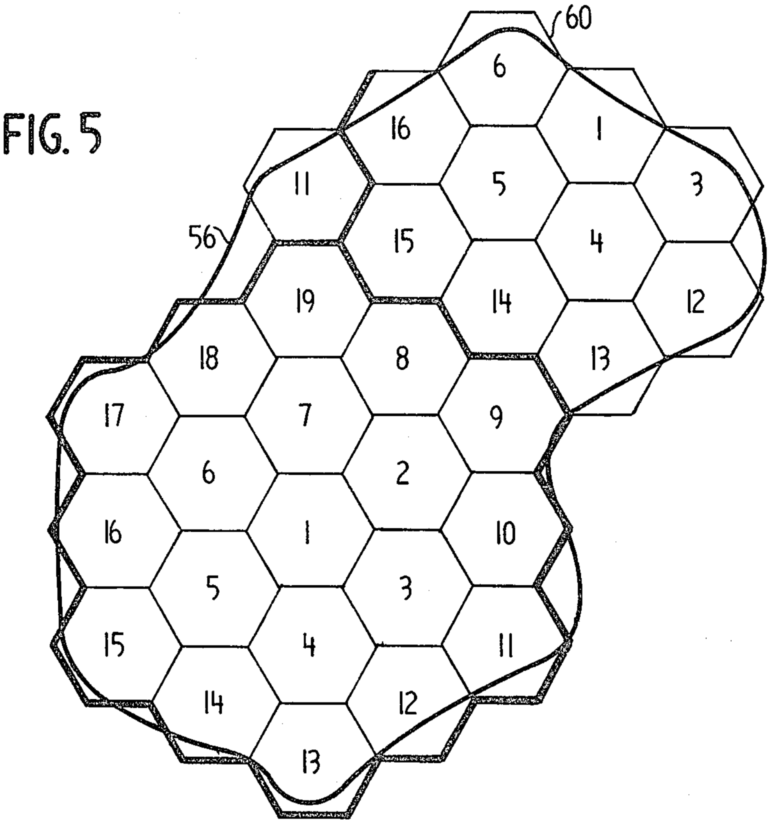

Even greater separation between like designated zones employing the same channels may be obtained through the use of a repeating 19 zone pattern such as that illustrated in FIG. 5. The pattern of FIG. 5 is particularly useful where a large number of channels is available and where overlapping cell or zone coverage is desired for channel borrowing or sharing. With a repeating 19 zone pattern, approximately 7.2 radii separate channel reuse in like designated zones.

Figure 6:
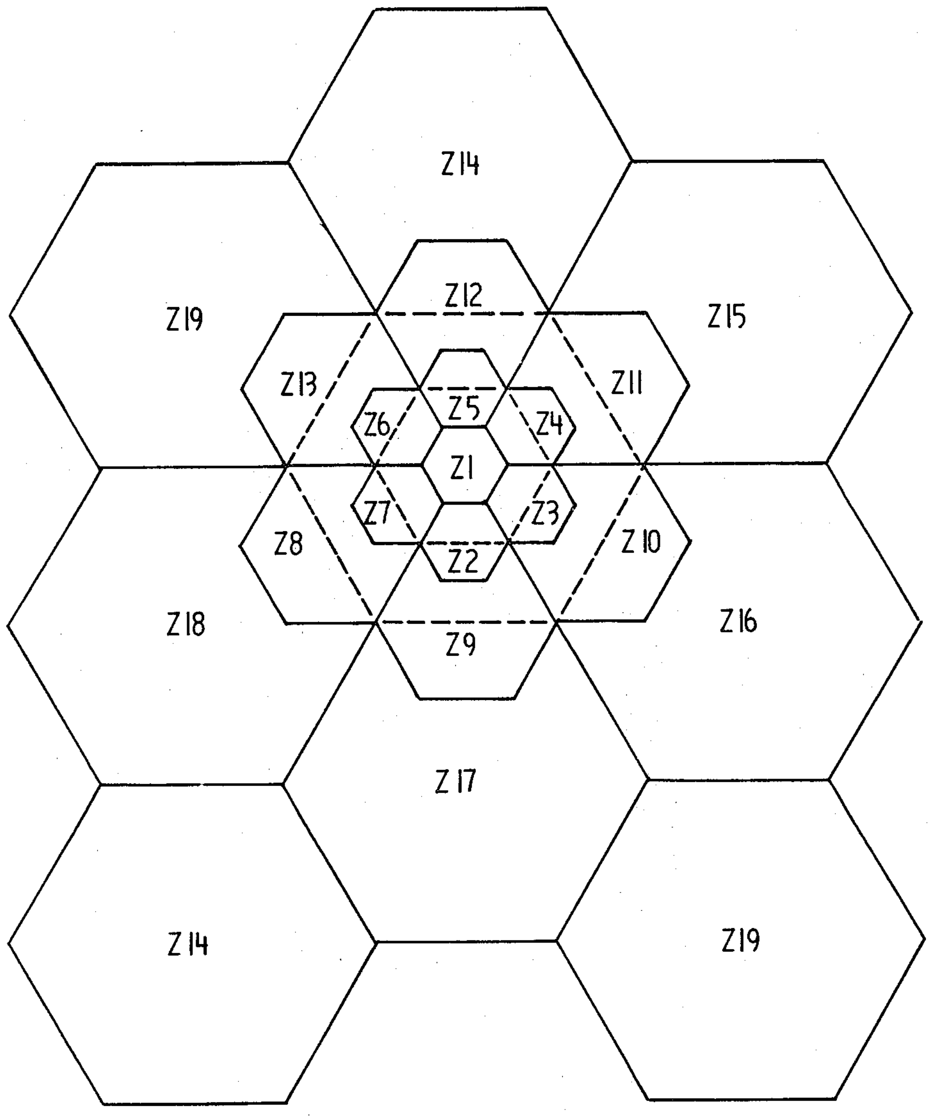

As can be seen from the foregoing and from FIG. 1, the channels assigned to a particular zone may be reused in another zone (e.g., a zone designated by the same zone number) if the zones are sufficiently separated to prevent co-channel interference. In addition, zones may be of various sizes as determined by the propagation and reception characteristics of the base station transmitters and receivers so that the service area 56 may be adequately served as is illustrated in FIG. 6. Where zones of different sizes are employed in the same syste, the spacing between base stations in two different sized zones using the same channel is largely governed by the requisite number of radii based upon the radius of the larger zone. Thus, where different sized zones are contiguous or nearly so, more zones may be required in the repeating pattern than if the zones were all essentially the same size.

Referring to FIG. 6, for example, user density may be particularly high in one portion of the service area and the zones 60 in the high user density area may be small to permit a high concentration of the available channels. In those portions of the service area 56 in which user density is sparse, the zones 60 may be quite large since the channels available for assignment to a single zone may be sufficient in number to provide adequate service to a relatively large area.

As was previously mentione, one of the channels assigned to each of the base stations 54 is preferably designated as a control signal channel over which control signals may be broadcast between the base stations 54 and the mobile units 58 for control and monitoring purposes. The frequencies of the designated control signal channels serving the zones differ in at least those zones adjacent to each other: For example, an exemplary fixed channel assignment scheme for a 28 channel system separated into a repeating seven zone pattern such as that illustrated in FIG. 3 may be as follows:

TABLE I

| Zone | Channels* |
|---|---|
| Z1 | 1, 2, 3, 4 |
| Z2 | 5, 6, 7, 8 |
| Z3 | 9, 10, 11, 12 |
| Z4 | 13, 14, 15, 16 |
| Z5 | 17, 18, 19, 20 |
| Z6 | 21, 22, 23, 24 |
| Z7 | 25, 26, 27, 28 |

*Numbers do not necessarily relate to frequency order

Referring to Table I, channel 1 may be designated the control channel in the zone Z1 and channels 5, 9, 13, 17, 21 and 25 may be designated the control channels in the respective zones Z2–Z7. it can thus be seen that the frequencies of the control channels assigned for use in the zones adjacent zone Z1, i.e., the zones Z2–Z7, differ from the frequency of the control channel assigned for use in zone Z1. The same control channels, however, may be reused in like designated zones since the separation between like designated zones is sufficient to insure that there is no interference between these zones. Moreover, the frequencies of the designated control signal channels may be grouped within the available frequency band to facilitate scanning by the mobile unit 58 as will subsequently be described.

As will hereinafter be described in greater detail, channel assignment to the various zones need not be fixed, but rather, may be varied dynamically or adaptively in accordance with user density. For example, it may be dynamically determined that at some time user density is particularly high in an area generally indicated at 62 in FIG. 3. The area 64 is served by the base stations in zones Z1, Z6 and Z7 and the total of 12 channels available in these three areas may not be sufficient to accommodate the increased user density. Under such conditions, additional channels may be dynamically assigned for use in zones Z1, Z6 and Z7 in the area 64 during this peak period of user density.

This adaptive or dynamic assignment of channels results in a decreased number of available channels in other small zones and an increase in the number of available channels in the zones serving the area 64 in which these channels are needed to accommodate the increased user density. The assignment of channels for use in the various zones of FIGS. 3–6 may be adaptively or dynamically varied in this manner throughout the entire service area to satisfy varying user requirements.

If a zone is assigned additional channels during a peak period; the base station in that zone must be provided with sufficient fixed frequency and/or remotely tunable transmitting and receiving equipment to make use of the additional channels. Moreover, the dynamic assignment of channels must be accomplished on a ninterfering basis, i.e., sufficient separation must be provided between zones using the same channels. In this latter connection, the central control termainl 50 of FIG. 1 may determine in which zones channels may be reused from calculations based upon a predetermined desired minimum separation between base stations operating at the same frequency, e.g., from calculations based upon the previously discussed separation distances in terms of number of zones or zone radii between base stations.

E. Inter-Zone Channel Borrowing

In accordance with the present invention, the propagation and reception patterns of the transmitters and receivers in the zones 60 may overlap by an amount sufficient to permit a mobile unit in one zone to establish telephonic communications through a base station in at least one adjacent zone. For example, and with reference to FIG. 7, a zone 60C may be adjacent six similar zones 60D–60I. The respective propagation patterns 62C–62I of the zones 60C–60I may overlap and cover a portion of each adjacent zone so that, for example, a mobile unit 58C in the zone 60C may establish communications through the base station in the zone 60D or in the zone 60I as well as through the base station in the zone 60C.

Assuming, for example, that the channels 1–3 are assigned to the base station in the zone 60C and that channel 1 is the control channel in the zone 60C, the mobile unit may monitor the control channel 1 if this control channel is available. However, as will hereinafter be described, the control channel assigned to the base station in the zone 60C may be in use as a talking channel. Under such circumstances, the mobile unit 58C may search for and monitor an available control channel from the base station in either the zone 60D or 60I.

If the mobile unit 58C locks onto the control channel transmitted from the base station serving zone 60D, for example, the mobile unit 58C (although actually located in zone 60C) may thereafter become engaged in a call through signaling over the control channel from the base station in zone 60D. Assuming that no talking channels are available in zone 60D when a call is being established to the mobile unit 58C, the central control unit 50 of FIG. 1 may assign an available talking channel from the adjacent zone 60I to the call as was described in connection with FIGS. 2A–2F. As an alternative, or if a talking channel is not available in any of the adjacent zones providing coerage of the area in which the mobile unit 58C is located, the control channel from the base station in the zone 60D may be asssigned to he call as a talking channel.

If can be seen that this channel sharing or borrowing technique provides great flexibility in situations of varying user density in the zones 60C–60I through the provision of the overlapping propagation patterns of 62C–62I. Borrowing of channels in this manner can be repeated as long as channels are available in adjacent zones providing additional capacity to meet peak demands without requiring as much base station equipment in each zone as would otherwise be required.

F. Call Maintenance During Inter-Zone Travel

In accordance with the invention, provision is made for maintaining service to a mobile unit 58 which moves from one zone or base station area 60 to another while engaged in a call. Two alternative techniques are contemplated and either may be used in various implementations of the system.

Figure 8:
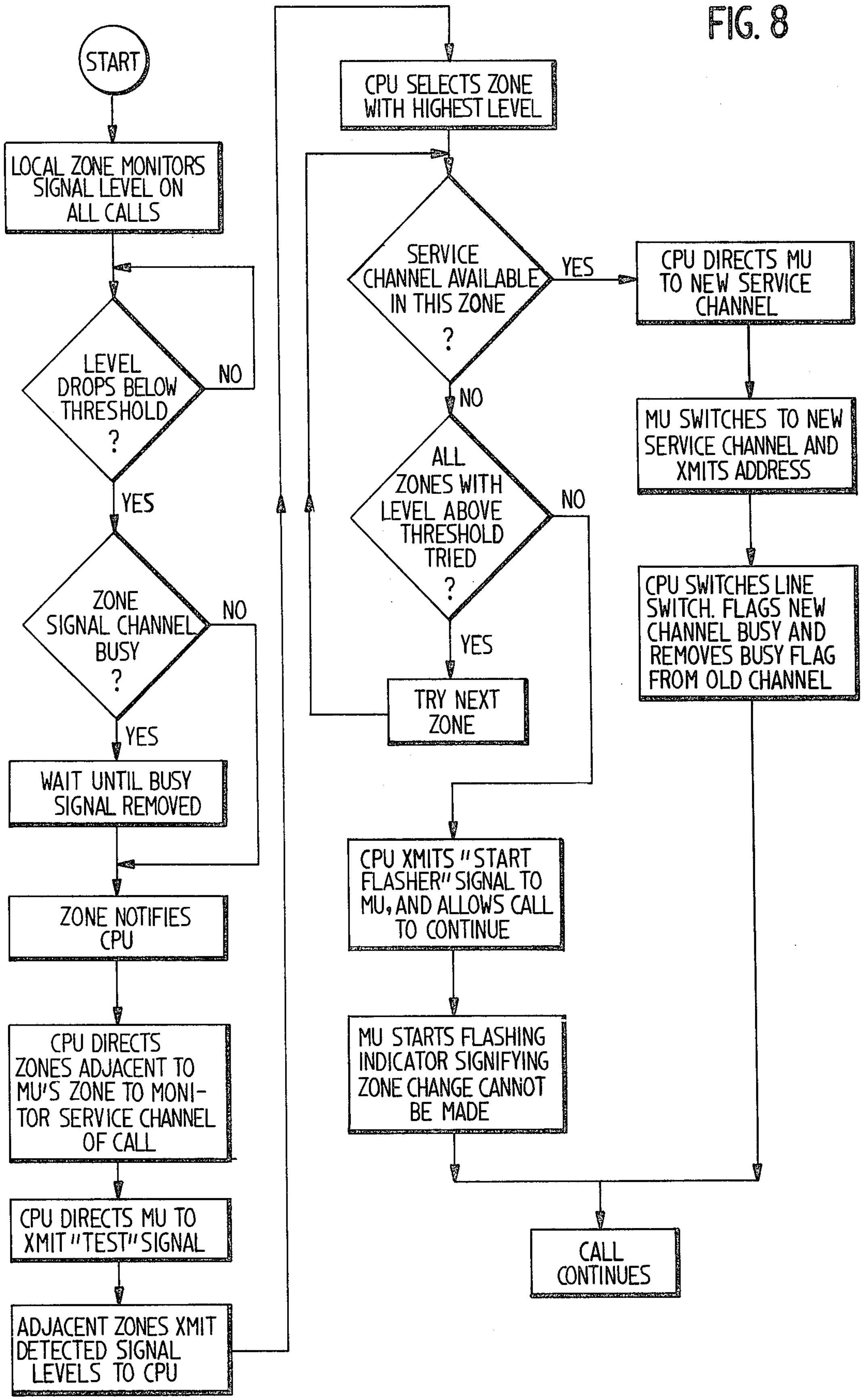
FIG. 8 is a flow diagram illustrating one embodiment of a call maintenance technique of the system of FIG. 1.

With continued reference to FIG. 1 and with reference now to FIG. 8 wherein a first embodiment of the call maintenance technique according to the present invention is functionally illustrated, each call may be monitored at the base station through which the call is established by monitirong the level of the signal received from a mobile unit 58 engaged in a call. For example, in FIG. 1 the mobile unit 58A may be engaged in a call with a subscriber of the wire line telephone system 52 through the transmitting and receiving equipment at the base station 54A. The receiver at the base station 54A employed for the mobile to base station communication link (e.g., the up-link of the assigned duplex communication channel) may provide an indication of received signal strength and when the received signal strength falls below a predetermined threshold, a voting process may be initiated.

The voting process may be initiated by a base station 54 through notification of the central processing unit (CPU) that the received signal level has dropped below the predetermined threshold. The CPU may then direct each of the base stations in the zones adjacent to the zone serving the call to monitor the service or talking channel assigned to the call. to monitor the call in this manner, monitoring receivers may be provided at each base station solely for this monitoring purpose, or the receivers employed at the base s station 54 for serving and establishing calls may be utilized for the monitoring function. These alternative monitoring techniques will be sescribed he hereinafter in greater detail in connection with the description of the base stations 54. It should be noted, however, that the receivers ordinarily employed at the base statons5 54 for serving and establishing calls may also be employed for this monitoring function if all receivers at a base station in an adjacent zone are in use when a vote is initiated, the call cannot be monitored. However, the lack of equipment to monitor the call in that zone does not adversely affect the vote since the call cannot be transferred to the base station in that zone due to the lack of afailable equipment to serve the call.

To monitor a call, the monitoring receiver or an available communication receiver at each of the base stations in the adjacent zones may be tuned to the frequency of the duplex communication channel used by the mobile unit for the mobile-to-base station communication link. The central processing unit may direct the appropriate base station receiver to the appropriate frequency over the control and signaling link between the central control terminal 50 and the base stations 54. The central processing unit may thereafter direct the mobile unit to transmit a "test" signal and the signal levels detected by the base station receivers in the adjacent zones may be transmitted to the CPU over the signaling and control lines. The CPU may then select the zone in which the highest signal level was received and, if a service channel is available in that zone, the CPU may direct the mobile unit to that service channel. The mobile unit then switches to the new service channel and trasmits its address, and the CPU connects the mobile unit to the other party, flags the new service channel as being busy and removes the busy flag from the old service channel.

If a service channel is not available in the zone selected as having the highest received signal level, all other zones with received signal levels above the predetermined threshold are checked for available service channels until a new service channel is located and assigned to the call as described above. If no service channel is avaiable after all possible zones have been checked, the central processing unit may transmit a "start flasher" signal to the mobile unit and allow the call to continue. A flashing indicator signifying that a zone change cannot be made may be energized in the mobile unit in response to the start flasher signal to notify the mobile unit operator of the impending loss of the call so that the operator may either quickly complete the call or halt the vehicle so that the cell may be continued without loss.

II. Control Signal Channel Data Format

As was previously discussed, all initial control and moonitoring functions between the mobile units and the base stations are preferably conducted over designated control signal channels and voice communication is normally conducted over service or talking channels. In accordance with the invention, the control signal and service channels preferably comprise small groups or subsets of the larger group or set of channels avaialble in the system.

Figure 9A:
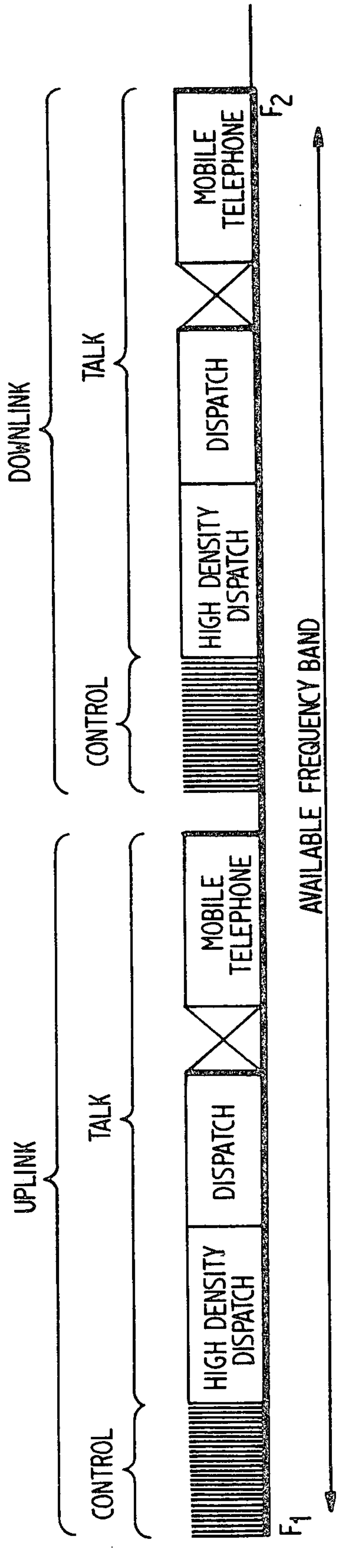
FIGS. 9A and 9B are diagrammatic illustrations of the preferred embodiment of the signaling format of the system of FIG. 1.

For example, as is illustrated in FIG. 9A, an available frequency band between frequencies $F_1$ and $F_2$ assigned to the system may be divided into an up-link for signaling and talking in one direction and a down-link for signaling and talking in the other direction. A first group or subset of available channels in the assigned frequency band may be designated as control signal channels (each with both an up-link and a down-link) and may be used solely for control signaling and monitoring purposes unless, as was previously described, all available talking channels are in use. The up-links and down-links of the talking channels may include frequency subsets designated for use in various types of services such as high density dispatch, normal dispatch and mobile telephone use.

While the control channels may be marked for a specific system by a predetermined indentifier, the talking channels may be shared among several systems or among different system services in the same system. Since the control channels comprise only a small subset of the available set of channels in the available frequency band, a mobile unit need only scan a small portion of the total frequency band when searching for a control signal channel.

In a second embodiment of the call maintenance techniques of the invention, the mobile unit 58 receivers may contain a signal level detector which may initiate the necessary functional sequence to obtain service from another base station 54 when the received signal level has dropped below an acceptable minimum for a predetermined period of time. The functional sequence initiated by the mobile unit 58 may commence with a search by the mobile unit for another acceptable control signal channel. When an acceptable control signal channel is found, the mobile unit submits a request for service and the centrala control terminal 50 receives this request for service including the mobile unit's address. Since the request is received through a base station in zone 60 other than the one in which that mobile unit was previously engaged in the call, the CPU recognizes the service request as a zone change request and performs the necessary frequency channel assignment and line switching to supply service to the mobile unit 58 from the new zone 60 which is capable of supplying acceptable service to the mobile unit.

In both of the foregoing embodiments, the mobile unit receiver and transmitter must be capable of being changed in frequency upon receipt of a digitally coded message from the control terminal via a base station. This capability may be referred to as remote channel command capability. Of course, use may be continued on the same channel from zone-to-zone without remote channel command capability if the same channel is available in the adjacent zone into which the mobile unit is moving and if interference would not occur if the channel serving the call is employed in the adjacent zone.

Within a system providing both mobile telephone and dispatch service, channels may be diverted from one service to the other or pooled as required to maintain the desired level of service while usage fluctuates. Where multiple systems within the same urban area co-exist in the same band, the control channel assignments may serve to define the spectrum portions available to each system operator.

Figure 9B:
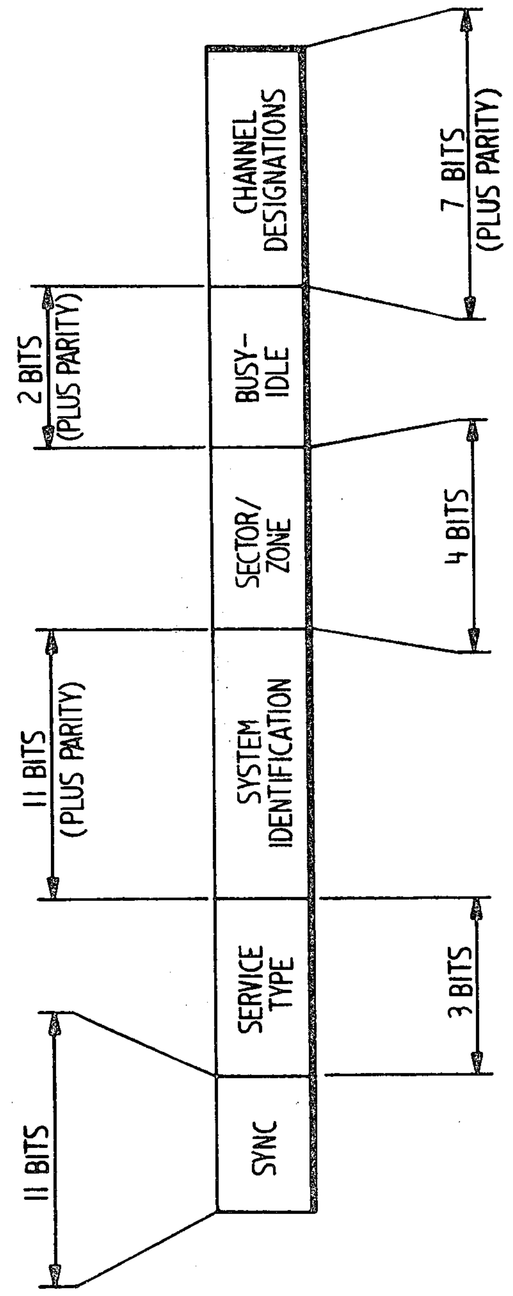

The preferred signal format for the control signal channel identifier illustrated in FIG. 9B, permits users with the same mobile equipment to gain access to several systems either on a regular subscriber basis or as "roamers," i.e., mobile units which may receive service systems (or zones) other than their home systems (or zones). Referring now to FIG. 9B, the signal format preferably includes a series of digital signals each comprising a predetermined plural binary bit pattern. Each transmission on the control signal channel may include an initial sync pattern which may be followed by one or more plural binary bit patterns indicating service type (e.g., telephone, dispatch, digital data only, restricted access and the like), system identification, (e.g., a signal identifying the home system of the mobile unit), sector/zone identification, busy-idle status and control channel designations.

In the illustrated embodiment of the signal format of the present invention, the control signal channel identifier may comprise 41 binary bits as is indicated in FIG. 9B. The first eleven bits may provide a synchronization signal to synchronize the mobile units for receipt of the subsequent digital signals. The service type pattern may be a three bit signal, the system identification pattern may be a twelve bit signal (eleven information bits plus a parity bit), the sector/zone pattern may be a four bit signal, the busy-idle pattern may be three bit signal (two information and one parity) and the channel designation pattern may be an eight bit signal (seven information plus one parity). Using the plural bit patterns of FIg. 9B, up to 2,048 systems may be identified and up to 15 sectors or zones may be identified per system and up to 128 channels may be designated as control channels. Up to eight service types may be designated and the two bits plus one parity bit used to indicate that the control channel is eight busy or idle provide redundancy and thus greater reliability.

If desired, up to 128 different channels may be designated as control channels by the eight bit channel designation pattern so that a mobile unit may store the identities of the designated control channels and limit its subsequent search for control channels to those sesignated and stored. Since the designation of control signal channels may change as a system grows or is subdivided as was previously described, the transmission and temporary storage of control channel designation data is preferred over permanent storage of this data by the mobile units.

In operation, the identifier signal may be continuously broadcast over the base-to-mobile link of the control channel to identify the system and the type of service it provides. When a call is to be placed to a mobile unit 58, the broadcast of the identifier signal may be momentarily interrupted for a minimal period of time sufficient to contact the mobile unit, receive a response and assign the call to a talking channel as will herinafter be described. Where several systems are operating in the same area, a mobile unit may discriminate among the systems on the basis of the system identifier and may seek its home system. If a control signal channel for the home system of the mobilt unit is not available, the mobile unit may next seek a system of the same type to enter as a roamer. Some systems such as common user systems may not admit roamers in which case the service type code on the control signal channel may provide an appropriate indication thereof and deny access to that particular control signal channel.

Within a system, certain sectors or zones may be designated as being accessible only on an individual basis. If a subscriber buys service only in one portion of the service area, e.g., in a suburban area or in only one part of a city, the sector/zone identification pattern permits the mobile unit to acquire a control signal channel only in the authorized area. The channel designation information may be utilized, if desired, to permit a mobile unit to receive and store in memory the frequency designations of all other control channels serving the same system. This information may considerably increase the speed of a mobile unit in shifting to another control channel in another zone within the same system as it moves out of range of a control signal channel previously acquired. The designation of 19 channels, for example, may require as little as one-third of a second at 2,400 bits per second signaling rate.

Also illustrated in the format of FIG. 9B is a busy-idle pattern indicating the status of the communication link from the mobile unit to the base station, e.g., the up-link. This busy idle information prevents one mobile unit from requesting service on the up-link after another mobile unit has already initiated a call-up on the same control signal channel.

The control signal channel identifier format illustrated in FIG. 9B and discussed above provides system identifying transmission on each control channel. Signal exchanged over the control and service channels in requesting and establishing a call may take the form illustrated in the following table.

TABLE II

| | CONTROL TERMINAL TRANSMISSION | MOBILE UNIT TRANSMISSION |
|---|---|---|
| CALL FROM TELEPHONE TO MOBILE UNIT | | |
| LOCATING SIGNAL, SENT ON SIGNAL (CONTROL | | |

TABLE II – Continued

| | CONTROL TERMINAL TRANSMISSION | | | | MOBILE UNIT TRANSMISSION | | |
|---|---|---|---|---|---|---|---|
| CHANNEL TO ALL ZONES (ACTUALLY CHANNEL) | | SYNC | CALLED ADDRESS | | | | |
| SEPARATE SIGNAL CHANNEL FREQUENCY FOR EACH ZONE/CHANNEL GROUP | | | | | | | |
| RESPONSE FROM CALLED UNIT THROUGH NEAREST ZONE BASE STATION (A REPEAT OF THE TRANSMISSION RECEIVED) | | | | | (CONTROL CHANNEL) | sync | OWN ADDRESS |
| INSTRUCTIONS TO CALLED UNIT | (CONTROL) CHANNEL) | SYNC | CALLED ADDRESS | CHANNEL ASSIGNMENT | | | |
| GO-AHEAD: CALL ANSWERED BY MOBILE UNIT (OWN ADDRESS) (GO-AHEAD SIGNAL USED TO START TIMING OF BILLING PERIOD) | | | | | (TALKING CHANNEL) | SYNC | OWN ADDRESS |
| END OF CALL: ON-HOOK-HANG-UP SIGNAL | | | | | (TALKING CHANNEL) | SYNC | CALL TERMINATE |
| CALL FROM MOBILE TO TELEPHONE OR OTHER MOBILE USER: | | | | | | | |
| INITIAL CALL-UP TO NEAREST ZONE BASE STATION | | | | | (CONTROL CHANNEL) | SYNC | OWN ADDRESS |
| RECEIVE CHANNEL ASSIGNMENT FROM CONTROL TERMINAL | (CONTROL CHANNEL) | SYNC | CALLING ADDRESS | CHANNEL ASSIGNMENT | | | |
| SEND CALL ADDRESS AND OWN ADDRESS | | | | | (TALKING CHANNEL) | SYNC | CALLED ADDRESS |
| CALL STATUS INDICATIONS RETURNED TO CALLING UNIT | (TALKING CHANNEL) | RINGBACK (ANALOG); BUSY (ANALOG); CALLED PARTY ANSWER | | | | | |
| END OF CALL: ON-HOOK-HANG-UP SIGNAL | | | | | (TALKING CHANNEL) | SYNC | CALL TERMINATE |

The signaling format shown in Table II, above, illustrates signaling exchange for calls both to and from mobile units. In accordance with the signal format of Table II, calls to the mobile units are established by three transmissions on the coontol signal channel (only two transmissions on the basw-to-mobile link, e.g., the down-link). Calls from the mobile units may be established by only two transmissions on the control signal channel (one transmission on each link).

In placing a call from a fixed telephone to a mobile unit in accordance with the sequence illustrated in Table II, a locating signal (a call-up message) is first broadcast on the control signal channel serving the zone in which the mobile unit is located if the mobile unit is known to be in a particular zone. If the zone location of the mobile unit is unknown the locating signal may be broadcast on all control signal channels in all zones. The mobile unit then responds on the control signal channel with its own address and the control terminal directs the called mobile unit to a talking channel. The remainder of the signaling may be accomplished on the talking channel and may include a go-ahead signal indicating that the called mobile unit is tuned to the assigned talking channel and is ready to accept the call. When the call is terminated, the mobile unit may then transmit a call terminate signal over the talking channel when the mobile unit is on-hook.

A call from a mobile unit to a fixed telephone or other mobile unit may be initiated through the transmission of the address of the calling mobile unit over the control channel. The control terminal receives the address of the calling mobile unit and returns this address together with a channel assignment over the control signal channel over which the initial signaling from the calling mobile unit occurred. The calling mobile unit then is tuned to the assigned talking channel and transmits the called address. Thereafter, the central control unit either transmits over the talking channel an appropriate supervisory signal, e.g., a busy signal or a ring back signal. When the call is terminated, the mobile unit boradcasts a call terminate signal on the talking channel indicating that the mobile unit is on-hook.

As was previously mentioned, the call-up signaling format may comprise plural binary bit, serial digital signals similar to those described in connection with FIG. 9B. The sync signal may be, for example, a 17-bit Barker code frame sync pattern and may preceded each exchange of call-up information on the control signal and talking channels. For convenience in encoding, decoding and assembly, the calling and called addresses may comprises a 48-bit BOSE-CHAUDHURI-HOCQUENGHEM (BCH) word with each address including 24 information bits. In a nationwide adressing plan, the 24 informatioin bits provide ten million diala-ble addresses and the 48-bit BCH code provides error correcting coding to minimize lost calls caused by signaling errors.

The same signal format may be utilized for the channel assignment portion of the signaling format, i.e., a 48bit BCH code, except that ten information bits may be provided. In a system having approximately 1,000 available channels, for example, ten bits suffice for a channel designation code while 24 bits are available in the 48-bit BCH code. This permits channel assignment redundancy for added reliability of signaling. The call terminate signal may be any suitable plural binary bit digital signal differing from the other codes and indicating the termination of a call.

In employing only one full duplex control signal channel, there is some probability that a call-up may already be in progress when a call is bordcast to a mobile unit in the same zone. The latter called mobile unit would, under these circumstances, not receive the broadcast call so the central control unit repeats the broadcast if there is no response on the first or second attempt at was previously described in connection with FIG. 2. To determine the signal loading in a 57-zone system using repeating patterns of 19 zones as was previously described in connection with FIG. 5, the following assumptions may be made:

TABLE III

Signaling Capacity Assumptions

| | |
|---|---|
| Number of Frequency Sets | 19 |
| Frequency Reuse | 3 Times |
| Number of Cells in System | 57 |
| Mean Length of Telephone Call | 2.5 Minutes |
| Mean Length of Dispatch Call | 0.25 Minute |
| Traffic Load Per User in Busy Hour | 1/80 Erlangs |
| Proportion of Telephone Mobiles | 50% |
| Proportion of Dispatch Mobiles | 50% |
| Ratio of Calls from Mobiles to Calls to Mobiles | 3:1 |
| Fraction of Calls to Mobiles Requiring Address Repeats | ¼ |
| Average Number of Repeats Required | 2 |
| Signaling Ratio, Calls from Mobiles to Calls to Mobiles | 3:1 ½ or 2:1 |
| Average Time Allowed for Idle Control Signal to Broadcast the Designations of 19 Control Channels (Interrupted for Calls) | 15 Seconds |
| Control Channel Time Occupied Per Call | |
| Type 1 (Mobile Originated) | 0.094 Second |
| Type 2 (Landline Originated) | 0.101 Second |
| Time to Transmit One System Identifier Pattern | 0.017 Second |

With the above assumptions and assumptions and assuming even loading throughout the system, the system capacity is in excess of 20,000 users or over 3,500 users per zone in the exemplary 57-zone system. With a two mile (3.2 kilometer) zone radius, the 57-zone system is sufficient to cover 590 square miles (1,528 square kilometers) which is sufficient coverage for most metropolitan areas. The number of users per zone may be kept below the 3,500 figure to avoid blocking on the control channel by zone subdivision, i.e., by providing several smaller zones instead of one large one, as was previously described in connection with FIG. 7, when user density exceeds 3,500.

Depending on the peak-to-average load factors, the capacity of a cell or zone may be between 2,500 and 3,000 users considering the control signal channel capacity only. For a 0.05 blocking probability in obtaining a talking channel, 50 talking channels will be required in each zone. Thus, with the control signal channel included, 51 channels in each of the 19 zones, or 969 channels, may be made available for the total system to accomplish the above results. Since it is contemplated that fewer than this number of channels will be available in the 900 MHz band, it can be concluded that for the above assumptions, the capacity of the control signal channel using the signal formats previously described is more than adequate for the available channels at the relatively low blocking probability assumed.

III. Central Control Terminal

The central control terminal 50 of FIG. 1 is illustrated in greater detail in the functional block diagram of FIG. 9.

Referring now to FIG. 9, each of the trunk lines 53 from the wire line telphone system 52 of FIG. 1 may be connected through a suitable conventional trunk interface module (TIM) 100 to a suitable conventional matrix switch 102. Input/output lines 102A from the matrix switch 102 may be each connected through a conventional digital signal detector (DSD) 104 to associated commercially installed telphone lines 55 for communication between the centrral control terminal 50 and the base stations 54 as was previously described in connection with FIG. 1. The lines 55 connected through the DSD's 104 to the matrix switch 102 by way of the lines 102A may serve the portions of each talking channel between the central control terminal 50 and the base stations 54 and are therefore referred to herein as the taling links or communication paths. An input/output line 102B (hereinafter the "call intercept bus") may be connected between the matrix switch 102 and an assistance operator position 106 such as a switchboard so than an operator may intercept calls and provide necessary assistance. The operator position or mobile operator console 106 may alternatively be connected to the central control terminal through the TIM's 100.

A suitable conventional central processing unit (CPU) 108 may control the operation of the central control terminal 50 as will hereinafter be described in connection with FIGS. 10A – 10G. The CPU may generate various control and scanning signals CONT for application through a suitable conventional switch-over control circuit 110 to various control circuits described hereinafter. The control signals CONT generated by the CPU 108 may include a control and signaling link scan control signal SCN1, a tone control signal TNC, a digital signal detector scan control signal SCN2, a matrix switch control signal MSWC, a voice announcement control signal VAC, a trunk interface module scan control signal SCN3, an input/output control signal I/OC and a recorder control signal RCC.

The scan control signal SCN1 may be applied through the switch-over control circuit 110 to a suitable scanner and controller 112. Data signals DATA may be transmitted over the telephone lines 55 between the CPU 108 and the base stations 54 by waya of the scanner and controller 112 and through a plurality of mdems 116 each associated with one pair of the lines 55 under the control of the scan signal SCN1. Each link or transmissison path between the CPU 108 and each of the base stations 54 which is selectively scanned and controlled by the scanner and controller 112 and is referred to herein as the control and signaling link. One two-way control and signaling link may be provided over a suitable transmission line 55 such as a two-wire pair of the telephone lines 55 to each of the base stations for control of each base station and for signaling over each control signal channel serving a zone.

The tone control signal TNC may be applied through the switch-over control circuit 110 to a suitable contnroller 118 to control the selection of a plurality of TONE output signals from suitable conventional tone signal generators 120. The selected TONE signal from the tone signal generators 120 may be applied to each of the DSDs 104 and may be selected for transmission to the base stations 54 via one of the telephone lines 55 by a suitable conventional scanner and controller 122. The selected TONE signal may also be applied to each of the trunk interface modules 100 and may be selected for transmission to the wire line telephone system 52 by way of one of the trunk lines 53 by a suitable conventional scanner and controller 130.

The digital signal detector scan control signal SCN2 generated by the CPU 108 may be applied through the switch-over control circuit 110 to the scanner and controller 122. Call request data signals MCRD generated by mobile units and by the CPU 108 may be transmitted between the CPU 108 and the base stations 54 over the telephone lines 55 serving the talking channels. The call request signals MCRD transmitted from the mobile units may be detected by DSDs 104 and applied to the CPU 108 under the control of the scanner and controller 122. The call request signals MCRD generated by the CPU 108 may be transmitted to the appropriate bas stations 54 by way of the DSD 104 connected to the appropriate base station transmitting equipment under the control of the scanner and controller 122.

The matrix switch control signal MSWC may be applied through the switch-over control circuit 110 to a suitable interface and control circuit 124. Switch control control signals SWC may be generated by the interface and control circuit 124 in response to the MSWC signal and may be applied to the matrix switch 102 to the selective interconnection of the trunk lines 53 to the telephone lines 55 through the trunk interface modules 100 and the DSDs 104. The voice announcement control signal VAC from the switch-over control 110 may be applied to a suitable voice announcement unit 128 to the matrix switch 102. The voice announcements selectively applied to the matrix switch 102 may be selectively connected to either the trunk lines 53 or the lines 55 to the base stations in response to the SWC signals to thereby appropriate voice announcements to the system subscribers.

The trunk interface module (TIM) scan control signal SCN3 may be applied through the switch-over control circuit 110 to the scanner and controller 130. The scanner and controller 130 may selectively transmit wire line telephone system call request data or signals FCRD between the TIMS 100 and the central processing unit 108 in response to the trunk interface module control scan signal SCN3. Thus, for example, when a call request from a fixed or wire line telephone is detected by one of the TIMs 100, the detected call request signal FCRD may be selectively transmitted to the CPU 108 when the appropriate trunk interface module is scanned by the scanner and controller 130 under the control of the SCN3 signal. Moreover, selected TONE signals from the tone signal generators 120 may be selectively applied to the trunk lines 53 under the control of the scannerand controller 130.

The input/output control signal I/OC from the switch-over control circuit 110 may be applied to a suitable conventional controller 131 to selectively control the transmission of input/output signals I/O between the CPU 108 and a suitable conventional input/output unit 132 such as a teletype writter. The recorder control signal BCC from the switch-over control circuit 110 may be applied to another conventional controller 134 to selectively control the recording of billing and traffic data signals. BTD by a suitable conventional recorder 136 such as a tape deck.

A back-up CPU 138 may be provided to provide system redundancy in the event of failure of the CPU 108. The back-up CPU 138 may be connected to the various circuits at the central control terminal 50 in the same manner as the CPU 108 and may take control of the operation of the central control terminal in the event that the CPU 108 fails. In addition, a suitable conventional Julian clock 140 may be provided if desired to supplu Julian time information JCL to the CPUs 108 and 138 as desired.

Figure 10:
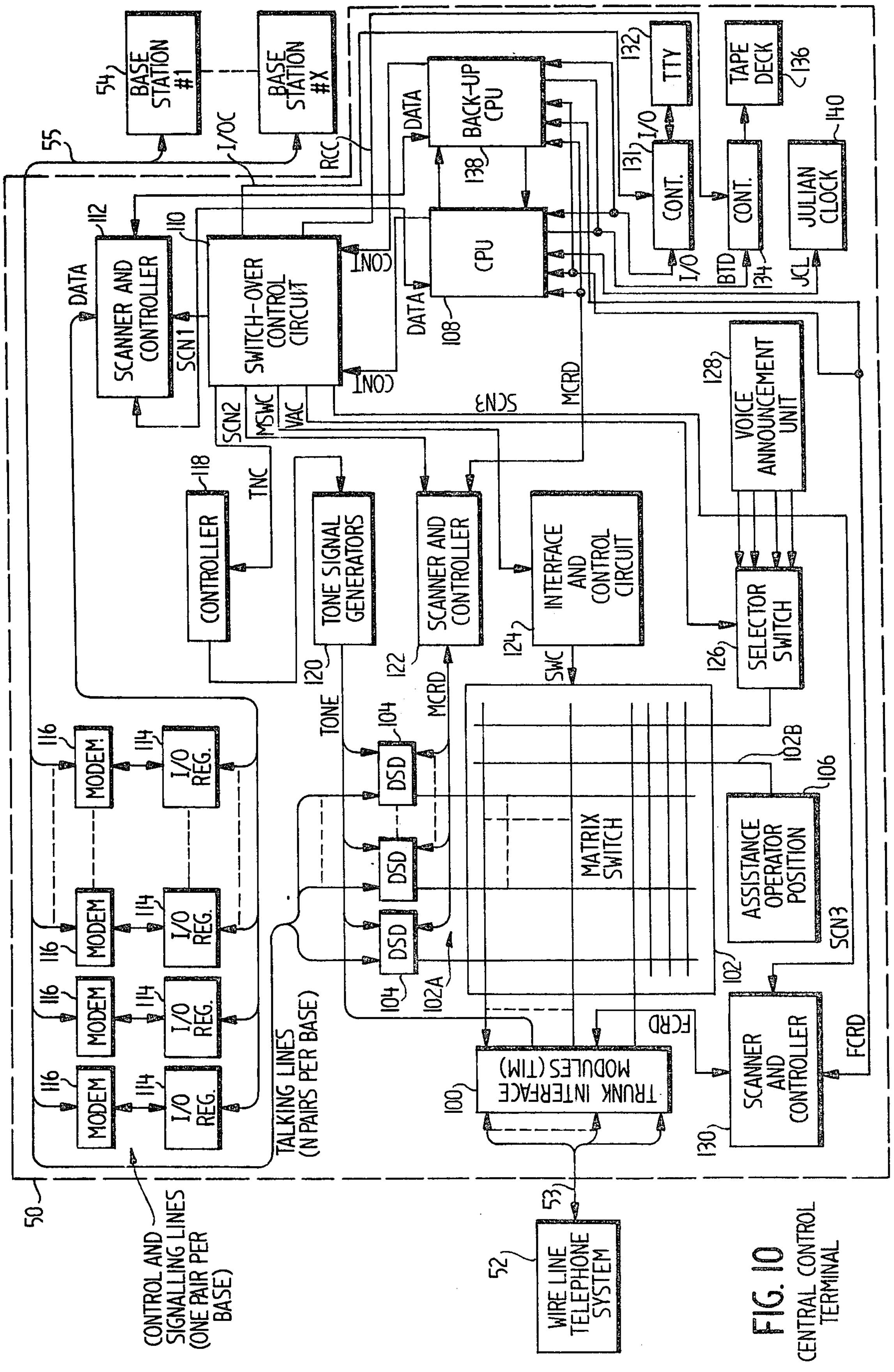
FIG. 10 is a functional block diagram of one embodiment of the central control terminal of FIG. 1.
Figure 10A:
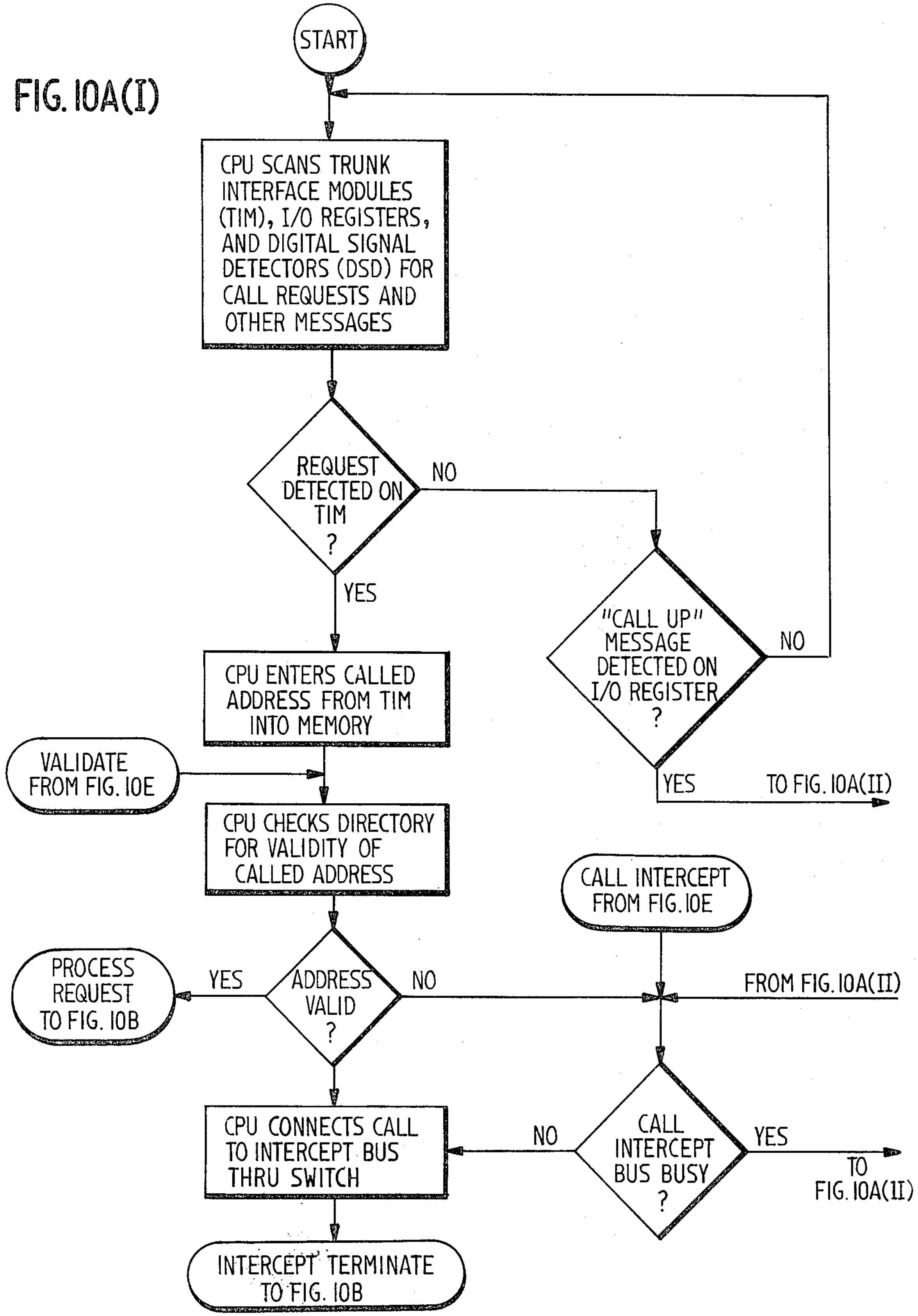
FIGS. 10A–10G are flow diagrams illustrating the operation of the central control terminal of FIG. 10.

The operation of the central control terminal 50 may be more clearly understood with reference both to FIG. 10 and to FIGS. 10A–10G. Referring now to FIGS 10 and 10A, the central processing unit 108 may selectively scan the TIMs 100, the I/O registers 114 for the designated control channels and the DSDs 104 associated with the talking channels through the application of scan control signals SCN3, SCN1 and SCN2 to the respective scanner and controllers 130, 112 and 122. By scanning TIMs 100 and the I/O registers 114 in this manner, the CPU 108 may detect call request data FCRD and DATA from either the fixed telephone of the wire line telephone system 52 or the mobile units 58, respectively. Messages transmitted from the mobile units over the talking channels, e.g., call terminalte and acknowledge messages, may be detected by the ditital signal detectors 104 and applied to the CPU 108 when the detectors 104 are scanned.

If a call request signal FCRD from the wire line telephone system 52 is detected on one of the trunk interface modules 100, the detected call request signal FCRD including the called address is entered into memory by the CPU 108 when scanned by the scanner and controller 130. The CPU 108 may initiate a called address VALIDATE routine and check a directory for validity of the stored called address. If the called address is not valid a CALL INTERCEPT routine may be initiated. If the call address is valid, a PROCESS REQUEST routine may be initiated as is describred hereinafter in connection with FIG. 10B.

The CALL INTERCEPT routine may, for example, involve connecting the caller to the assistance operator position 106 by connecting the appropriate seized trunk line 53 to the call intercept bus 102B if the call intercept bus is not busy. The call may be thereafter placed by the call intercept operator, if possible, or other appropriate assistance may be rendered prior to commencing an INTERCEPT TERMINATE routine described hereinafter in connection with FIG. 10B.

If the call intercept bus is busy the CPU 108 may enter the call into a call intercept queue and initiate a ring back tone to the caller through selective application of an appropriate one of the TONE signals from the tone signal generators 120 to the TIM 100 serving the seized trunk line 53. The ring back TONE signal may be selected by the tone signal generator controller 118 in response to the TNC signal applied thereto and the ring back tone may continue until the call intercpet bus is no longer busy. Thereafter, the CPU 108 may selectively connect the call to the assistance or intercept operator through the matrix switch 102.

Figure 10B:
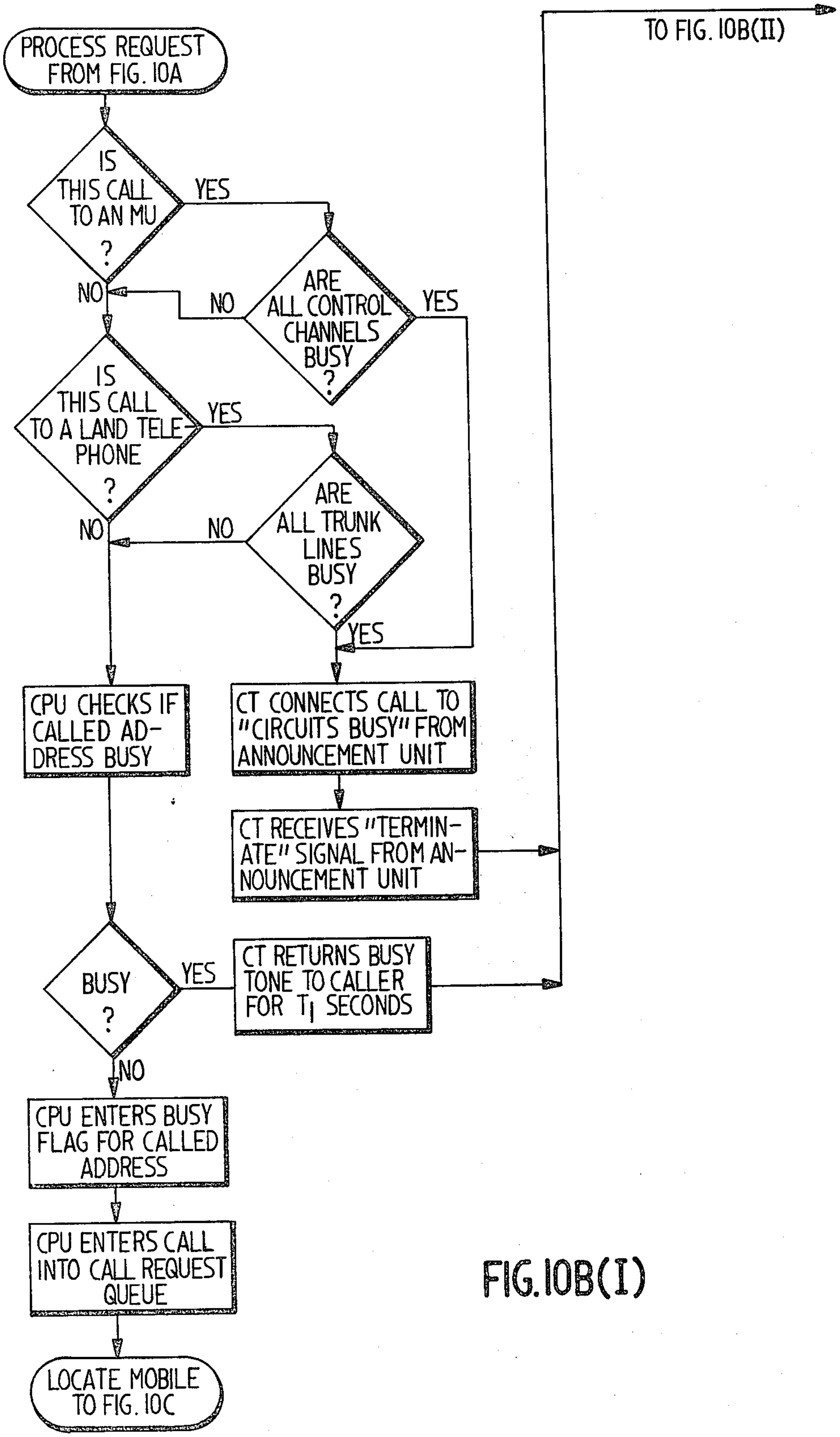

With continued reference to FIG. 10 and wiwith reference now to FIG. 10B, the INTERCEPT TERMINATE routine may be initiated by the assistance operator and the call disconnected from the intercept bus 102B when the CPU 108 detects a terminate signal from the assistance operator or the voice annoucement unit 128. The terminate signal may be initiated by the assistance operator and detected by either an appropriate one of the DSDs 104 or the trunk interface modules 100. The detected terminate signal may then be applied to the CPU 108 during the scanning of the detectors 104 and modules 100 as was previously described.

If the intercepted calls was from a fixed telephone in the wire line telephone system 52, the CPU detects the assistance operator initiated terminate signal and directs the appropriate trunk interface module 100 to disconnect the trunk line over which the call request was received. The CPU then continues to scan as was previously described in connection with FIG. 10A. If the intercepted call was from a mobile unit and either the called or calling address was invalid, the CPU determines if the call-up was processed on a talking or control channel (after removing the busy flag from the calling address where the calling address was invalid).

If the call-up was processed on a control channel, i.e., the control channel was assigned as a talking chennel, the CPU 018 removes the busy flag or signal from that control channel. The CPU 108 then transmits a control signal on message over the appropriate control and the signaling link to the base station serving the call on that control channel before continuing to scan the trunk interface modules 100, the I/O registers 114 and the digital signal detectors 104 as in FIG. 10A. If the call-up was processed on talking chennel, the CPU 108 removes the busy flag from the talking channel and transmits a transmitter off message to the transmitter serving that channel at the appropriate base station before continuing to scan the TIMs 100, the I/O registers 114 and the DSDs 104. The transmitter off message may be transmitted to the appropriate base station over the control and signaling link associated with that base station, i.e., by way of the scanner and controller 112 and the appropriate one of the the I/O registers 114 and modems 116.

With continued reference to FIG. 10 and with reference again to FIG. 10A, if the call-up message or call request is not detected on a trunk interface module 100 but rather received over a control signal channel associated with a base station, the call-up message is detected on an I/O register 114 and the control terminal transmits a control signal off message to the base station transmitting on the control channel over which the call-up was received. The control signal off signal may be transmitted to the base station over an appropriate one of the control and signaling lines 55 selected by the scanner and controller 112 and may change the control channel format to provide an indication to all other mobile units that the control channel is busy. The CPU 108 then enters into memory the called and calling addresses from the I/O register 114 receiving the call request as the DATA signal.

After the calling address from the I/O register 114 of the control and signaling link serving the appropriate base station are entered into the central processing unit's memory through the scanner and controller 112, a SELECT CHANNEL routine selects a talking channel for assignment to the call over the appropriate control and signaling link if a talking channel is available. The CPU enters a busy flag in memory for the selected talking channel and turns the appropriate talking channel transmitter on by transmitting a transmitter on message to the base station over the control and signaling lines. If a talking channel is not available in the appropriate zone or an adjacent zone, the CPU may enter a busy flag in memory for the control signal channel in that zone and the control signal channel may be assigned as the talking channel in that zone if desired.

After a talking channel (or the control channel) is selected to serve the call, an ASSIGN CHANNEL routine illustrated in FIG. 10 E is initiated by the CPU 108. With continued reference to FIG. 10 and with reference now to FIG. 10E, the CPU 108 enters a channel assignment message in the channel assignment queue indicating which channel which channel is to be used in that zone for talking and thereafter transmits the channel assignment message to the base station serving that zone. The channel assignment message is broadcast by the base station over the control channel and, if a response from the mobile unit in the form of an acknowledge message is not received by the central control terminal over the assigned talking channel, the channel assignment message may be repeated up to two more times. If the acknowledge message isreceived after broadcast of the initial channel assignment message or after the repeated channel assignment messages from the base station serving the zone in which the call-up was received, the CPU determines if the acknowledge message was received on the proper channel, i.e., the assigned talking channel. If the acknowledge message is received on the wrong talking channel, the channel assignment message is repeated on the talking channel on which the acknowledge message was received until the acknowledge message is received on the proper channel.

Figure 10C:
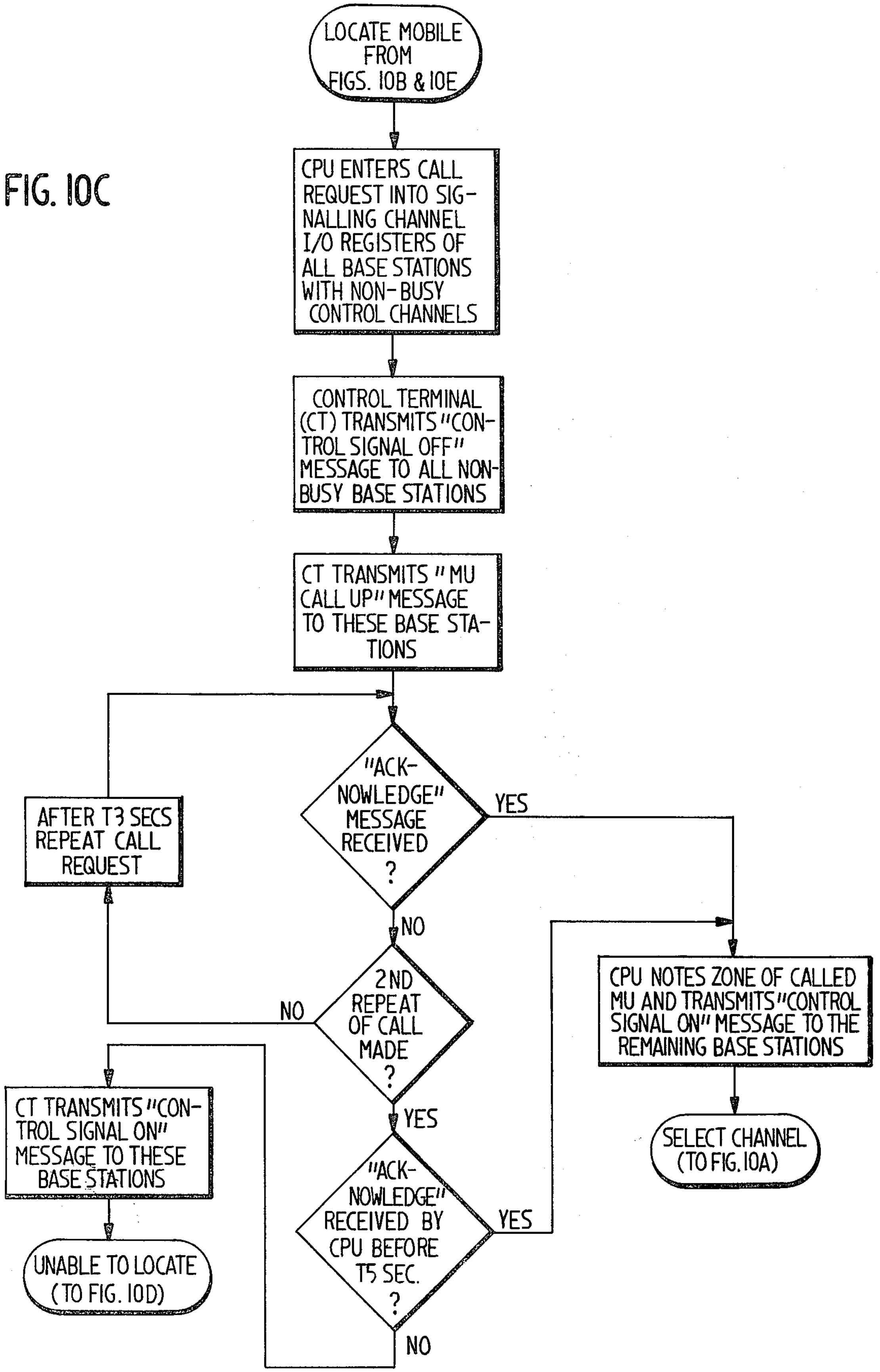
Figure 10D:
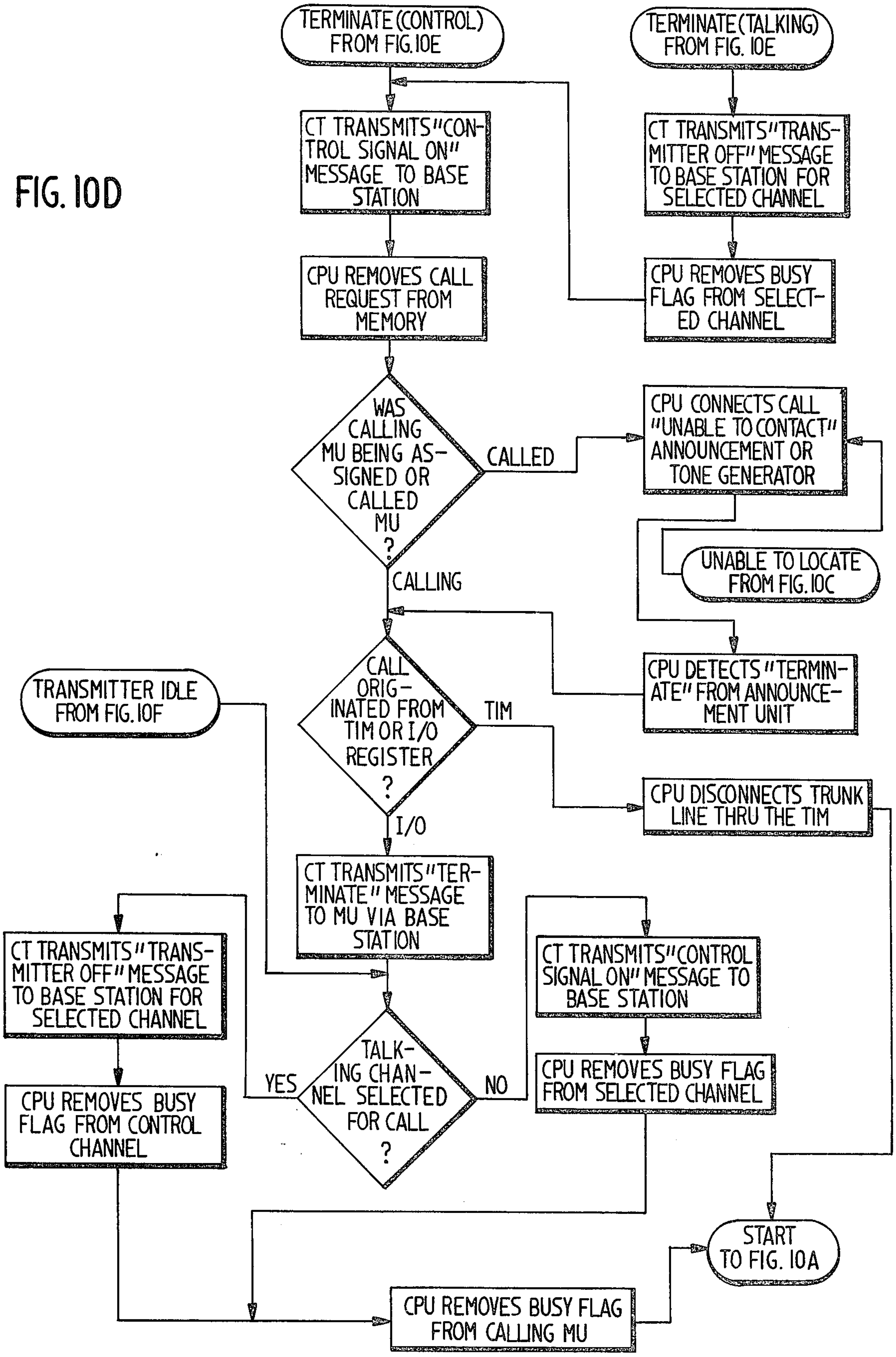

After the acknowledge message has been received by the CPU 108 on the proper talking channel, the CPU determines if the call is to or from a fixed telephone. If the call is to or from a fixed telephone, a CONNECT F/M routine described hereinafter is connection with FIG. 10F is initiated to connect the fixed and mobile telephones through the control terminal 50. If the call is to or from a mobile unit and the acknowledge message is from the called mobile unit, a CONNECT M/M routine of FIG. 10F is initiated to connect the two mobile units through the control terminal 50 and the appropriate base stations 54.

If the acknowledge message is from a calling mobile unit in a mobile-to-mobile call, a control signal on message is transmitted to the base station serving the calling mobile unit if a talking channel has already been selected. The CPU checks the directory for validity of the calling mobile unit address and, if the address is not valid, the CALL INTERCEPT procedure previously described in connection with FIG. 10A is initiated. . If the address of the calling mobile unit is valid, the CPU flags the calling mobile unit address as busy and the VALIDATE procedure previously described in connection with FIG. 10A is initiated commencing with the checking of the directory for the validity of the called address.

Figure 10E:
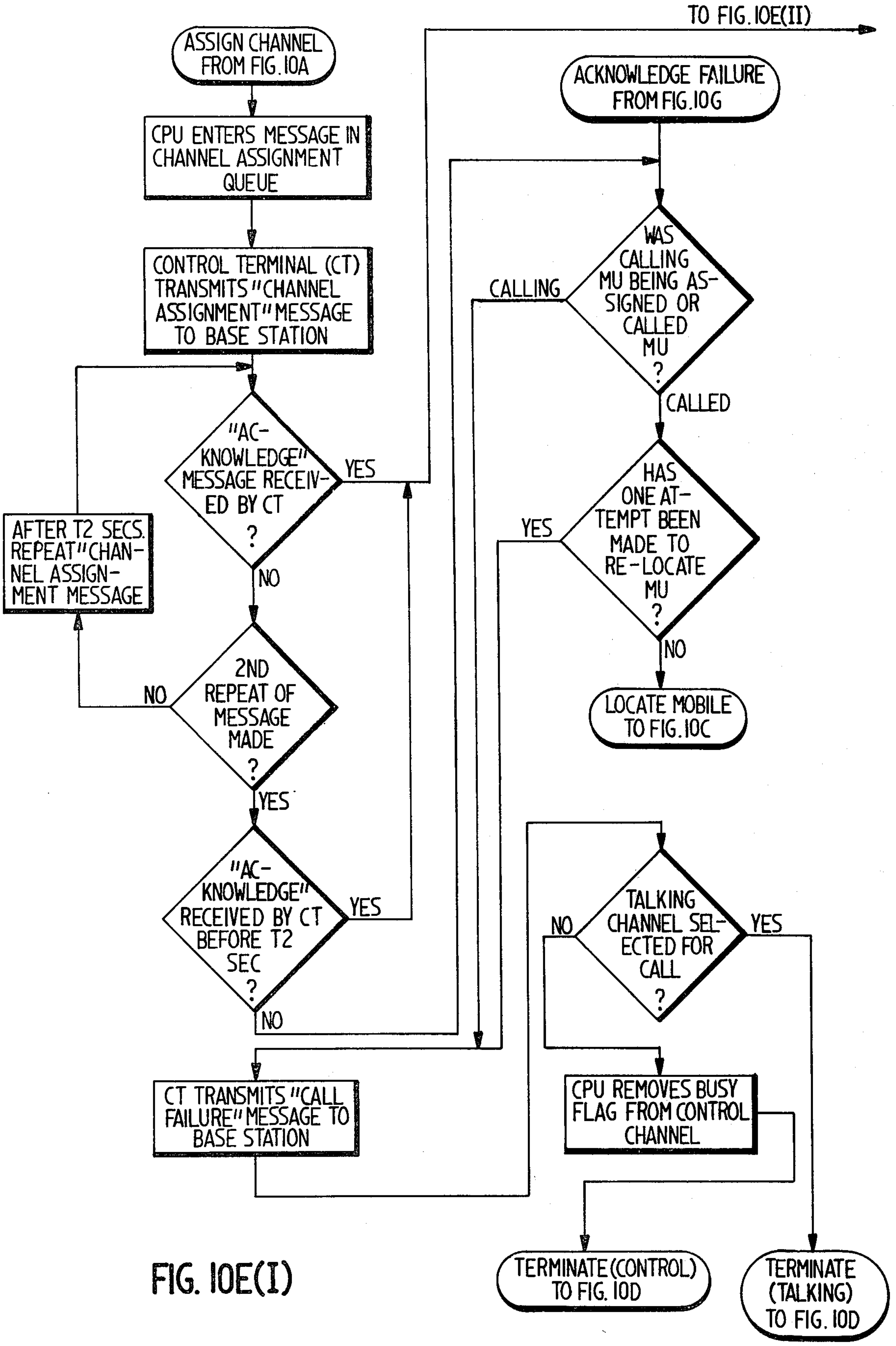
Figure 10F:
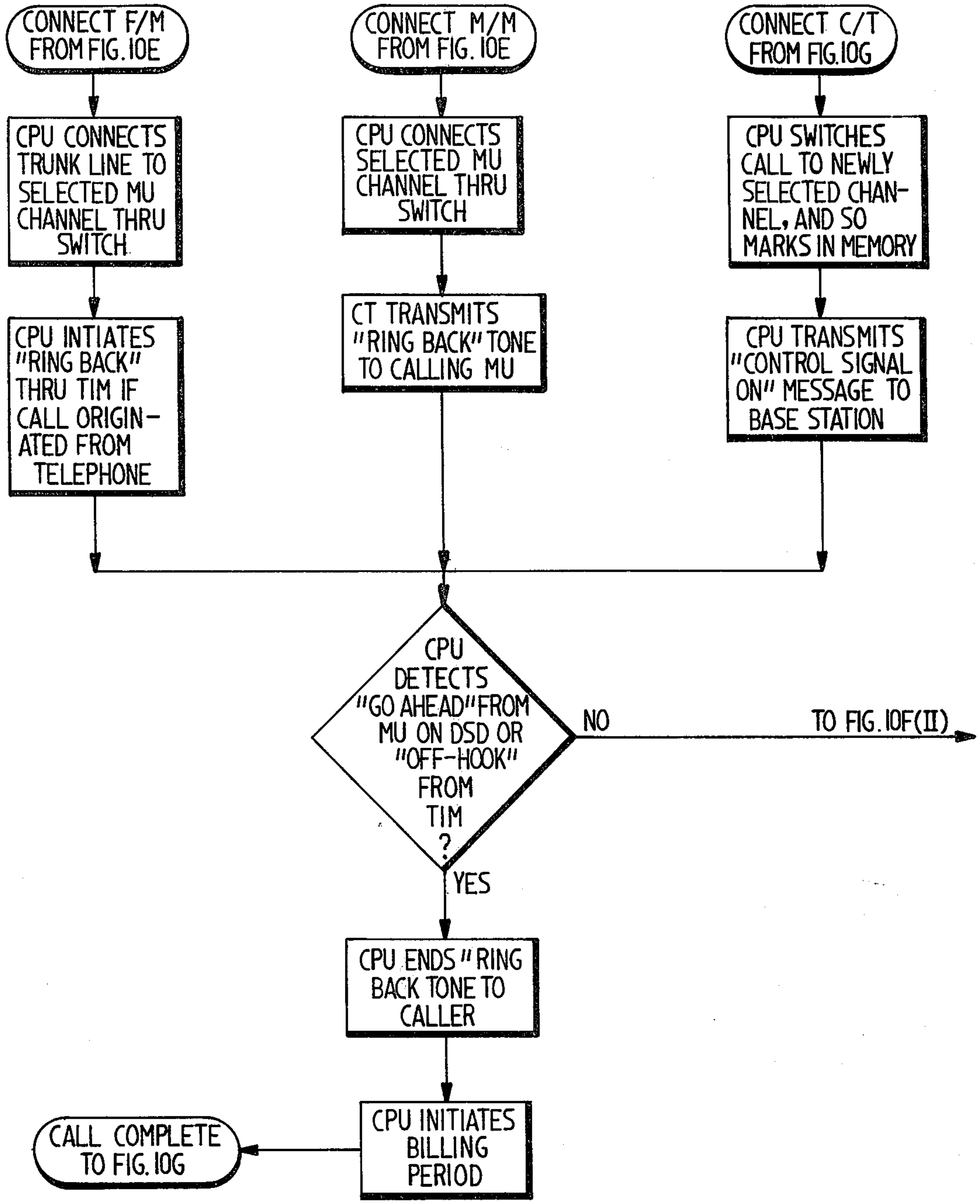

With continued reference to FIGS. 10 and 10E, if during the ASSIGN CHANNEL routine of FIG. 10E the acknowledge message is not received over the talking channel after repeated attempts, an ACKNOWLEDGE FAILURE routine may be initiated. The CPU may first determined whether the calling mobile unit or the called mobile unit failed to acknowledge the channel assignment message. If the calling mobile unit failed to acknowledge assignment of the talking channel, the control terminal may transmit a call failure message to the base station serving the mobile unit. If the called mobile unit failed to acknowledge a channel assignment, and one attempt has been made to relocate the called mobile unit, the call failure message may be transmitted to the base station serving the called mobile unit.

If a talking channel had been selected for the call, a TERMINATE (TALKING) routine hereinafter described in connection with FIG. 10D may be initiated. If the control channel had been selected to serve the call, the CPU may remove the busy flag from the control channel and initiate a TERMINATE (CONTROL) routine hereinafter described in connection with FIG. 10D. If, however, an attempt has not been made to relocate the called mobile unit, a LOCATE MOBILE routine described hereinafter in connection with FIG. 10C may be initiated prior to terminating the call.

If a talking channel is successfully assigned to the call and an acknowledge message is received on the proper talking channel, the CONNECT F/M and CONNECT M/M procedures of FIG. 10F may be initiated. With continued reference to FIG. 10 and with reference now to FIG. 10F, calls to or from a land telephone may result in the CONNECT F/M procedure. The CPU may connect an appropriate one of the trunk lines 53 to the selected mobile unit talking channel by way of the matrix switch 102 and t he appropriate talking lines 55. The CPU thereafter initiates a ring back tone from the tone signal generators 120 through the trunk interface module 100 connected to the appropriate trunk line 53 if the call originated from a fixed telephone. The CPU thereafter scans the DSDs 104 and the trunk interface modules 100 for a go ahead from a mobile unit or an off-hook from a trunk interface module.

If in FIG. 10E the channel assignment message is acknowledge by the called mobile unit in a mobile-to-mobile call, the CONNECT M/M routine of FIG. 10F results in the connection of the selected mobile unit talking channel through the matrix switch 102 and the transmission of the ring back tone to the calling mobile unit prior to the scanning of the DSDs 104 and trunk interface modules 100. If, in one other situation described hereinafter in connection with FIG. 10G, the control channel may be assigned as the talking channel. When a talking channel becomes available for assignment to the call, the connect C/T routine of FIG. 10F may be initiated and the CPU may switch the call to the newly selected talking channel, mark the selected talking channel as busy and transmit the control signal on message to the base station to resume signaling over the control signal channel. The CPU may then scan for the go ahead and/or off-hook messages.

If the CPU detects either the go-adhead signal from a boile unit on one of the DSDs 104, or the off-hook signal from a fixed telephone on one of the TIMs 100, the ring back tone to the caller is terminated and the billing period is initiated. The CALL COMPLETE routine of FIG. 10G may thereafter be initiated for that call.

If neither of the go ahead or off-hook signals is detected by the CPU 108, the CPU initiates a CALL TERMINATE procedure as illustrated in FIG. 10F either immediately upon receipt of a call terminate signal or after a predetermined period of time. In the CALL TERMINATE procedure of FIG. 10F, the CPU 108 first removes the call request from memory. The CPU 108 then terminates a mobile-to-mobile call by transmitting a terminate signal to either or both of the mobile units via the appròpriate base stations, removing the busy flangs from the channels selected for talking, transmitting a control signal on message to the base stations which had been assigned control channels for talking, and transmitting a transmitter off message to the base stations which had been assigned talking channels to serve the call.

To terminate a mobile-to-fixed telephone call in the event that a terminate signal is received from the land telephone, the CPU transmits a terminate signal to the mobile unit by way of the appropriate talking lines connected to the base station serving the call. Of course, the terminate signal need not be transmitted to the mobile unit in the event that a terminate message is received from the mobile unit. After the terminate signal has been transmitted to the mobilte unit or the terminate message has been received from the mobile unit, the CPU 108 disconnects the trunk lines 53 and the telephone lines 55 over which the talking channel or path is established by breaking the appropriate connection in the matrix switch 102. As is illustrated in FIG. 10D, the CPU may initiate a TRANSMITTER IDLE routine and either deenergize the talking channel transmitter or energize the control signal transmitter depending upon which was used to serve the call. The appropriate busy flags are removed from memory by the CPU and the scanning procedure of FIG. 10A continues.

Figure 10G:
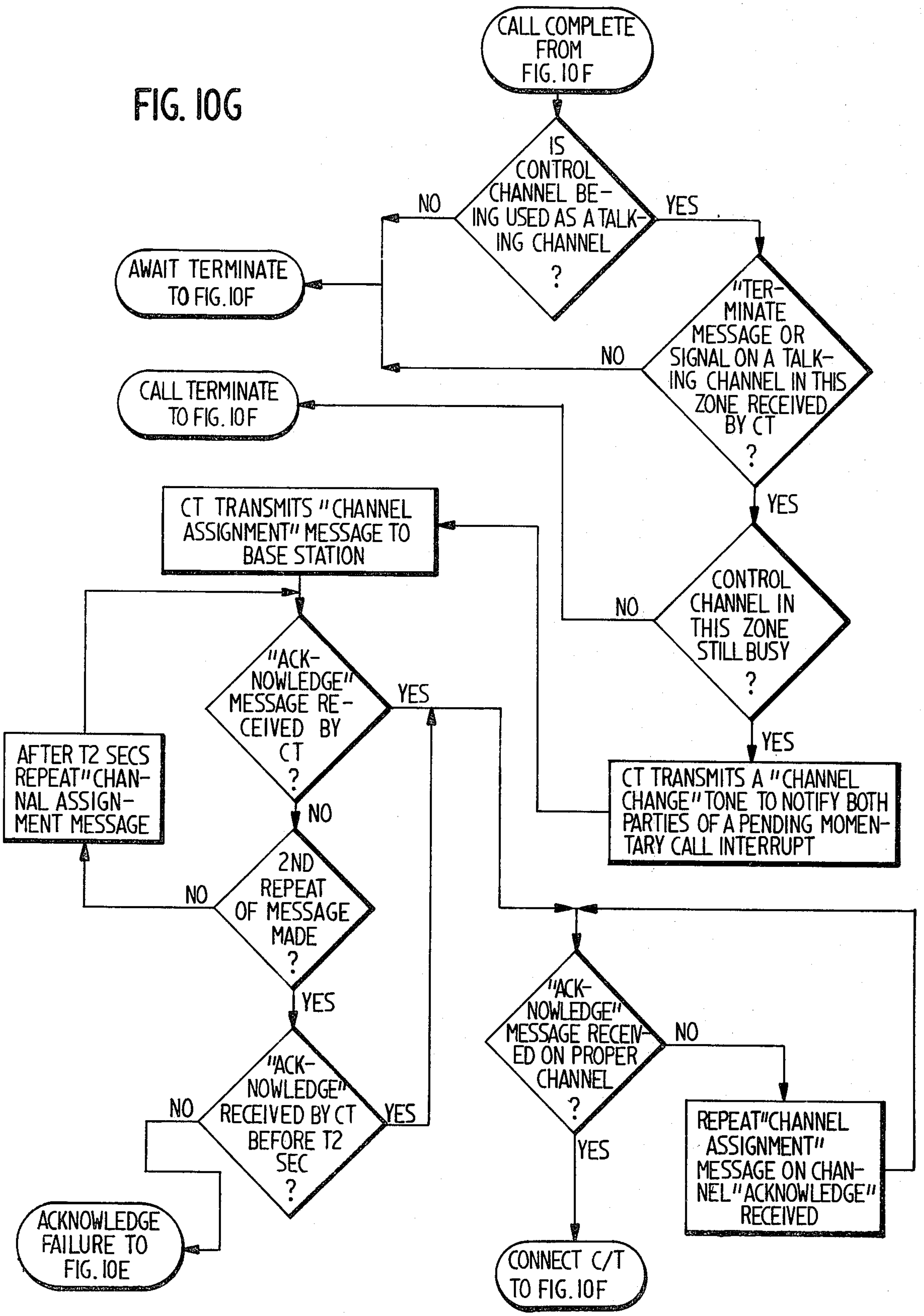

With continued reference to FIG. 10 and with reference now to FIGS. 10F and 10G, if the CPU initiates the billing period (FIG. 10F). the CALL COMPLETE procedure of FIG. 10G may thereafter be initiated. If the control channel is not being used as a talking channel, a call terminate signal received from either party ends the billing period in accordance with the AWAIT TERMINATE routine of FIG. 10F and the CPU thereafter calculates the total time of the call for billing purposes. The CALL TERMINATE procedure (including the TRANSMITTER IDLE procedure, if appropriate) previously described in connection with FIGS. 10F and 10D may thereafter be initiated.

If desired, the call may also be terminated after a predetermined period of time even though the call terminate signal has not been received from either party. AFter the predetermined period of time, a 15 seconds to terminate tone may be transmitted bo both parties from the control terminal and after 15 seconds have elapsed the call may be automatically terminated if the call terminate signal initiated by one of the parties has not been received. When the call is terminated in this manner, the billing period is ended and the CALL TERMINATE Procedure previously described ininitiated.

After the CPU 108 initiates the billing period (FIG. 10F) and the CALL COMPLETE procedure (FIG. 10G) and if the control channel is being used as a talking channel to serve the call, the CPU may assign the call to a talking channel when one becomes available as is illustrated in FIG. 10G. Referring to FIGS. 10 and 10G, the control terminal 50 may transmit a channel change tone from the appropriate tone signal generators 120 to both parties to notify the parties of a pending momentary interruption of the call after a terminate message or signal has been received on a talking channel in the zone serving the call. Of course, if the control channel in the zone is not busy when the terminate message or signal is received on the talking channel, the CALL TERMINATE procedure previously discussed in connection with FIG. 10F may be initiated.

To change from the control to a talking channel when parties are engaged in a call, the control terminal may transmit a channel assignment message to th base station serving the call unit an acknowledge message is received for the mobile unit over the newly assigned talking channel. The acknowledge message may be received either immediately or after repeated transmissions of the channel assignment message. When the acknowledge message is received on the proper talking channel (i.e., the assigned talking channel). the CPU 108 may switch the call to the newly selected talking channel and mark the newly selected channel as busy in memory as is illustrated in FIG. 10F. The CPU 108 thereafter may transmit a control signal on message to the base station and the call may be connected over the newly assigned talking channel in accordance with the CONNECT C/T procedure previously described in connection with FIG. 10F. Of course, if the acknowledge message is not received by the control terminal 50 after repeated attempts to assign the talking channel, the ACKNOWLEDGE FAILURE procedure of FIG. 10E may be initiated.

After the necessary mobile unit addresses (i.e., the called address and/or the calling address) have been validated in accordance with the VALIDATE procedure of FIG. 10A, the PROCESS REQUEST and LOCATE MOBILE procedures of FIGS. 10B and 10C may be sequentially initiated. With continued reference to FIG. 10 and with reference now to FIG. 10B, the CPU 108 may determined in the PROCESS REQUEST procedure if the call is to a mobile unit 58 or to a fixed telephone in the wire line telephone system 52. If the call is to a mobile unit and all appropriate control channels are busy, or if the call is to a fixed telphone and all trunk lines are busy, the control terminal 50 may effect the transmission of a circuits busy announcement from the voice annoucement unit 128 to the calling party followed by a terminate signal. The CPU 108 thereafter may determine whether the call was from a mobile unit or a fixed telephone and may terminate the call appropriately.

For example, with the call from a mobile unit the control terminal 50 transmits a terminate message to the calling mobile unit by way of the appropriate base station and removes the busy flag from the calling address before continuing with the terminate procedure previously described. If the call is from a fixed telphone, the CPU directs the trunk interface module 100 serving the call to disconnect or releasee the trunk line 53 seized by the calling partly before returning to the scanning procedure of FIG. 10A.

If the call being process is to a mobile unit and all appropriate control channels are not busy, or if the call is to a fixed telphone and all trunk lines are not busy, the CPU 109 may first check to determine if the called address is busy. If the called address is busy the control terminal 50 may return a busy tone to the calling party before proceeding with the terminate procedure previously described. If the called address is not busy, the CPU may first enter a busy flag in memory for the called address and then enter the call request into the call request queue before proceeding with the LOCATE MOBILE procedure of FIG. 10C.

With continued reference to FIG. 10 and with reference now to FIG. 10C, the LOCATE MOBILE procedure may be initiated either as was previously described in connection with FIG. 10B or as was previously described in connection with FIG. 10E. Referring to FIG. 10C, the current zone location of a mobile unit may be known by the CPU 108 if the zone location is updated whenever the mobile unit changes zones as was previously described. If, however, the current zone location of a mobile unit is not known, the LOCATE MOBILE procedure illustrated in the first three blocks of FIG. 10C may be initiated whenever a mobile unit is called. The CPU 108 may first enter the call request information into control signaling channel registers 114 for all base stations with nonbusy control c hannels. The control terminal 108 may thereafter transmit the control signal off to all of the nonbusy base stations followed by the mobile unit call-up message. The control terminal may thereafter await receipt of a acknowledge message over one of the control channels.

If the acknowledge message is not received over the control channel after repeated transmissions of the mobile unit call-up message, the control terminal 50 may transmit a control signal on message to the base stations before proceeding with an UNABLE TO LOCATE Procedure illustrated in FIG. 10D. If an ackcnowledge message is received over one of the control channels, the CPU 108 notes the zone of the called mobile unit (if not already known) and transmits a control signal on message to the remaining base stations(if all base stations were previously trasmitting the MU call-up message). The CPU then initiates the SELECT CHANNEL procedure previously described in connection with FIG. 10A.

With continued reference to FIG. 10 and with reference now to FIG. 10D, calls served on the control channels and the talking channels may be terminated in accordance with the respective TERMINATE (CONTROL) and TERMINATE (TALKING) procedures illustrated in FIG. 10D. A call served by a talking channel may be terminated by first transmitting a ttransmitter off message to the transmitter serving the talking channel at the base station through application of an appropriate TONE signal to the digital signal detector 104 serving the talking channel. The CPU 108 may thereafter remove the busy flag from the previously assigned talking channel and continue with the TERMINATE (CONTROL) procedure of FIG. 10D.

With continued reference to FIG. 10D, the control terminal may transmit a control signal on message to the base station serving the call and may remove the call request from memory. If an attempt was being made to assign a talking channel to a called mobile unit, the CPU 108 may effect the transmission of a unable to contact announcement to the called mobile unit as part of the UNABLE TO LOCATE procedure. A terminate announcement or tone from the announcement unit 128 may thereafter be connected to the CPU and the CPU 108 may determine whether the call originated from a fixed telephone by way of the trunk interface modules 100 or from a mobile unit by way of the I/O registers 114. This determination of call origination may also be made if the attempt at assigning a talking channel was directed to a calling mobile unit.

If the call originated from a fixed telephone by way of the trunk interface modules 100, the CPU 108 may disconnect or release the trunk line 53 associated with that trunk interface module 100 and may return to the scanning procedure of FIG. 10A. If the call originated from a mobile unit by way of the I/O registers 114, the control terminal 50 may effect transmission of a terminate message to the mobile unit by way of the appropriate base station and the TRANSMITTER IDLE procedure previously described may be initiated.

As was previously described in connection with FIG. 8, the CPU 108 at the control terminal 50 may process zone change requests as a mobile unit engaged in a call moves from one zone into another. Insofar as the central processing unit 108 is concerned, the zone change request may be processed in the same manner irrespective of whether the request is initiated by the mobile unit receiver or by a receiver at one of the base stations 54. In either event, the CPU 108 may receive a vote request over the control and signaling lines associated with a base station and may direct a receiver at each base station adjacent the base station from which the vote request is received to monitor the talking channel over which the requesting mobile unit is engaged in a call. The information received from the base stations directed to monitor the call may be detected on the appropriate I/O registers 114 or the digital signal detectors 104 (depending upon which receivers are utilized for monitoring the established call) and the monitored signal levels may be applied to the CPU 108 to control the selection and assignment of a new zone to the established call.

In the event that the vote request is received from a base station surrounded by six adjacent zones, the CPU 108 may compare the six monitored signal levels received from the adjacent zone base stations and the CALL COMPLETE procedure of FIG. 10G may be initiated by the CPU 108 commencing with the transmission of a channel change tone to both the called and calling parties.

From the foregoing description of the central control terminal 50 and the detailed functional operation thereof, together with the previously described signaling format and the subsequent detailed description of the base stations and mobile units, it is apparent that one skilled in the art to which the invention pertains may readily program the CPU 108 in any suitable conventional manner to accomplish the desired functions. As was previously mentioned, the CPU 108 may be any suitable conventional processing unit such as a PDP 11/45 available from Digital Equipment Corporation or an equivalent data processor. The trunk interface modules 100 may be any suitable conventional commercially available interface units for interfacing the trunk lines of a wire line telephone system with a two-wire, conventional matrix switch of etiher the single stage of multiple stage type. Likewise, the DSDs 104 may be any suitable conventional commercially available units capable of interfacing the two-wire matrix switch 102 with the two-wire telephone lines 55 and for detecting and transmitting various supervisory control signals.

The assistance operator position or terminal 106 may be any commercially available unit and the voice announcement unit 128, together with the selector switch 126, may be any conventionally available unit capable of providing the desired voice announcements. Similarly, the tone signal generators 120 may be any suitable commercially available tone signal generators capable of providing the required TONE signals under the command of a suitable conventional controller.

The interface and control circuit 124 for controlling the matrix switch 102 may likewise be suitable commercially available equipment as may the scanners and controllers 112, 122 and 130. The switch-over control circuit 110 for the CPU 108 and the back up CPU 138 may be any commercially available equipement suitable for use with the central processing units employed in the system. The input/output registers 114 may be any suitable conventional serial data registers and the modems 116 may be commercially available modems operable at the preferred control signaling rate, e.g., 2,400 bits per second.

In the preferred embodiment of the invention, each of the CPU's 108 and 138 preferably have a 16-bit word length and memory space for up to 20,480 words. The CPU's preferably require a maximum cycle time of about 1.2 microseconds and the memories are preferably directly accessible in bytes of 17 bits. Each CPU may also provide a four-level automatic priority interrupt system, and a data brake feature for direct memory access. The aforementioned Digital Equipment Corporation PDP-11 data processor, for example, provides at least the above capabilities.

In addition to the above-mentioned functions of the CPU's 108 and 138, various diagnostic programs may be provided for self-test of the control terminal as well as verification of the proper operation of the base stations 54 and the mobile units 58. Tests of the mobile units may be initiated by the users with indications of malfunctions printed out on the teletypewriter 132. In addition to the diagnostic or maintenance data, billing information and hourly traffic data summaries may be printed out on the teletepyewriter 132 and/or recorded by the tape deck 136. The billing data may be recorded in any suitable conventional manner, e.g., 800-bit per minute IBM format, so that direct billings can be made from the resultant tape by a service bureau. Recorded data may be coded in ASCI code and also printed by the teletypewriter 132 together with time information from the Julian clock 140.

The trunk interface modules 100 may provide both signaling detection and generation. The modules may convert the called digital signal addresses from the CPU 108 into suitable dial pulses or tones at a standard rate of b 10 pulses per second or a high capability of 20 pulses per second if desired. The trunk interface modules may generate standard supervisory control signals such as the off-hook and on-hook signals in response to the control signals from the CPU 108. The trunk interface modules 100 may also contain conventional circuitry, controllable by the CPU 108, to switch the ring back and busy tones from the tone signal generators 120 onto the trunk lines 53.

The TIMs 100 may also convert the input dial pulses or tones into suitable digital signals such as BCD words and may enter the digital words into buffer registers for scanning by the scanner and controller 130 under the control of the CPU 108. The TIMs may also detect busy, off-hook, and on-hook signals from the wire line telephone system 52 for entry into the CPU 108 when scanned by the scanner and controller 130.

One of the DSDs 104 may be provided for each line pair from the base station transmitter-receivers (transceivers) and may convert FSK signaling messages from the mobile unit to digital messages. The DSDs 104 may enter the digital messages into buffer registers for scanning by the scanner and controller 122 under the control of the CPU 108. The DSDs 104 may also contain conventional circuits, controllable by the CPU 108, for switching the ring back, channel change, and busy TONE signals from the tone signal generators 120 onto the talking lines 55. The number of DSDs should be as many as are required to provide service to all talking channels (and all control channels when employed under maximum load conditions as talking channels) to all base stations.

IV. Base Station

One embodiment of the base stations 54 of FIG. 1 is illustrated in the functional block diagram of FIG. 11 to facilitate an understanding of this aspect of the invention.

Referring now to FIG. 11, the telephone lines 55 connected between the central control terminal 50 and the base station 54 may include a plurality of talking lines for the talking channels and a plurality of control and signaling lines for the control signal channels as was previously described. The plurality of talking lines of the telephone lines 55 may each comprise a two-wire line between the control terminal 50 and each base station 54 or a four-wire line as desired. If two-wire lines or line pairs are provided for each talking channel as in FIG. 11, a suitable conventional two-wire to four-wire hybrid circuit 200 may be provided to separate the two-wire links into pairs of receive lines 202A–202N and pairs of transmit lines 204A–204N. The four-wire control and signaling lines of the telephone line 55 may comprise pairs of transmit and receive lines 206A and 206B, respectively, and may be connected through a suitable conventional modem 108 without the need for separation.

The control signals XDATA transmitted from the central control terminal 50 to the base stations 54 over the line pair 206A may be applied through the modem 208 to a base station controller 210 and a selector gate 212. The control and data signals RDATA transmitted from the base station 54 to the central control terminal 50 may be transmitted either from the selector gate 212 or from the base station controller 210 through the modem 208 and over the control and signaling line pair 206B of the telephone lines 55. The base station controller may generate a gate control signal GTC for application to the selector gate 212 and may generate a control signal generator on/off signal CSO/F for application to a control signal identifier generator 214. The identifier signal ID from the control signal identifier generator 214 may be applied to the selector gate 212 for selective broadcast of the identifier ID over the control signal channel as was previously described and will hereinafter be described in greater detail.

The base station controller 210 may also generate a plurality of transmitter on/off control signals TXC which may be applied to each of a plurality of transmitters TX1–TXN to control the energization and denergization thereof. Each of the transmitters TX1–TXN may be connected through a suitable conventional combiner 216 to a suitable omnidirectional antenna 218 for broadcast of transmitter modulating signals TXM1–TXMN applied to the respective transmitters TX1–TXN over the transmit lines 204A–204N of the talking line 55.

A plurality of receivers RC1–RCN each associated with a like designated one of the transmitters TX1–TXN may receive signals broadcast by mobile units in the zone which the base station serves by way of an antenna 220 connected to a suitable conventional multicoupler 222. The output signals RCV2–RCVN from the respective receivers RC2–RCN may be transmitted directly over the receive links 202B–202N to the central control terminal 50. The output signal RCV1 from the receiver RC1 may be applied through the selector gate 212 to ether the receive link 206A of the control and signaling lines or to the receive link 202A of the talking lines in response to the gate control signal GTC from the base station controller 210. Similarly, either the XDATA signal transmitted to the base station over the transmit line pair 206A of the control and signaling lines 55 or signals transmitted to the base station 54 over the transmit pair 204A of the talking lines 55 may be selectively applied through the selector gate 212 to the one of the transmitters TX1–TXN associated with the receiver RC1, i.e., the transmitter TX1, in response to the gate control signal GTC.

Signals SL1–SLN indicative of received signal level or strength may be applied from each of the receivers RC1–RCN to a vote threshold detector 224. An output signal VOTE from the vote threshold detector 224 may be applied to the base station controller 210 for tansmission to the central control terminal by way of the modem 208 and the receive line pair 206B of the control and signaling lines 55.

In operation, each associated pair of the transmitters and receivers TX1–RC1 through TXN–RCN may serve a fixed one of the channels assigned for use in the zone served by the base station 54 or may alternatively be selectively tunable to serve any selected one of the channels available for use in the system. Each transmitter-receiver pair may comprise a separate transmitter and receiver as illustrated or may comprise a suitable conventional transceiver.

One transmitter-receiver pair, e.g., the transmitter TX1 and the receiver RC1, may be designated to serve the control channel assigned for use in the zone served by the base station 54. The control signal identifier ID from the control signal identifier generator 214 may normally be applied through the selector gate 212 to the transmitter TX1 for transmission over the down-link of the control signal channel. The ID signal may have the signal format previously described in connection with FIG. 9B and may be broadcast in the zone served by the base station 54 unless interrupted during the placement of a call to a mobile unit in the zone or unless interrupted while the control channel is being employed as a talking channel.

When a call is placed to a mobile unit in the zone served by the base station 54, a control signal off message may be transmitted to the base station 54 over the transmit line pair 206A of the control and signaling lines as the XDATA signal. The control signal off message may be decoded by the base station controller 210 and may effect the generation of the CSO/F signal which may inhibit the application of the ID signal to the selector gate 212 in any suitable manner. Receipt of the control signal off message by the controller 210 may also result in the generation of an appropriate GTC signal to connect subsequently received XDATA signals through the selector gate 212 to the control signal channel transmitter TX1.

Following the transmission of the control signal off message to the base station, the control terminal 50 may transmit a call-up or locating message, i.e., a sync signal followed by the address of the called mobile unit, to the base station 54. The call-up message may be applied through the modem 208 and the selector gate 212 to the transmitter TX1 for the transmission thereof over the down-link of the control channel. The call-up message may be repetitively broadcast under the control of the central control terminal 50 for a limited number of times, e.g. three times, unless an appropriate response is earlier received from the called mobile unit.

When the called mobile unit receives the broadcast call-up message including its address over the down-link of the control channel, the mobile unit may broadcast an appropriate achknowledge message at the frequency of the up-link of the control channel. The acknowledge message may include a sync signal followed by the address of the called mobile unit as was previously described in connection with Table II. The acknowledge message broadcast by the called mobile unit may be received by the receiver RC1 tuned to the up-link of the control signal channel and the received signal RCV1 may be applied through the selector gate 212 for transmission to the central control terminal 50 through the modem 208 over the control and signaling lines as the RDATA signal. The central control terminal may then select a talking channel for assignment to the call as was previously described in connection with FIG. 10A and may transmit a transmitter on message to the base station 54 for the selected talking channel.

The transmitter on message may be decoded by the base station controller 210 and an appropriate TXC signal may be generated to energize the one of the transmitters TX2–TXN serving the selected talking channel. The control terminal 50 may then transmit a channel assignment message to the base station 54 for broadcast over the control channel. The channel assignment message may include a sync signal followed by the called address and the identity of the assigned talking channel as was previously described. The channel assignment message may be directed through the selector gate 212 and broadcast by the transmitter TX1 over the control channel down-link. The message may be repeated, as necessary, until a response is received from the mobile unit over the assigned talking channel.

For example, the respective down-link and up-link of a talking channel served by the transmitter-receiver pair TX2–RC2 may be assigned to the call. The called mobile unit may receive the channel assignment message broadcast by the base station 54 over the control channel down-link and may tune its transceiver to the respective talking channel. An acknowledge message (a sync signal followed by the mobile unit address) may thereafter be transmitted by the mobile unit over the assigned talking channel. The acknowledge message may be received by the base station receiver RC2 and transmitted to the central control terminal 50 as the RCV2 signal by way of the two-wire to four-wire hybrid circuit 200 over the receive line pair 202B.

As was previously described, the acknowledge message from the base station 54 serving the called mobile unit may be detected by the digital signal detector connected to the talking lines over which the acknolwedge message is transmitted to the control terminal 50. The control terminal 50 may connect the called mobile talking channel to the calling party through the matrix switch 102 (FIG. 10) and may transmit a control signal on message to the base station 54 over the control and signaling lines. The control signal on message may be decoded by the base station controller 210 and the controller 210 may connect the ID signal through the selector gate 212 to the control signal channel transmitter TX1 for broadcast over the control channel.

The communication path thus established through the base station 54 may continue to serve the call until one of the parties terminates the call. Alternatively, the call may be automatically terminated after a predetermined period of time if neither party terminates the call prior to the end of the imposed time limit.

A call from the mobile unit served by the base station 54 may be established in a similar manner with the initial or call request or call-up message being received by the control channel receiver RC1 and transmitted to the control terminal 50 through the selector gate 212 and over the receiver pair 206B of the control and signaling lines. The call-up message may be detected through the scanning of the I/O registers 114 (FIG. 10) as was previously described and a control channel busy message may be transmitted to the base station and decoded by the base station controller 210 to effect a busy status indicator in the control channel ID signal. The processing of the call-up message, the selecting and assigning of a talking channel and the connecting of the parties through the control terminal 50 over the assigned talking channel may proceed as was previously described.

In the event that all talking channels available for use at the base station 54 are simultaneously being used, i.e., all transmitters TX2–TXN and receivers RC2–RCN are in use, the control channel may be employed as a talking channel. In this situation, an appropriate XDATA signal may be transmitted from the central control terminal 50 to the base station controller 210 over the control and signaling lines to effect the connection through the gate 212 of the transmitter TX1 and the receiver RC1 normally employed for control signaling to an associated set of the talking lines. Moreover, the appropriate control signal off message may be transmitted to the base station 54 to inhibit the application of the ID signal from the control signal identifier generator 214 to the transmitter TX1.

If one of the designated talking channels becomes available, while the control signal is being employed as a talking channel, the central control terminal 50 may transmit an appropriate XDATA signal to the base station controller 210 over the transmit pair 206A of the control and signaling lines to turn on the transmitter and receiver pair serving the now available talking channel. The mobile unit may be instructed to prepare for a momentary interruption and to switch to the available talking channel through the broadcast of appropriate channel change and channel assignment messages by way of the selector gate 212 and the transmitter TX1. The central control terminal 50 may then effect the required switching changes at the central control terminal 50 to connect the transmitter-reciever pair serving the now available talking channel to the other party when the acknowledge signal indicating that the mobile unit has switched to the now available talking channel is received by the central control terminal.

Call maintenance during interzone travel by mobile units engaged in calls may be accommodated by the base stations 54 in various ways depending, for example, upon how the zone change request is initiated. In the embodiment of the base stations 54 illustrated in FIG. 11, the zone change request may be initiated by the vote threshold detector 224. The vote threshold detector 224 may monitor the received signal level or signal strength SL1–SLN of each receiver engaged in a call. When any of the signals SL1–SLN drops below a predetermined threshold level, the vote threshold detector 224 may generate a vote signal for transmission to the central control terminal 50 to indicate a zone change is required and thus initiate a vote in all adjacent zones.

The VOTE signal may be a digital signal indicating which of the calls at a particular base station requires a zone change and may thus be employed by the central control unit 50 in tuning each of the monitoring receivers in the surrounding and adjacent zones to the appropriate channel. The VOTE signal may be transmitted to the control terminal 50 over the receive line pair 206B of the control and signaling lines by way of the base station controller 210 and the modem 208, as illustrated, or may be transmitted over the talking lines serving the call requiring a zone change.

When the VOTE signal for a particular channel served by the base station 54 is received by the control terminal 50 over the control and signaling lines, the control terminal may initiate the voting routine previously described in connection with FIG. 8. As was previously described, a test signal may be transmitted to the mobile unit requiring a zone change over the talking channel serving the call and the base stations in each of the adjacent zones may be requested to provide a signal level indication for the engaged talking channel. The signal level indications may be compared by the CPU 108 at the central control terminal and the base station receiving the highest signal level may be assigned to the call on the same or a new talking channel. The mobile unit may be directed to the new talking channel and connected through the control terminal 50 to the other party as was previously described.

In the embodiment of the base station 54 illustrated in FIG. 11, the receivers RC1–RCN are fixed frequency receivers and thus a tunable monitoring receiver 226 illustrated in phantom may be commanded to the appropriate talking channel frequency to provide the control terminal 50 with the signal level indication. In this regard, a monitoring portion of the received signal RC VM may be applied to the monitroing receiver 226 from the multicoupler 222. The monitoring receiver 226 may be selectively tuned signal MRT generated by the base station controller 210 in response to a monitor channel message from the control terminal 50. The monitoring receiver may thereafter transmit the required signal level data MSL to the control terminal 50 over the receive line pair 206B of the control and signaling lines.

If the monitoring receiver 226 is provided at each base station 54, the monitoring receiver may also assume the signal level monitoring function of the receivers RC1–RCN. Thus, the monitoring receiver at each base station may scan the talking channels to provide the vote initiation signal level indications to the vote threshold detector 224 and may also be directed to (or at least scan) the talking channels in adjacent zones to provide the signal level data required for selecting an adjacent zone.

A. Base Station Controller

One embodiment of a base station controller 210 which may be utilized in conjunction with the base station illustrated in FIG. 11 is illustrated in greater detail in FIG. 12 to facilitate an understanding of the present invention.

Referring now to FIG. 12, the XDATA signalfrom the transmit line pair 206A of the control and signaling lines of FIG. 11 may be applied to a suitable conventional sync detector 230 to detect a synchronization pattern which may be transmitted to the base station with each of the control messages. A synchronization signal SYNC from the sync detector 230 may be applied to the clock enable input input terminal CE of a conventional message counter 232 and to the load enable input terminal LE of a suitable conventional storage register 234. The XDATA signal may be applied to the data input terminal D of the register 234 and a clock signal CLK from a suitable, conventional clock signal generator 236 may be applied to the clock input terminals CL of the message counter 232 and the register 234 as well as to the clock input terminal CL of a suitable, temporary storage register 238.

The data signal DATA stored in the register 234 may be applied in parallel to each of a plurality of decoders 240–250 and an enable signal ENBL from the message counter 232 may be applied to another input terminal of each of the decoders 240–250. The output signal from the decoder 240 (i.e., the control signal on decoder) may be applied to the set input terminal S of a suitable, conventional, bistable multivabrator or flip-flop 252 and the output signal from the decoder 242 (i.e., the control signal off decoder) may be applied to the reset input terminal R of the flip-flop 252. The output signal from the true output terminal - of the flip-flop 252 may be provided as part of the CSO/F and GTC signals and may also be provided to one input terminal of a two input terminal AND gate 252 and through an inverter 256 to one input terminal of a two input terminal AND gate 258. The output signals from the AND gates 254 and 258 may be applied to the respective input terminals of a two input terminal OR gate 260 and the output signal from the OR gate 260 may be applied to the transfer enable or TE input terminal of the register 238.

The output signal ACC from the decoder 244 (i.e., the assign control channel decoder) may be applied to the other input terminal of the AND gate 258 and may also be provided as part of the GTC signal for application to the selector gate 212 (i.e., the control channel busy decoder) may be applied through an inverter 262 to the other input terminal of the AND gate 254 and may be provided as part of the CSO/F signal for application to the control channel identifier generator 214 of FIG. 11. The output signals TXC1–TXCN from the decoder 248 (i.e., the transmitter on/off decoder) may be provided as the output signal TXC and the output signal from the decoder 250, the test decoder, may be applied to a suitable base station diagnostics circuit 264 and through an inverter 266 to one input terminal of a two input terminal AND gate 268.

The VOTE signal from the vote threshold detector 224 of FIG. 11 may include a channel identifying signal CHID and a vote request signal REQ. The CHID portion of the VOTE signal may be applied to the data input terminal D of the register 238 for temporary storage and the REQ portion of the vote signal may be applield to a clock enable input terminal CE of the register 238. The stored CHID signal, together with any suitable code idenitfying the CHID signal as a vote request for the identified channel, may be clocked out of the register 238 onto the receive line pair 206B of FIG. 11 through the AND gate 268 when enabled.

In operation, a SYNC signal preceeding a control message in the XDATA signal applied to the control terminal 50 may be detected by the sync detector 230 to enable the message counter 232 and the register 234. When the register 234 is enabled, the control message following the SYNC signal may be clocked into the register 234 by the CLK signal and the message counter 232 may simultaneously count the clock bits.

When the entire control message portion of the XDATA signal has been clocked into the register 234, the message counter 232 may generate the ENBL signal and enable the decoders 240–250. The contents of the register 234 (i.e., the DATA signal) may then be decoded by each of the decodres 240–250 to generate the appropriate control signal.

For example, the control message from the control terminal 50 may be a control signal on message which may result in the setting of flip-flop 252 when decoded by the control signal on decoder 240. As was previously described, the CSO/F signal may then enable the control signal identifier generator 214 of FIG. 11 and may also gate the ID signal from the control signal identifier generator 214 through the selector gate 212 to the control channel transmitter TX1. When the control signal off message is recieved from the control terminal 50, the output signal from the control signal off detector 242 may reset the flip-flop 252 inhibiting the control signal identifier generator 214 and connecting the RDATA and XDATA signals through the selector gate 212 to and from the respective control signal channel reciever RC1 and transmitter TX1.

Similarly, when the control channel is assigned as a talking channel, the appropriate assignment message may be decoded by the assign control channel decoder 244 to generate the ACC signal. The ACC portion of the GTC signal applied to the selector gate 212 of FIG. 11 may effect the connection of the talking lines 202A and 204A to the receiver RC1 and the transmitter TX1, respectively.

As was previously described, when a mobile unit transmits a call-up message to the central control terminal 50, a control channel busy signal may be transmitted over the control channel to indicate to all other mobile units that the control channel up-link is busy. The control channel busy detector 246 may detect the control channel busy message from the control terminal 50 and provide a BUSY signal to the control signal identifier generator 214 as part of the CSO/F signal to effect the transmission of the BUSY status indicator over the control channel. The transmitter on/off decoder 248 may decode transmitter on and transmitter off messages from the control terminal 50 and generate the transmitter control signals TXC1–TXCN. The energization and deenergization of the transmitters TX1–TXN of FIG. 11 may thereby be selectively controlled by the control terminal 50 as was previously described.

The control terminal 50 may periodically initiate a test procedure to insure that various base station equipment and/or mobile units served by a particular base station are operating properly. To provide for the various test procedures, the test decoder 250 may decode test messages from the control terminal and may initiate various base station diagnostic routines by the base station diagnostic circuit 264. Various signals indicating the results of tests may be transmitted to the control terminal from the base station diagnostic circuit 264 by way of the control and signaling lines as the RDATA signal.

The channel identifying portion CHID of the VOTE signal generated by the vote threshold detector 224 of FIG. 11 may be applied to the register 238 for temporary storage until this information can be transmitted to the control terminal 50. For example, the CHID signal may be stored by the resister 238 when enabled by the REQ signal. When, for example, the control signal identifier is on and the control channel is not busy, or when the control signal identifier is off and the control channel is not busy, or when the control signal identifier is off and the control channel has been assigned to a talking channel, the register 238 may be enabled by the signal from the OR gate 260 and the contents of the register 238 may be clocked onto the control and signaling lines for transmission to the control terminal 50.

B. Selector Gate

The selector gate 212 of FIG. 11 may be any suitable, conventional gating circuit such as that illustrated in FIG. 13. Referring now to FIG. 13, the gate control signal GTC from the base station controller 210 may include the assign control channel signal ACC and the control signal on/off signal CSO/F as was previously described. The ACC signal may be applied to one input terminal of a two input terminal AND gate 270 and through an inverter 272 to the control input terminal of a suitable conventional electronic gate 274. The CSO/F portion of the GTC signal may be applied through an inverter 276 to the other input terminal of the AND gate 270 and to the control input terminal of a suitable conventional electronic gate 278.

The output signal from the AND gate 270 may be applied to the control input terminal of a suitable conventional electronic gate 280. The ID signal from the control signal identifier generator 214 of FIG. 11 may be selectively applied through the gate 278 to the control channel *t* transmitter TX1 as the transmitter modulating or TXM signal. The RCV1 and TXM1 signals from the control signal receiver RC1 and from the control signal transmitter TX1, respectively, may be selectively applied through the gates 280 and 274 to either the talking lines or the control and signaling lines, respectively, of FIG. 11.

In operation, if the control signal on/off signal CSO/F assumes a high signal level indicating that the control signal identifier ID should be transmitted, the gate 274 is enabled. The gate 274 remains enabled as long as the control channel is not assigned for talking and, under these conditions, the ID signal is applied to the control signal channel transmitter TX1 for broadcast and the mobile units and central control terminal may communicate through the gate 274 over the control and signaling lines.

If the control channel is assigned as a talking channel, the control signal is turned off resulting in a low level CSO/F signal, and the ACC signal assumes a high signal level. The AND gate 270 is thus enabled and the output signal from the AND gate 270 assumes a high signal level to enable the gate 280. The gates 274 and 278 are inhibited by the respective ACC and CSO/F signals, and the enabled gate 280 connects the control signal transmitter TX1 and the control signal receiver RC1 to the talking lines and thus to the control terminal matrix switch 102 of FIG. 10.

C. Vote Threshold Detector

One embodiment of a vote threshold detector 224 suitable for use with the embodiment of the base station illustrated in FIG. 11 is illustrated in greater detail in FIG. 14 to facilitate an understanding of the operation of the system of the present invention.

Referring now to FIG. 14, the signals SL1–SLN indicating received signal level or strength for each established call may each be applied to an associated averaging circuit AV1–AVN. The output signals from the averaging circuits AV1–AVN may be applied to respective threshold detectors TD1–TDN and the output signals from the threshold detectors TD1–TDN may be applied both to a suitable, conventional scanner 284 and to a conventional detector circuit 286 (i.e., a vote request detector).

A digital channel identification signal CHID from the scanner 284 may be provided as part of the vote signal and a digital vote request signal REQ may be provided as another portion of the VOTE signal.

In operation, the received signal levels SL1–SLN may be continuously averaged by the averaging circuits AV-1–AVN and the average signal strength may be applied to the associated detectors TD1–TDN. When any one of the received signal levels drops below a predetermined vote threshold, the appropriate threshold detector may generate an output signal indicating that a vote is required. The vote request detector 286 may detect this requirement for a vote and generate the REQ signal as an indication to the base station controller 210 of FIG. 11 that a zone change is needed. The scanner 284 may scan the threshold detector output signals and when a vote request signal is detected from a particular one of the threshold detectors TD1–TDN, the scanner 284 may generate the CHID signal identifying the particular channel serving the call requiring the zone change. The VOTE signal applied to the base station controller 210 of FIG. 11 may thus indicate that a vote is required and may indicate which talking channel requires the vote.

D. Transmitter Receiver Frequency Controller

In the event that dynamic channel assignment is employed in the system, at least some of the transmitters and receivers at each of the base stations 54 may be selectively tunable to the channels assigned for use in the system. One embodiment of a circuit for selectively tuning the transmitters and receivers at a base station to the channels assigned in accordance with the dynamic channel assignment technique previously described is illustrated in FIG. 15.

Referring now to FIG. 15, the transmitter control signal TXC from the base station control 210 of FIG. 11 may include frequency control signals TXC1 $(f_1)$–TXC1$(f_n)$ as well as the transmitter on/off control signal TXC1 (on/off). A frequency control circuit 290 may be provided for each transmitter-receiver pair, e.g., the transmitter TX1 and the receiver RC1. The frequency control signals TXC1 $(f_1)$–TXC1 $(f_n)$ may each be applied to an associated one of a plurality of switches $SW_1$–$sw_n$. A plurality of frequency control crystals $CR_1$–$CR_n$ may be selectively grounded through the switches $SW_1$–$SW_n$, respectively, in response to the frequency control signals. Each of the frequency control crystals $CR_1$–$CR_n$ may be connected to a suitable oscillator amplifier 292 and the output signal from the amplifier 292 may be increased in frequency, if required, by a suitable conventional multiplier 294.

A transmitter frequency control signal TFC1 may be applied to the transmitter TX1 to control the frequency thereof and may also be offset by a predetermined frequency, e.g., 3MHz., by a conventional frequency offset circuit 296. A receiver frequency control signal RFC1 from the frequency offset circuit 296 may be applied to the receiver RFC1 to control the frequency thereof. The TXN1 signal may be applied to the transmitter TX1 and the RCV1 signal may be provided from the receiver RC1 as was previously described in connection with FIG. 11. In addition, the SL1 signal may be provided from the receiver RC1 for application to the vote threshold detector 224 as was previously described.

In operation, a particular channel may be assigned to a cell served by the base station 54 of FIG. 11 and the base station controller 210 may generate the appropriate transmitter on/off signal TXC (on/off) and the appropriate frequency control signals TXC1 $(f_1)$–TXC1 $(f_n)$. The transmitter selected to serve the call is energized and the appropriate switches $SW_1$–$SW_n$ are energized to select the proper down-link frequency for the selected channel. The frequency offset circuit 296 offsets the down-link frequency by a predetermined amount ot provide an output signal at the appropriate up-link frequency of the selected channel. The transmitter TX1 and the receiver RC1 are thus controlled in frequency to transmit and receive at the respective down-link and up-link frequencies of the selected channel.

The monitoring receiver 226 at the base station 54 of FIG. 11 may also be selectively tunable in the manner described above and may be also employed in conjunction with fixed frequency transmitters and receivers as was previously described. However, in a system employing base stations having selectively tunable transmitters and receivers of the type illustrated in FIG. 15, monitoring of a channel may be accommodated after a vote has been initiated by tuning any one of the available receivers at the appropriate base stations to the frequency of the call requiring a zone change. The need for a separate monitoring receiver may thus be eliminated if at least some of the transmitters and receivers at each base station are selectively tunable.

V. MOBILE UNIT

A preferred embodiment of the mobile unit 58 of FIG. 1 is illustrated and described hereinafter in connection with FIGS. 16-

Referring now to FIG. 16, each mobile unit 58 includes a supervisory control sequencer or control head 300 and an RF transceiver and frequency control unit 301. The supervisory control sequencer 300 includes an input/output panel 302 and various circuits through which calling and receiving functions may be performed either automatically or under the control of the subscriber or mobile unit operator as will hereinafter be described. The RF transceiver and frequency control unit 301 receives and broadcasts voice signals and encoded messages at the appropriate frequencies under the control of the supervisory control sequencer 300.

The supervisory control sequencer 300 may include an input/output panel 302 comprising an address display 303, a mobile unit on/off switch 304 an address storage module 305, a keyset or keyboard 306, a control and indicator panel 308, a speaker 310, and a handset 312. A mobile unit on/off signal ON/OFF from the on/off switch 304 may be applied to a control logic circuit 314 and stored address signal SADR, together with a keyset data signal KADR, may be applied to the data input terminal D of a suitable conventional address register 316. The address signal ADR stored in the address register 316 may be applied to the control logic circuit 314 and to the address display 303.

A test signal TS and a zone change signal ZC may be applied from the keyset or keyboard 306 to the control logic circuit 314. An address clear signal ADCLR may be applied to the clear input terminal CLR of the address register 316 and a horn switch or HSW signal, a hook switch or HKSW signal and a call switch or CSW signal may be applied to the control logic circuit 314 from the control and indicator panel 308.

An audio transmit AUDIO (T) signal from the handset 312 may be applied through a suitable conventional audio processing circuit 318 to a suitable conventional FSK encoder and select circuit 320. The transmitter modulating signal TXM from the FSK encoder and select circuit 320 may be applied to a suitable conventional transmitter 322 and a modulated carrier signal from the transmitter 322 may be applied through a conventional duplexer 324 to an antenna 326. A transmitter on TXON signal from the transmitter 322 may be applied to the control and indicator panel 308.

The control logic circuit 314 may generate a cell-in-progress indicator or CPI signal for application to the control and indicator panel 308 and may generate a tone selector TSEL signal for application to a suitable conventional tone generator 328. An audio enable signal AENBL may be applied from the control logic circuit 314 to a conventional audio amplifier 330 and a threshold level signal TLVL may be applied from the control logic circuit 314 to a suitable control signal detector 332.

The control logic circuit 314 may also provide an input select signal SLCT and a transmit data signal XDTA for application to the FSK encoder and select circuit 320. A transmitter enable signal TENBL from the control logic circuit 314 may be applied to the transmitter 322 and a frequency control signal FRC may be applied from the control logic circuit 314 to a suitable frequency module 334. Transmitter and receiver frequency control signals TFC and RFC, respectively, may be generated by the frequency module 334 and may be applied to the transmitter 322 and to a suitable conventional receiver 336. A tuning complete or TCOMP signal generated by the frequency module 334 may be applied to the control logic circuit 314.

Signals received over the antenna 326 may be applied through the duplexer 324 to the receiver 336 and a received signal level or RLVL signal from the receiver 336 may be applied to the control signal detector 332. The received signal RCVS from the receiver 336 may be applied to the control signal detector 332, to a suitable FSK decoder and sync detector 338 and to the audio amplifier 330. A channel lock signal CHLK from the control signal detector 332 may be applied to the control logic circuit 314 and to the control and indicator panel 308. A received data signal RDTA and a sync signal SYNC from the FSK decoder and sync detector 338 may be applied to the control logic circuit 314. A received audio signal AUDIO (R) may be applied from the audio amplifier 330 to the handset 312 and through a handset controlled switch 340 to the speaker 310.

Figure 17A:
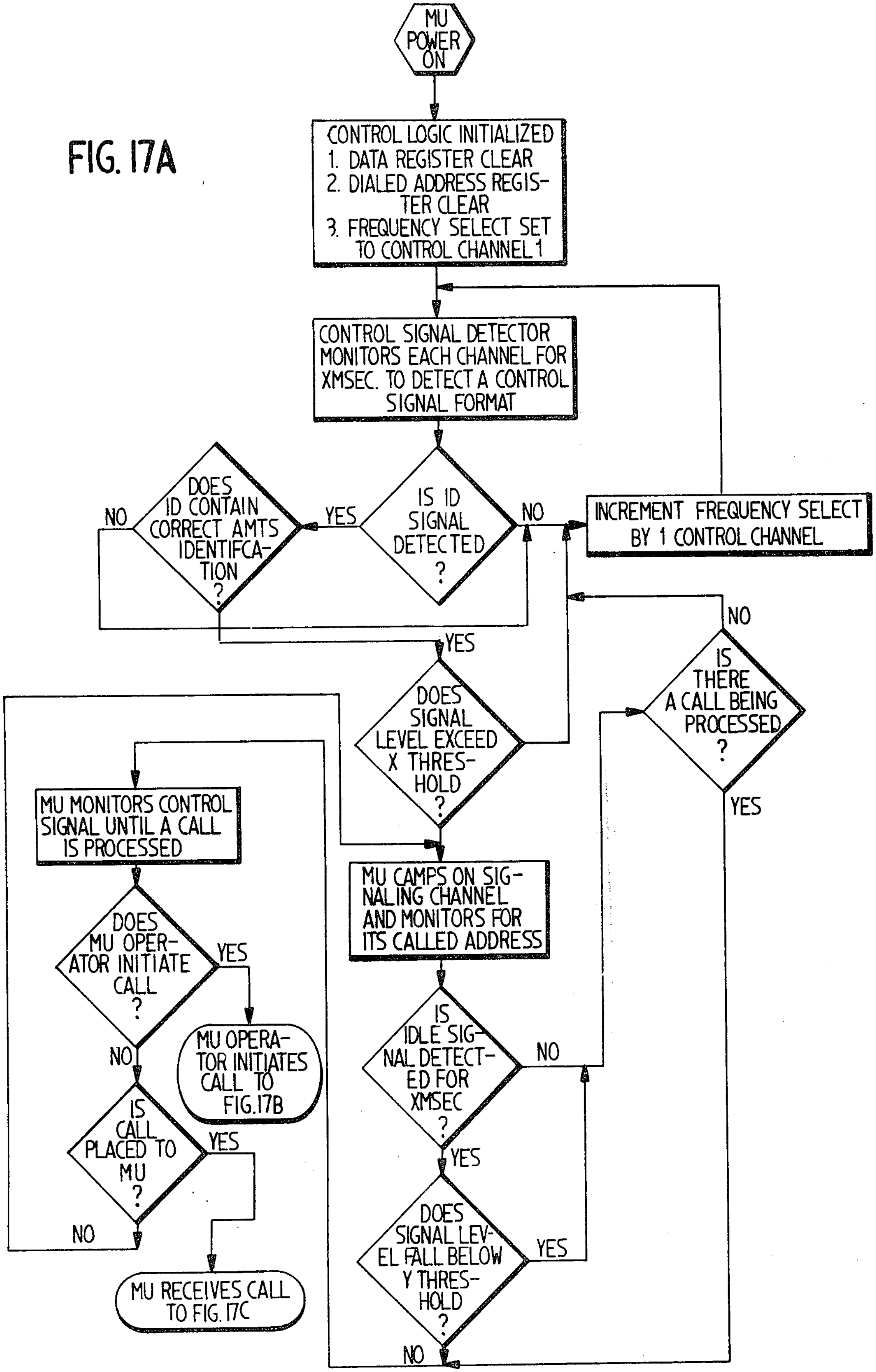
FIGS. 17A–17C are flow diagrams illustrating the operation of the mobile unit of FIG. 16.
Figure 17B:
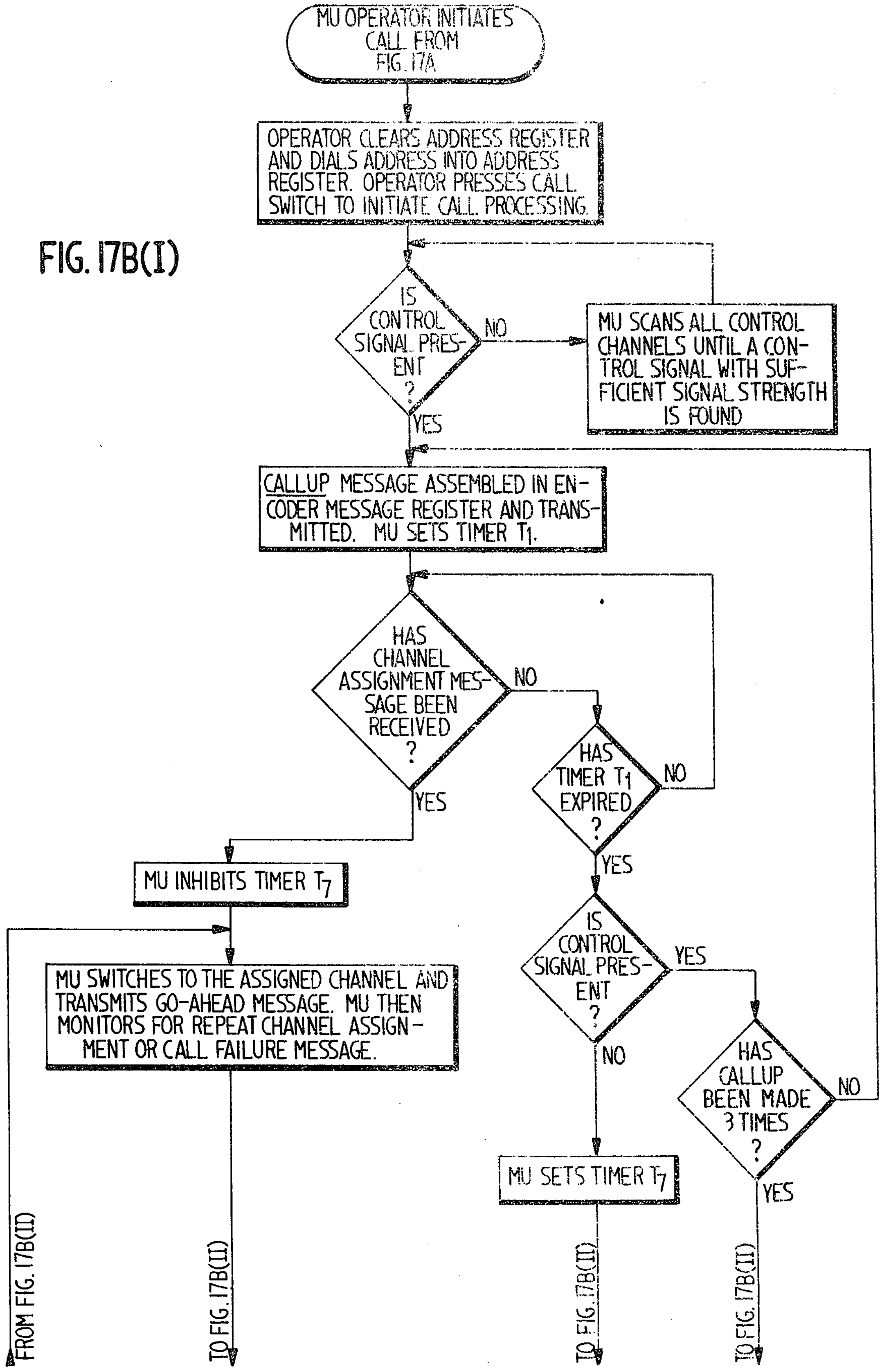
Figure 17C:
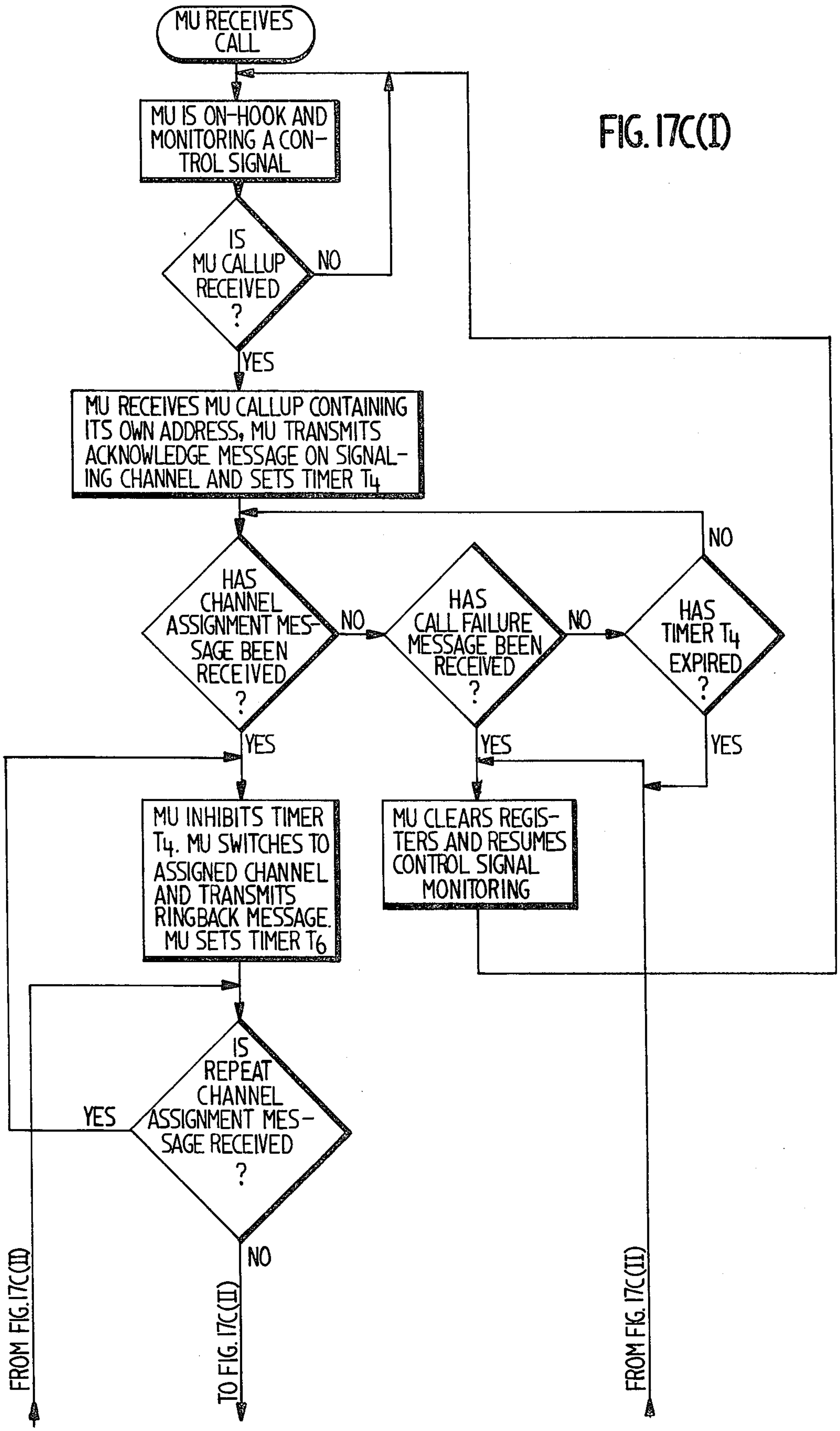

The operation of the mobile unit of FIG. 16 may be more clearly understood with continued reference to FIG. 16 and with reference to the flow diagrams of FIGS. 17A – 17C. Referring now to FIGS. 16 and 17A, when the mobile unit is energized by the mobile unit on/off switch 302, the data registers in the control logic circuit 314 are initialized, the address register 316 is initialized and the frequency module 314 is set to the first control channel of the group of control channels assigned to the system.

As was previously described, the identities (e.g., frequencies) of channels designated as control channels may be transmitted as part of the control channel ID signal and stored for subsequent use in locating a suitable control channel. This technique minimizes the search required of the mobile unit in finding a suitable control channel. The control signal detector 332 monitors the first control channel to which the receiver 336 is tuned for a control signal format containing the correct identifier or ID signal. If the ID signal is not detected, or if the ID signal does not contain the correct information the frequency module 334 is incremented by the frequency control signal FRC to sequentially monitor each control channel until the proper ID signal is detected by the control signal detector 332. The signal level RLVL of the properly decoded ID signal may then be compared to a predetermined threshold level TLVL by the control signal detector 332 and if the signal level RLVL does not exceed the predetermined threshold, the mobile unit continues to search for a control channel.

When a control channel haaving a suitable signal level is received and properly identified, the mobile unit locks onto the control channel and monitors the control channel for its called address. When control channel lock-on is achieved by the control signal detector 332, the channel lock signal CHLK provides an appropriate indication to the control logic circuit 314 and may illuminate an indicator on the control and indicator panel 308. Moreover, the control logic circuit 314 may assemble an appropriate in service message as was previously described in connection with FIGS. 1 and 2A. The in service message may be broadcast by the transmitter 322 over the selected control channel to provide the control terminal with an indication as to the location and identity of the mobile unit.

As was previously described, the control channel ID signal contains a busy/idle status portion which may be monitored by the control signal detector 332. If the idle signal is not detected for a predetermined period of time or if the control channel signal level RLVL falls below a predetermined threshold (e.g., the threshold represented by the TLVL signal), a search for a new control channel may be initiated by the control signal detector 314. If, at that time, a call is currently being processed, or if neither of the two previous conditions exists, the mobile unit continues to monitor the control signal channel until a call is processed either through the initiation of a call by the mobile unit operator or through the placement of a call to the mobile unit.

With continued reference to FIG. 16 and with reference now to FIG. 17B, the mobile unit operator may initiate a call by first clearing the address register 316 by generating the ADCLR signal and by entering the desired address into the address register 316 from either the address storage module 304 or the keyset 306. The address stored in the register 316 is displayed by the address display 301 and, if correct, the operator may depress a call switch to generate the call switch signal CSW to initiate call processing by the control logic circuit 314.

If a control signal channel is still being monitored as was previously described when call processing is initiated, a call-up message is assembled in a message register and applied through the FSK encoder and select circuit 320 to the transmitter 322 for broadcast thereof in response to the SLCT signal from the control logic circuit 314. If a suitable control signal is not being monitored when call processing is initiated, the mobile unit may continue to scan the control channels until an acceptable control signal is found before assembling and broadcasting the call-up message.

When the call-up message is broadcast, a timer $T_1$ may be set and the mobile unit may then await receipt of a channel assignment message until the timer expires. If the timer expires before the channel assignment message has been received and if the control signal is still present, the call-up message may be repeated two times. However, if a control signal is not present, the mobile unit may set a timer $T_7$ and await the receipt of the channel assignment message until the timer $T_7$ expires.

After the call-up message has been transmitted three times without receiving the channel assignment message, a call failure tone may be sounded. Similarly, the call failure tone may be sounded after the timer $T_7$ expires without receiving the channel assignment message, or upon receipt of a call failure message. The mobile unit may then scan the control channels for a new control channel and the call may be reattempted to the same address, i.e., to the same telephone subscriber, by depressing the call switch. The called address need not be reentered since the last called address is stored in the address register 316 until cleared by the ADCLR signal.

If the channel assignment message is received and successfully decoded by the FSK decoder and sync detector 338 before either of the timers $T_1$ and $T_7$ expires, the timer $T_7$ is inhibited and the mobile unit transmitter 322 and receiver 336 are tuned to the assigned channel by the frequency module 334 output signals TFC and RFC. The transmitter 322 is enabled by the TENBL signal from the control logic circuit 314 and a channel assignment acknowledge message is transmitted by applying the appropriate XDTA signal to the FSK encoder and select circuit 320 and selecting the applied XDTA signal for transmission. The reveiver 336 then monitors the assigned talking channel for a repeat channel assignment message or a call failure message.

If a call failure message is received, the call failure tone is sounded and the call may be reattempted as previously described. If a repeat channel assignment message is received, the mobile unit may switch to that assigned channel and again transmit the acknowledge message. If the repeat channel assignment message is not received after a predetermined period of time, the AENBL signal from the control logic circuit 314 enables the audio amplifier 330 and the SLCT signal from the control logic circuit 314 selects the AUDIO (T) signal from the audio processing circuit 318 for application to the transmitter 322 through the FSK encoder and select circuit 320. If the mobile unit handset 312 is not off hook, the received audio signal AUDIO (R) is applied to the speaker 310 through the switch 340. When the handset 312 is lifted and is thus off hook, the received audio signal AUDIO (R) may be applied solely to the handset 312 and an off hook or go-ahead message may be broadcast over the assigned talking channel.

The mobile unit may receive a call from a fixed telephone or another mobile unit as is illustrated in FIG. 17C. With continued reference to FIG. 16 and with reference now to FIG. 17C, the mobile unit monitors a control signal until a call-up message containing the mobile unit address is received and decoded by the FSK decoder and sync detector 338. When the call-up message is received and decoded the mobile unit transmits an acknowledge message on the control signal channel and sets a timer $T_4$. The mobile unit then awaits receipt of a channel assignment message over the control channel.

If a call failure message is received before the channel assignment message or if the timer $T_4$ expires before the channel assignment message is received, the mobile unit is initialized and resumes the monitoring of the control signal. However, if the channel assignment message is received before a call failure message, the timer $T_4$ is inhibited and the mobile unit transmitter 322 and receiver 336 are tuned to the assigned channel by the frequency module 334. The mobile unit then transmits a ring back or channel assignment acknowledge message over the assigned talking channel and a timer $T_6$ is set.

If a repeat channel assignment message is received, the mobile unit is tuned to the newly assigned channel and transmits the acknowledge message. If a call failure message is received, the mobile unit is initialized and resumes control signal monitoring. However, as soon as the timer $T_6$ expires, the control logic circuit 314 selects an appropriate ringing tone for application from the tone generator 328 through the audio amplifier 330 to the speaker 310.

The ringing tone continues for a predetermined period of time, e.g., 60 seconds, and if the mobile unit does not go off hook during this 60-second time period, the mobile unit is initialized and resumes control signal monitoring. If the mobile unit goes off hook within the 60-second time period, the hook switch or HKSW signal applied to the control logic circuit 314 from the control and indicator panel 308 effects the transmission of a go ahead message from the transmitter 322 by way of the encoder and select circuit 320 and the audio circuits are enabled as was described in connection with FIG. 17B.

With continued reference to FIG. 16, each mobile unit 58 may also be provided with suitable conventional circuits indicated in phantom at 341 for operation in systems employing improved mobile telephone service IMTS techniques. The control signal detector may include an IMTS control signal detector (not shown) and if the mobile unit is operating in an IMTS system and detects an IMTS idle channel marker signal, the IMTS circuits 341 may be energized. Thereafter, the mobile unit 58 may operate in accordance with IMTS techniques in placing and receiving calls.

A. Mobile Unit Input/Output Panel

One embodiment of the mobile unit input/output panel 302 of FIG. 16 is illustrated pictorially in FIG. 18. Referring now to FIG. 18, the input/output panel 302 provides various controls and indications as was previously described in connection with FIG. 16. The address display 303 may be any suitable multiple digit display unit for displaying the subscriber addresses or telephone numbers. The mobile unit on/off switch 304 may be a three-position switch having an off position, a standby position and an on position so that the mobile unit may be de-energized (off), fully energized (on), or placed in a receive only mode (standby).

The address storage module 305 may comprise any suitable memory or storage unit for storing frequently called addresses or telephone numbers. The desired stored addressmay be entered into the address register 316 of FIG. 16 from the address storage module 305 by depressing the appropriate memory storage access switch 342 illustrated in FIG. 18.

The keyset or keyboard 306 may comprise any suitable conventional push-button or rotary dial telephone keyboard such as a Touch Tone pad. The additional keys ZC and TS may be provided to generate the zone change or ZC signal test TS signal previously described in connection with FIG. 16. In additon to or in lieu of the address storage module 305, thekeyset 306 may include an access code key MTC through which frequently called numbers stored by the control logic circuit 314 of FIG. 16 may be accessed. For example, two of the numberical keys may be depressed followed by the depression of the MTC key. When the mobile unit operator initiates a call the code entered into the address register in this manner may be utilized by the control logic circuit 314 of FIG. 16 to locate a stored address and assemble a call-up message containing the entire stored address as was previously described.

The control and indicator panel 308 may include a horn switch 344, a channel lock indicator 346, a call in progress or CPI indicator 348, a transmitter on or TXON indicator 350, an address clear switch 352 and a call switch 354. The horn switch may be depresssed by the mobile unit operator when the operator is leaving the vehicle so that a horn or other auxiliary device may alert the operator as to the receipt of incoming calls. The channel lock indicator 346 provides an indication of control channel lock-on, and the call in progress and transmitter on indicators 348 and 350 may indicate that a call has been received but has not been answered and that the transmitter 322 is energized, respectively. The address clear switch 352 may be depressed to clear the last address entered into the address register 316 of FIG. 16 and the call switch 354 may be depressed to effect the transmission of a call-up message from the mobile unit to the address stored in the address register 316 of FIG. 16.

The speaker 310 may provide audible monitoring of supervisory signal tones during a call-up and may act as a ringer to alert the mobile unit operator of an incoming call. The audible indication may be provided through the handset 312 when the handset 312 is removed from the hook switch (not shown) through the opening of the switch 340 of FIG. 16. Alternatively, audible indications and voice communications may be received over both the speaker 310 and the handset 312.

In placing a call through the mobile unit control head 300, the mobile unit operator may depress any desired one of the switches 342 on the address storage module 305 or may enter the desired address through the keyboard 306. The entered address is stored in the address register 316 and also displayed on the address display 303. If the displayed address is correct the mobile unit operator may depress the call switch 354 to initiate the call-up procedure previously described. If the displayed address is erroneous, the address clear switch 352 may be depressed and the address reentered.

In receiving a call, the mobile unit operator may be alerted through the speaker 310 or, if the horn switch 344 is depressed, throough an auxiliary signaling device such as the vehicle horn. The mobile unit operator lifts the handset 312 and the call may be completed as was previously described. A call acknowledge or call annunciator indicator 356 may be provided to indicate to the mobile unit operator that the mobile unit has tuned to the assigned channel and has acknowledged the call-up message and channel assignment message.

B. Control Logic Circuit

One embodiment of a logic circuit for performing the previously described functions of the control logic circuit 314 of FIG. 16 is functionally illustrated in FIG. 19 to facilitate an understanding of the invention.

Referring now to FIG. 19, the ON/OFF signal from the mobile unit on/off switch 304 of FIG. 16 may be applied to a transmitter on/off logic circuit 360. An in service or INSV output signal from the transmitter on/off logic circuit 360 may be applied to one input terminal of a two input terminal AND gate 362 and the output signal from the AND gate 362 may be applied to the clock input terminal of an in service message register 364. The output signal from the in service message register 364 may be provided as the XDTA signal for application to the FSK encoder and select circuit 320 of FIG. 16. The transmitter on/off logic circuit 360 may also provide the transmitter enable TENBL signal for application to the transmitter 322 of FIG. 16.

The SYNC signal and the RDTA signal from the FSK decoder and sync detector 338 of FIG. 16 may be applied to a message resister and decoder 366 hereinafter described in greater detail. The channel lock signal CHLK from the control signal detector 332 of FIG. 16 may be applied to the message register and decoder 366 and to the transmitter on/off logic circuit 362.

The message register and decoder 366 may provide various decoded control signals in response to the input signals thereto. An ASSIGN signal from the message register and decoder 366 may be applied to one input terminal of a three input terminal AND gate 368, to a call placement logic circuit 370, to the reset input terminal R of a flip-flop 372, to one input terminal of a two input terminal AND gate 374 and to one input terminal of a three input terminal AND gate 376. The output signal from the AND gate 368 may be applied to the clock input terminal of a channel assignment acknowledge message register 378, the output signal from which may be provided as the XDTA signal. The output signal from the AND gate 374 may be applied to the start input terminal ST of a suitable conventional timer 380 and the ring or RNG output signal from the timer 380 may be applied to one input terminal of a four input terminal AND gate 382 and may be provided as one of the tone select or TSEL signals.

The output signal from the AND gate 382 may be applied to one input terminal of a two input terminal OR gate 384 and the output signal from the AND gate 376 may be applied to the other input terminal of the OR gate 384. The output signal from the OR gate 384 may be applied to a go ahead message register 386, the output signal from which may be provided as the XDTA signal.

The message register and decoder 366 may supply a frequency control signal FRC for application to the frequency module 334 of FIG. 16 and may also supply a threshold level signal TLVL for application to the control signal detector 332 of FIG. 16. A decoded call-up message may result in the generation of a CALL-UP signal by the message register and decoder 366. The CALL-Up signal may be applied to one input terminal of a two input terminal AND gate 388 and to the control and indicator panel 308 of FIG. 16 as the call-in-progress or CPI signal. The output signal from the AND gate 388 may be applied to the clock input terminal of a call-up acknowledge message register 390 and the output signal from the register 390 may be provided as the XDTA signal.

A call failure message decoded by the message register and decoder 366 may result in the application of a FAIL signal to one input terminal of a two input terminal OR gate 392 and to the reset terminal R of the timer 380. A call terminate message decoded by the message register and decoder 366 may result in the application of a TERM signal to the transmitter on/off logic circuit 360 and to the set input terminal of the flip-flop 372. The message register and decoder 366 may also provide a search inhibit or SINH signal for application to the call placement logic circuit 370 and to one input terminal of a three input terminal AND gate 396.

A call failure tone or CFTN signal from the OR gate 392 may be provided as one of the tone select or TSEL signals and may be applied to the message register and decoder 366 and to the transmitter on/off logic circuit 360. The output signal from the false output terminal $\overline{Q}$ of the flip-flop 372 may be applied to one input terminal of a three input terminal AND gate 400 and the output signal from the AND gate 400 may be applied to a terminate message register 401, the output signal from which may be provided as the XDTA signal.

The call switch signal CSW from the control and indicator panel 308 of FIG. 16 may be applied to the call placement logic circuit 370 and to the transmitter on/off logic circuit 360. The hook switch signal HKSW from the control and indicator panel 308 of FIG. 16 may be applied to one input terminal of the three input terminal AND gate 382, to the trigger input terminal T of a monostable multivibrator 403 and to the tone generator 328 of FIG. 16 as the TSEL signal. The output signal from the true output terminal of the monostable multivibrator 403 may be provided as the on hook output signal OHK and may be applied to one input terminal of the AND gate 400, to the message register and decoder 366 and to the transmitter on/off logic circuit 360.

The test signal TS from the key set 306 of FIG. 16 may be applied to the transmitter on/off logic circuit 360 and to one input terminal of a two input terminal AND gate 402. The output signal from the AND gate 402 may be applied to the clock input terminal of a test message register 404, the output signal from which may be provided as the XDTA signal. The tuning complete or TCOMP signal from the frequency module 334 of FIG. 16 may be applied to one input terminal of each of the AND gates 376 and 382.

The call placement logic circuit 370 generates various gating and control signals primarily in response to the call switch signal CSW. An inhibit or INH signal from the call placement logic circuit 370 may be applied to one input terminal of the three input terminal AND gate 368 and to one input terminal of the AND gate 374. A gate enable signal GTEN from the call placement logic circuit 370 may be applied to the control input terminal of each of a plurality of gates 394 to gate the ADR signal from the address register 316 of FIG. 16 through the gates 394. A callup message enable CEN from the call placement logic circuit 370 may be applied to one input terminal of the AND gate 396 and a call placement failure signal CPF may be applied from the call placement logic circuit 370 to the message register and decoder 366 and to one input terminal of the OR gate 392.

The output signals from the gates 394 may be applied to the parallel data input terminals of a call-up message register 398 and the output signal from the AND gate 396 may be applied to the clock input terminal of the register 398. The output signal from the call-up message register 398 may be provided as the XDTA signal.

An audio enable signal AENBL generated by the call placement logic circuit 370 may be provided as an output signal from the control logic circuit 314 for application to the audio amplifier 330 of FIG. 16 and may be applied to a suitable encoder selector circuit 405. The zone change signal ZC from the key set 306 of FIG. 16 may be applied to the encoder selector circuit 405 and to one input terminal of a two input terminal AND gate 406. The output signal from the AND gate 406 may be applied to the clock input terminal of a zone change message registr 408, the output signal from which may be provided as the XDTA signal. The select signal SLCT from the encoder selector circuit 405 may be provided as an output signal from the control logic circuit 314 for application to the FSK encoder and select circuit 320 of FIG. 16.

The generation of timing signals for the control logic circuit 314 may be provided by a suitable clock generator 410. The clock generator 410 may generate a clock signal CLK and the CLK signal may be applied to one input terminal of each of the gates 362, 368, 388, 400, 402, 382, 376, 396 and 406.

In operation, the ON/OFF signal from the mobile unit of/off switch 304 of FIG. 16 energizes the mobile unit and enables the transmitter on/off logic circuit 362. As was previously described, the mobile unit is stepped through the various control channel frequencies until a control channel having a received signal level exceeding the threshold level TLVL is received. When a suitable control channel signal having both the desired received signal level and the desired encoding is received, the control channel lock-on signal CHLK causes the transmitter on/off logic circuit 360 to enable the AND gate 362 and clock the in service message of the register 364. The transmitter 322 of FIG. 16 is enabled by the TENBL signal from the transmitter on/off logic circuit 360 and the in service message is broadcast.

When a call is placed to the mobile unit, a call-up message is received as the RDTA signal. The message register and decoder 368 detects the call-up message and provides a call-in-progress signal CPI to the control and the indicator panel 308 of FIG. 16. The CALL-UP signal enables the AND gate 388 and the call-up acknowledge message is clocked out of the register 390 to the FSK encoder and select circuit 320 of FIG. 16 for broadcast to the base station.

As was previously described, the call-up message sets a timer and the mobile unit awaits receipt of a channel assignment message. When the channel assignment message is received by the control logic circuit 314 in the RDTA signal, the ASSIGN signal from the message register and decoder 366 causes the AND gate 368 to clock the channel assignment acknowledge message of the register 378 for broadcast by the transmitter 322 of FIG. 16. The ASSIGN signal also starts the timer 380 resulting in the generator of the ring signal RNG. The RNG signal from the timer 380 selects the ringing tone from the generator 328 of FIG. 16 for application to the speaker 310 as was previously described to alert the mobile unit operator that a call is being placed to his unit. The RNG signal also enables the AND gate 382 and when the mobile unit operator lifts the handset 312 of FIG. 16 from the hook switch, the hook switch signal HKSW provids an enabling signal to the AND gate 382. When the channel assignment message has tuned the RF transceiver and frequency control unit 301 of FIG. 16 to the appropriate channel, the tuning complete signal TCOMP enables the AND gate 382 and the clock signal CLK from the clock generator 410 clocks the go ahead message out of the message register 386 for broadcast by the transmitter 322.

If the handset 312 of FIG. 16 is returned to the hook switch at the completion of a call and prior to the receipt of a call terminate message from the base station, the hook switch signal HKSW triggers the multivibrator 403 resulting in the generation of the on hook or OHK signal. The OHK signal clocks the terminate message out of the register 401 for broadcast by the transmitter 322, effects the deenrgization of the transmitter 322 by the transmitter on/off logic circut 360 and enables the mobile unit to return to the control signal channel.

In placing a call fromthe mobile unit, the mobile unit operator enters an address into the address register 316 of FIG. 16 and depresses the call switch on the control and indicator panel 308. The call switch signal CSW results in the generation of the gate enable signal GTEN enabling the gates 394 and thus loading the address signal ADR into the call-up register 398. Shortly thereafter, the CEN signal from the call placement logic circuit 370 enables the ANd gate 396 resulting in the broadcast of the call-up message from the register 398 by the transmitter 322 of FIG. 16.

The call-up message may be repetitively broadcast by the mobile unit three times unless a channel assignment message is received and decoded as the ASSIGN signal. If, after the third broadcast of the call-up message the ASSIGN signal has not been generated, the call placement failure signal CPF causes the mobile unit to continue to monitor the designated control channel and sounds a call failure tone through application of the CFTN signal to the tone generator 328 of FIG. 16. If the channel assignment message is received and decoded by the message register and decoder 366 after broadcasting the call-up message, the RF transceiver and frequency control unit 301 is tuned to the appropriate frequency of the assigned channel by the FRC signal and the AND gate 376 is enabled when the TCOMP signal indicates that the tuning is complete. The clock signal CLK clocks the go ahead message out of the register 386 through the enabled AND gate 376 and the OR gate 384 and the go ahead message is broadcast by the transmitter 322. The mobile unit thereafter receives a ring back signal which is applied through the enabled audio amplifier 330 to the speaker 310 or the handset 312, depending upon the position of the handset 312.

The ring back signal indicates to the mobile unit operator that the call has been placed and that the telephone of the called party is ringing. When the called party answers the call, the initial response will be heard over speaker 310 and the handset 312 may be removed from the hook switch if this has not already been accomplished. When the call is complete, a terminate message is transmitted to the mobile unit if the called party hangs up before the mobile unit operator hangs up. The TERM signal inhibits the AND gate 400 so that the terminate message from the register 401 cannot be transmitted to the base station when the mobile unit operator hangs up. In addition, the TERM signal may reset the transmitter on/off logic circuit 360 to deenergize the mobile unit transmitter 322.

If the mobile unit operator places the handset 312 on the hook switch before a terminate message initiated by the called party is received from the base station, the on hook signal OHK enables the AND gate 400 resulting in the broadcast of the terminate message from the register 401 from the transmitter 322.

When the mobile unit 58 is not engaged in a call, the mobile unit operator may initiate the broadcast of a test message to determine the operability of the mobile unit 58. The mobile unit operator may depress the test key on the keyset 306 of FIG. 16 to generate the TS signal and the TS signal may effect the energization of the transmitter 322 and the broadcase of a test message from the register 404. Moreover, during a conversation between the mobile unit operator and either another mobile unit or a fixed telephone, the operator may determine that the assigned channel is unacceptable for conversation. The operator may depress the zone change request key ZC on the keyset 306 to generate the zone change signal ZC. The zone change signal ZC may generate an appropriate select signal SLCT to select the XDTA signal for broadcast by the transmitter 322 and may clock appropriate zone change message out of the register 408 to the transmitter 322. The zone change message may be transmitted over the assigned talking channel and, when received by the central control terminal, may initiate a vote of adjacent zones to determine which zone should serve the call.

Although not illustrated in FIG. 19, the broadcast of a test message by the mobile unit 58 may be initiated by the central control terminal and broadcast to the mobile unit 58 as the RDTA signal. The message register and decoder 366 may decode the received test message and clock the test message out of the register 404 for broadcast by the transmitter 322. The initiation of the broadcast of the test message by the central control terminal in this manner may be utilized for diagnostic purposes or may be utilized as was previously described for voting and adjacent zones when a zone change is deemed necessary.

Moreover, the zone change signal ZC may be generated automatically by the mobile unit 58 in response to a drop in received signal level RLVL below a predetermined threshold as is generally indicated in phantom in FIG. 16. The controlsignal detector 332 of FIG. 16 may monitor the RLVL signal after a talking channel has been assigned in response to the ASSIGN signal from the control logic circuit 314. If the RLVL signal received over the talking channel drops below a prredetermined threshold, the control signal detector 332 may initiate the zone change request by generating the zone change signal ZC. With this arrangement, the continuous monitoring of the established call is not required at the base station in order to initiate a vote of adjacent zones.

C. Message Register and Decoder

One embodiment of a logic circuit for performing the previously described functions of the message registeer and decoder 366 of FIG. 19 is illustrated in detail in FIG. 20 to facilitate an understanding of the invention.

Referring now to FIG. 20, the SYNC and RDTA signals from the FSK decoder and sync detector 338 of FIG. 16 may be applied to the respective input terminals of a two input terminal AND gate 412 and the output signal from the AND gate 412 may be applied to the data input terminal of a received message register 414. The output signals from predetermined stages of the message register 414 may be applied, respectively, to a plurality of gates 416, an address comparator 418, and a plurality of gates 420. An enable output signal ENBL from the address comparator 418 may be applied to the control input terminals of the gates 416 to apply the signals from the message register 414 to a suitable conventional message decoder 422.

The message decoder 422 may decode the received call failure, call-up, channel assignment, and terminate messages, as well as a test message if desired, and generate the respective FAIL, CALL-UP, ASSIGN, TERM, and TS signals. The FAIL signal from the message decoder 422 may be applied to one input terminal of a five input terminal OR gate 424 and may be supplied as an output signal from the message register and decoder 366. The CALL-UP output signal from the message decoder 422 may be applied to the start input terminal ST of a suitable conventional timer 426 and may be supplied as an output signal from the message register and decoder 366. The ASSIGN signal from the message decoder 422 may be applied to the reset input terminal R of the timer 426, to the set input terminal S of a flip-flop 428, to the control input terminals of the gates 420 and may be supplied as an output signal from the message register and decoder 366. The TERM signal from the message decoder 422 may be applied to another input terminal of the OR gate 424, to one input terminal of a three input terminal OR gate 430 and may be supplied as an output signal from the message register and decoder 366. The TS signal from the message decoder 422 may be applied to the AND gate 402 of FIG. 19 as was previously described.

The increment or INCR signal from the OR gate 424 may be applied to a transmitter/receiver frequency control counter 432 and to an end-of-cycle detector 434. A frequecy assignment message stored by the message register 414 may be applied through the gates 420, when enabled by a ASSIGN signal, and a frequency control signal FRC indicative of the count in the counter 432 may be applied to the frequency control module 334 of FIG. 16 and to the end-of-cycle detector 434. The end-of-cycle signal END from the detector 434 may be applied to one input terminal of a two input terminal AND gate 436 and the output signal from the AND gate 436 may be provided as the TLVL signal from the message register and decoder 366 for application to the control signal detector 332 of FIG. 16.

The channel lock signal CHLK from the control signal detector 332 of FIG. 16 may be applied to a control signal loss detector 338 and the output signal from the control signal loss detector 338 may be applied to one input terminal of a two input terminal AND gate 340. The output signal from the AND gate 340 may be applied to one input terminal of the OR gate 424 and to the other input terminal of the AND gate 436.

The call placement failure signal CPF from the call placement logic circuit 370 of FIG. 19 may be applied to one input terminal of the OR gate 424 and the call failure tone signal CFTN from the OR gate 392 of FIG. 19 may be applied to one input terminal of the OR gate 430. The on hook signal OHK from the multivibrator 403 of FIG. 19 may be applied to the third input terminal of the OR gate 430 and the output signal from the OR gate 430 may be applied to the reset input terminal R of the flip-flop 428. The output signal from the false output terminal $\overline{Q}$ of the flip-flop 428, the search inhibit signal SINH, may be applied to the other input terminal of the AND gate 340 and may be provided as the SINH output signal from the message register and decoder 366.

In operation, the FSK decoder and sync detector 338 of FIG. 16 detects a SYNC signal preciding each message. The SYNC signal enables the AND gate 412 and the subsequent message RDTA is stored by the received message register 414.

The portion of the received message containing the mobile unit address is compared to an address assigned to the mobile unit by the address comparator 418 and the ENBL signal is generated in response to a favorable comparison. The gates 416 are enabled by the ENBL signal and the portion of the received message stored by the register 414 which contains the control message is applied to the message decoder 422 for decoding. If the message is decoded as a call failure message, the FAIL signal initiates a search of the control channels by the T/R frequency control counter 432 and effects the generation of a call failure tone as was previously described. If the message is a call-up message, the CALL-UP signal starts the timer 426 as well as performing othr functions previously described. If, after a time period determined by the timer 426 a channel assignment message has not been received and decoded as the ASSIGN signal, the search for a control channel is initiated by the timer 426 through the OR gate 424. If the channel assignment message is received, the ASSIGN signal resets the timer 426, sets the flip-flop 428 enables the gates 420 and performs the other functions previously described.

When the flip-flop 428 is set, the AND gate 340 is inhibited and the subsequent loss of the control signal when a transmitter and receiver are tuned to the assigned talking channel does not affect the operation of the mobile unit. Moreover, the search inhibit signal SINH inhibits the AND gate 396 of FIG. 19 to prevent further broadcast of the call-up message.

When the gates 420 are enabled by the ASSIGN signal, a digital signal representing the assigned talking channel is applied through the enable gates 420 to the T/R frequency control counter 432 to preset the counter 432 to the numerical code of the assigned talking channel. This numerical code may be applied to the frequency module 334 of FIG. 19 to tune the transmitter 322 and receiver 336 to the talking channel represented by the numerical code. Moreover, the FRC signal may be stored by the end-of-cycle detector 434 so that when scanning the control signal channels for a new channel at a later time, the end-of-cycle detector 434 contains an indication of the starting point from which the scan was initiated. If the mobile unit scans the entire group of predetermined control channels without achieving control channel lock-on, the TLVL signal may initiate a change in the threshold level with which the received signal level RLVL is compared in the control signalk detector 332 of FIG. 16 as will hereinafter be described in greater detail.

If a terminate message is decoded by the message decoder 422, the INCR signal is generated to initiate a search for a control channel and the flip-flop 428 is reset to enable the control signal loss detector 338. The TERM signal also performs various functions previously described in connection with FIGS. 16–19. The receipt of a test signal by the mobile unit may result in the generation of the TS signal by the message decoder 422 for use during the voting procedure as was previously described.

At any time after the channel assignment message has been decoded as the ASSIGN signal by the message decoder 422, the generation of a call failure tone signal SFTN or the on hook signal OHK will reset the flip-flop 428 through the OR gate 430. Thus, the generation of either of the aforementioned signals enables the AND gate 340 so that the control signal loss detector 338 is operable during the search for a control signal channel.

D. Transmitter On/Off Logic Circuit

One embodiment of a logic circuit for performing the previously described functions of teh transmitter on/off logic circuit 360 of FIG. 19 is illustrated in FIG. 21 to facilitate an understanding of the invention.

Referring now to FIG. 21, the call switch signal CSW and the test signal TS from the respective control and indicator panel 308 and keyset 306 of FIG. 16 may be applied to respective input terminals of a four input terminal OR gate 450. The test signal TS may also be inverted by an inverter 452 and applied to one input terminal of a five input terminal of a five input terminal OR gate 454. The CALL-UP signal from the message register and decoder 366 of FIGS. 19 and 20 may be applied to another input terminal of the OR gate 450 and the output signal from the OR gate 450 may be applied to the set input terminal S of a flip-flop 456. The output signal from the true output terminal Q of the flip-flop 456 may be provided as the transmitter enable signal TENBL from the transmitter on/off logic circuit 360.

The channel lock signal CHLK from the control signal detector 332 of FIG. 16 may be applied to one input terminal of a two input terminal AND gate 458 and the on/off signal from the mobile unit on/off switch 304 of FIG. 16 may be applied to the other input terminal of the AND gate 458. The output signal from the AND gate 458 may be applied to the trigger input terminal T of a monostable multivibrator 460 and the in service signal INSV from the true output terminal Q of the multivibrator 460 may be applied to an input terminal of the OR gate 450 and to the AND gate 362 of FIG. 19. The output signal from the false output terminal $\overline{Q}$ of the multivibrator 460 may be applied to an input terminal of the OR gate 454.

The call failure tone signal SFTN from the OR gate 392 of FIG. 19 may be applied to another input terminal of the OR gate 454 and the on hook signal OHK from the multivibrator 403 of FIG. 19 may applied to another input terminal of the OR gate 454. The terminal signal TERM from the message decoder 422 of FIG. 20 may be applied to the fifth input terminal of the OR gate 454. The output signal from the OR gate 454 may be applied to the reset input terminal R of the flip-flop 456.

In operation, any one of the call switch signal CSW, the test signal TS, or the call-up signal CALL-UP may set the flip-flop 456 to enable the transmitter 322 of FIG. 16. In addition, when a mobile unit is first turned on and is locked onto a control channel, the multivibrator 460 is triggered and the transmitter 322 is enabled for a predetermined period of time to transmit the in service message.

After the in service message has been transmitted by the transmitter 322, the monostable multivibrator 460 resets the flip-flop 456 and deenergizes the transmitter 322. Moreover, if any of the CFTN, OHK or TERM signals is generated, the flip-flop 456 is reset and the transmitter 322 is deenergized.

E. Call Placement Logic Circuit

One embodiment of a logic circuit for performing the previously described functions of the call placement logic circuit 370 of FIG. 19 is illustrated in FIG. 22 to facilitate an understanding of the invention.

Referring now to FIG. 22, the call switch signal CSW from the control and indicator panel 308 of FIG. 16 may be provided as the gate enable output signal GTEN of the call placement logic circuit and may be applied to the reset input terminal R of a flip-flop 464 and through a suitable delay circuit 466 to one input terminal of a three input terminal OR gate 468. The output signal from the OR gate 468 may be provided as the call enable or CEN output signalk from the call placement logic circuit 370 and may be applied through a suitable delay circuit 470 to the clock input terminal CL of a suitable counter 472. The decoded counts of 1 and 2 output signals from the counter 472 may be applied to the other two input terminals, respectively, of the OR gate 468. The count of 3 output signals from the counter 472 may be delayed through a suitable delay circuit 474 and applied to the reset input terminal R of the counter 472 and may be applied to one input terminal of a two input terminal AND gate 476. The output signal fromthe AND gate 476 may be provided as the call placement failure signal CPF from the call placement logic circuit 370.

The ASSIGN signal from the message register and decoder 366 of FIGS. 19 and 20 may be delayed through a suitable delay circuit 478 and applied tto one input terminal of a two input terminal OR gate 480. The output signal from the OR gate 480 may be applied to the set input terminal S of the flip-flop 464 and the inhibit output signal INH from the true output terminal Q of the flip-flop 464 may be provided as the INH output signal from the call placement logic circuit 370 and may be delayed through a suitable delay circuit 482 and applied to the set input terminal S of a flip-flop 484. The output signal from the true output terminal of the flip-flop 484 may be provided as the audio enable or AENBL signal fromthe call placement logic circuit 370. The scan inhibit signal SINH from the message register and decoder 366 of FIGS. 19 and 20 may be applied to the other input terminal of the AND gate 476, to the other input terminal of the OR gate 480 and to the reset input terminal R of the flip-flop 484.

In operation, the operator may depress the call switch on the control and indicator panel 308 to generate the call switch signal CSW when a call is to be placed from the mobile unit. The call switch signal may immediately enable the gates 394 of the control logic circuit 314 of FIG. 19 as the GTEN signal, may reset the flip-flop 464 to generate a low level inhibit signal INH inhibiting the AND gates 368 and 374 of FIG. 19. The call witch signal CSW is also delayed and applied through the OR gate 468 to effect the broadcast of a call-up message through the enabling of the AND gate 396 of FIG. 19 by the CEN signal. The delay circuit 466 ensures that the called address ADR is loaded into the call-up message register 398 of FIG. 19 by the GTEN signal prior to clocking the call-up message register 398.

After the call-up message has been broadcast in response to the CEN signal, the mobile unit awaits receipt of a channel assignment message. If, after a period of time determined by the delay circuit 470, the ASSIGN signal has not been generated in response to receipt of a channel assignment message, the counter 472 is clocked to a count of 1 and the call-up message is again broadcast. The repetitive broadcast of the call-up message may continue until the counter 472 reaches a predetermined count, e.g., the count of 3, at which time the call placement failure signal CPF may be generated if a channel assignment message still has not been received. If, however, the channel assignment message is received before the counter 472 reaches a count of 3, the AND gate 476 is inhibited by the SINH signal, the flip-flop 464 is set shortly thereafter, and the flip-flop 484 is also shortly thereafter reset to enable the audio amplifier 330 of FIG. 16. In this manner, placement of a call from the mobile unit 58 may be initiated by the mobile unit operator by merely depressing the call switch. The call placement logic circuit 370 thereafter generates the appropriate signals in an appropriate time relationship to broadcast and receive the various messages involved in placing a call.

F. Random Call Placement Time Delay Circuit

In accordance with the preferred embodiment of the present invention, a single control and signaling channel serves all mobile units having access to the system through each base station 54 in each of the zones 60. If two mobile units simultaneously attempt to access the same control signal channel, the call-up message may be garbled and may not be properly detected by the CPU 108 at the central control terminal 50 of FIG. 10. In accordance with the present invention, each mobile unit may be provided with a random call placement time delay circuit so that the control signal channel is not repeatedly accessed simultaneously by more than one mobile unit. If signaling collision does occur on the control signal channel on the first attempt to place a call, the ramdom call placement time delay circuit ensures that a signaling collision does not occur on the second attempt.

Since the preferred signaling format employed in conjunction with the present invention is digital, a digital random call placement time delay circuit which may be employed to avoid signaling collision is illustrated in FIG. 23 and described hereinafter. Referring now to FIG. 23, the call-up enable signal CEN from the call placement logic circuit 370 of FIGS. 19 and 22 may be applied to the set input terminal S of a flip-flop 490 and to one input terminal of a two input terminal AND gate 492. The output signal from a conventional random number generator 494 may be applied to the other input terminal of the AND gate 492 and the output signal from the AND gate 492 may be applied to the load input terminal L of a suitable conventional counter 496.

The zero output signal from the counter 496, e.g., a binary one output signal when the count inthe counter 496 is zero, may be provided as the random call enable signal RCEN for application to the AND gate 396 of FIG. 19 which controls the broadcast of the call-up message. The RCEN signal may also be applied to the reset input terminal of the flip-flop 490 and the output signal from the true output terminal Q of the flip-flop 490 may be applied to one input terminal of a two input terminal AND gate 498. A suitable clock signal CLK from a conventional clock generator 500 may be applied to the other input terminal of the AND gate 498 and the output signal from the AND gate 498 may be applied to the clock input terminal CL of the counter 496.

In operation, the call enable signal CEN generated by the mobile unit operator when the call switch on the control and indicator panel 308 of FIG. 16 is depressed, loads a random number from the random number generator 494 into the counter 496 through the enabling of the AND gate 492. The CEN signal also sets the flip-flop 490 enabling the AND gate 498. Thereafter, the clock signal CLK clocks the counter 496 down from the loaded random number until the counter reaches a count of zero. When the counter 496 reaches a count of zero, the RCEN signal enables the AND gate 396 of the control logic circuit 314 of FIG. 19 to effect broadcast of the call-up message and resets the flip-flop 400 thereby resetting the random call placement time delay circuit.

Since, as was previously described in connection with FIG. 2, the call enable signal CEN is repetitively generated, the first CEN signal applied to the random call placement time delay circuit of FIG. 23 may result in the generation of the ramdom call enable signal RCEN simultaneously with the generation thereof by another mobile unit. If a signaling collision results, the central control terminal will not return a channel assignment message and the CEN signal will again be applied to the random call placement time delay circuit of each mobile unit. On the second attempt to place the call, there is very little probability that the same delay will result in both mobile units and on the third attempt the probability is near zero. Thus, one of the mobile units will seize the control signal channel and the central control terminal 50 of FIG. 10 will place a busy status indicator on the control channel. The busy/idle status indicator on the control signal channel may be decoded as the B/I signal and gated with the CEN signal as generally indicated in phantom at 502 in FIG. 23 to prevent further call placement attempts by the mobile unit operator. Moreover, it will be apparent to one skilled in the art tht the initial call-up signal may be initiated without delay and if no response is received from the base station (as would occur when two or more signals collided and garbled each other) the random time delay may thereafter be invoked for subsequent call attempts. In addition, if the mobile unit operator attempts to place a call when the control signal channel is busy, the CEN signal may be stored and when the status signal reverts to the idle condition, the stored CEN signal may be applied through the random call placement time delay circuit in all mobile units which are still waiting to place a call. Again, the first mobile unit to successfully seize the control signal channel will be selected at random by the random call placement time delay circuit and the remaining mobile units will wait until the idle status indicator is received over the control signal channel.

As an alternative to delaying the call enable signal CEN itself, the detected transition from the busy condition to the idle condition on the control signal channel over the failure to receive a channel assignment message from the base station on the control signal channel may initiate the operation of the random call placement time delay circuit. The output signal from the random call placement time delay circuit of FIG. 23 may, under these conditions, be utilized to trigger the call-up initiation sequence after the random time delay. In any event, the use of the random call placement time delay circuit ensures that each mobile unit has an equal opportunity (over a number of trails) to become the first mobile unit to transmit a call-up signal and thus seize the control signal channel. Thus, no mobile unit is penalized by having a longer time delay on every attempt than other mobile units operating in the system.

G. Control Signal Selector

In the foregoing discussions of control signal monitoring by the mobile units, it was assumed that the control signal detector 332 of FIG. 16 may select any control signal channel having a received level RLVL above a fixed threshold level TLVL, as well as a proper code. In FIG. 24, there is illustrated a control signal selector which may be utilized in a multiple zone system such as that of the present invention for selecting the control signal having the proper ID code and having the highest signal level of those control signals received.

Referring now to FIG. 24, the search inhibit signal SINH from the message register and decoder 366 of FIGS 19 and 20 may be applied to one input terminal of a two input terminal AND gate 504 and the output signal from the AND gate 504 may be applied to an enable input terminal of a conventional sample and hold circuit 506. The received signal from the receiver 336 of FIG. 16 may be applied to a suitable control signal code detector 508 and the detected ID code or DID may be applied from the control signal code detector 508 to the other input terminal of the AND gate 504. The received signal level or RLVL signal from the receiver 336 of FIG. 16 may be applied to the sample input terminal of the sample and hold circuit 506 and the output signal from the sample and hold circuit 506 may be applied to a conventional A/D conveter 510. The digital output signal representing the value of the RLVL signal may bsignal may be applied from the A/D converter 510 to one input terminal of a conventional comparator 512 and toi a plurality of AND gates 514. The output signal from the AND gates 514 may be applied to a digitallevel register 516 and the digital TLVL signal from the register 516 may be applied to another input terminal of the comparator 512. The threshold level signal TLVL from the message register and decoder 366 of FIGS. 19 and 20 may be applied to a threshold level selector 518 and the output signal from the threshold level selector 518 may be applied to the digital level register 516.

A suitable sequence timer 510 may apply timing signals T1, T2 and T3 to the sample and hold circuit 506, the A/D converter 510 and the comparator 512, respectively. The RLVL ≤ TLVL signal from the comparator 512 may be applied to one input terminal of the OR gate 424 in the message register and decoder 366 of FIG. 20, only a portion of which is illustrated in FIG. 24. The RLVL > TLVL signal from the comparator 512 may be applied to the control input terminals of the AND gates 514, to another input terminal of the OR gate 424, to the control input terminals of a plurality of AND gates 522 in the message register and decoder 366 and to the set input terminal S of a flip-flop 524 in the message register and decoder 366. The output signal from the OR gate 424 may be applied to the T/R frequency control counter 432 and to the end-of-cycle detector 434 as was previously described. The output signal from the T/R frequency control counter 432 may be applied to the end-of-cycle detector 434 as was previously described and may also be applied to the AND gates 522 and to one input terminal of a three input terminal AND gate 526. The output signal from the AND gate 526 may be supplied as the frequency control signal FRC from the message register and decoder 366 for application to the frequency module 334 of FIG. 16.

The output signal from the AND gates 522 may be applied to a channel-number register 528 for temporary storage thereof and the output signal from the channel number register 528 may be applied to a plurality of AND gates 530. The output signals from the AND gates 530 may be applied through a plurality of OR gates 532 to a parallel load input terminal of the T/R frequency control counter 432 and the output signal from the AND gates 420 previously described may be applied through the OR gates 532 to the counter 432. The END signal from the end-of-cycle detector 434 may be applied to the control input terminal of the AND gates 530 and may be delayed through a suitable delay circuit 534 and applied to another input terminal of the AND gate 526, to one input terminal of a two input terminal AND gate 536 and to one input terminal of a two input terminal AND gate 538. The delayed END signal from the delay circuit 534 may also be further delayed by a delay circuit 540 and applied to the reset input terminal R of the flip-flop 524.

The output signal from the true output terminal Q of the flip-flop 524 may be applied to the other input terminals of the AND gates 526 and 536. The output signal from the false output terminal $\overline{Q}$ of the flip-flop 524 may be applied to the other input terminal of the AND gate 538 and the output signals from the AND gates 536 and 538 may be applied, respectively, to the set and reset input terminals of a flip-flop 542. The output signal from the true output terminal Q of the flip-flop 542 may be provided as the channel lock signal CHLK previously described as being provided by the control signal detectro 332.

In operation, when the search for a control channel is not inhibited by the SINH signal and the received control signal contains the proper ID information, the sample and hold circuit 506 is enabled by the SENB signal from the AND gate 504. The sequence timer 520 triggers the sample and hold circuit 506 and the level of the received control signal is sampled and held. The sequence timer then enables the A/D converter 510 and the digital RLVL signal is applied to the comparator 512.

The threshold level signal TLVL from the message register and decoder 366 selects an initially high threshold level for application from the threshold level selector 518 to the digital level register 516. The digital threshold level TLVL is applied to the comparator 512 and the sequence timer 520 enables the comparator 512 to compare the digital RLVL and TLVL signals.

If the RLVL signal is less than or equal to the TLVL signal in amplitude, the T/R frequency control counter 432 is incremented and a new control channel is monitored. If the RLVL signal is greater than the TLVL signal in amplitude, the RLVL signal is gated into the digital level register 516 and replaces the previous TLVL signal as the new threshold standard. The AND gates 522 are also enabled and the number of the channel to which the mobile unit is tuned is stored in the channel number register 528 and the flip-flop 524 is set enabling the AND gate 536 and inhibiting the AND gate 538.

The T/R frequency control counter 432 is then incremented and a new control channel is monitored. The control signal level received for the new control channel is compared by the comparator 512 with the TLVL signal which may now be a slightly higher threshold if a favorable comparison was previously detected. If any other control signal channel having a higher level than the TLVL signal is monitored, the number of the new control channel is stored by the channel number register 528 and the received signal level RLVL become the new threshold level.

At the end of the cycle, i.e., after the T/R frequency control counter 432 has been incremented through all of the control channell assigned to the system, the number in the channel number register 528 is gated through the AND gates 530 into the frequency control counter 432. If at least one signal of sufficient signal strength has been monitored, the flip-flop 524 is set and the number now stored in the frequency control counter 432 is gated through the AND gate 526 as the FRC signal. In addition, the flip-flop 542 is set and the channel lock signal CHLK assumes a high signal level indicating that channel lock-on has been achieved. The control signal selector comprising the control signal detector 332 and a portion of the message register and decoder 366 thereafter continues to scan control signal channels to ensure that the mobile unit remains locked onto the best signal channel.

If, at the end of a cycle, the flip-flop 524 is not set, the flip-flop 542 is reset and the channel lock signal CHLK indicates a loss, or at least a failure to lock onto, a control signal channel throughout one entire scan cycle. The control signal loss detector 438, the AND gate 440 and the AND gate 436 may generate TLVL signal as was previously described in connection with FIG. 20 to effect the selection of a slightly lower threshold level by the threshold level selector 518 of the control signal detector 332 of FIG. 24. On the next scan of all of the control channels, the initial threshold level entered into the digital level register 516 may thus be slightly lower than the initial threshold level on the previous scan. This lowering of the threshold level may continue either a predtermined number of times or indefinitely until the best available control signal is finally monitored.

H. RF Transceiver and Frequency Control Unit

The RF transceiver and frequency control unit 301 of the mobile unit 58 of FIG. 16 may include any suitable conventional transmitter, receiver, frequency control module, duplexer and antenna. The frequency control module 334 may be, for example, any suitable frequency controller such as that illustrated and previously described in connection with FIG. 15 or a suitable frequency synthesizer.

For example, FIG. 25 illustrates one embodiment of the RF transceiver and frequency control unit 301 of FIG. 16 employing a frequency synthesizer for control of transmitter and receiver frequency. Referring now to FIG. 25, the frequency control signal FRC from the supervisory control sequencer 300 may be applied to a conventional variable digital divider 553 throuogh a suitable logic interface circuit 562. The output signal from the variable digital divider 550 may be applied to a suitable conventional phase detector 554 and the output signal from the phase detector 554 may be filtered by a suitable filter 556 and applied to the control input terminal of a voltage controlled oscillator 558. The output signal from the voltage controlled oscillator 558 may be applied through a conventional mixer 560 to an input terminal of the variable digital divider 550, to a mixer 562 and to a phase detector 564.

The output signal from the phase detector 564 may be filtered by a filter 566 and applied to a suitable in phase detector 568 and to a voltage controlled oscillator 570. The output signal from the in phase detector 568 may be provided as the tuning complete or TCOMP output signal from the frequency module 334 and may be applied to the supervisory control sequencer 300. The output signal from the voltage controlled oscillator 570 may be applied to a second input terminal of the phase detector 564 and to a mixer 572.

A suitable reference frequency generator 574 may provide reference frequencies $F_1$, $F_2$ and $F_3$ for use in synthesizing the desired transmitter and receiver frequencies in conjunction with the voltage controlled oscillators 558 and 570. The reference frequency $F_1$ from the reference frequency generator 574 may be applied to the second input terminal of the phase detector 554 and the reference frequency $F_2$ may be applied to a second input terminal of the mixer 562. The reference frequency $F_3$ may be applied to a second input terminal of the mixer 572.

The output signal from the mixer 562 may be amplified and filtered by a suitable amplifier and filter 576 and applied to a suitable stage of the receiver 336 as the receiver frequency control signal RFC. For example, the RFC signal may be applied to the first RF amplifier and mixer stage of the receiver 336 if a receiver such as that illustrated is employed. Since receivers of the type illustrated in FIG. 25 are conventional, the receiver 336 will not be described in detail.

The output signal from the mixer 572 may be amplified and filtered by a suitable amplifier and filter 578 and applied to the transmitter 322 as the transmitter frequency control signal TFC. For example, the TFC signal may be applied to a driver amplifier if a transmitter of the type illustrated is employed. Since the transmitter 322 is entirely conventional, it will not be discussed hereinafter in detail.

The output signal RCVS from the receiver 336 may be applied to the supervisory control sequencer 300 for use therein as was previously described. A separate signal RLVL (FIG. 16) may be provided from an appropriate stage of the receiver 336 to provide an indication of received signal level. However, the RCVS signal may be utilized for this purpose.

The data signal to be transmitted by the transmitter 322, i.e., the TXM signal, may be applied from the supervisory control sequencer 300 to the transmitter 322 and the transmitter enable signal TENBL may be applied from the supervisory control sequencer 300 to an appropriate stage of the transmitter 322. The TENBL signal may be utilized to control the energization and deenergization of the transmitter 322 in any suitable manner.

In operation, the frequency module 334 of FIG. 25 synthesizes two frequencies TFC and RFC which are offset by a predetermined difference frequency, i.e., the frequency offset between the up-link and the down-link of the selected channel. The frequency control signal FRC selects the frequency at which the VCOs 558 and 570 oscillate and the combined output signals from the mixers 562 and 572 thus contain the selected transmitter and receiver frequencies for the selected channel. The receiver 336 may be energized at all times when the mobile unit is energized and the transmitter 322 may be selectively energized as was previously described by the TENBL signal. The carrier frequency of the signal transmitted by the transmitter 322 may be determined by the TFC signal and the TXM signal may modulate the carrier in any suitable manner. Similarly, the RFC signal applied to the receiver 336 may select the desired one of the received signals for amplification and demodulation by the receiver in any suitable manner.

The present invention may by embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for establishing telephone communications between a fixed station and a mobile unit within a service area comprising the steps of:

a. establishing a plurality of overlapping zones which together define a service area, each of said zones including a fixed station serving that zone;

b. assigning a plurality of communication channels to each of the fixed stations serving the zones, the plurality of channels assigned to fixed stations serving adjacent zones being noninterfering and at least some of the plurality of channels being assigned to more than one fixed station;

c. initially monitoring, at the mobile unit, a predetermined one of the plurality of channels assigned to a first fixed station serving a first zone from which the mobile unit receives a signal having a received level above a predetermined value;

d. determining that the monitored one of the plurality of channels has been assigned for two-way communications; and e. monitoring in response to the determination a predetermined one of the plurality of channels assigned to a second fixed station serving a zone other than the first zone served by the fixed station so that a call can be established between the second fixed station and the mobile unit.

2. The method of claim 1 wherein the service area is defined by a repeating pattern of seven overlapping zones, the same plurality of communication channels being assigned to the fixed stations serving corresponding zones in repeating pattern.

3. The method of claim 1 wherein the service area is defined by a repeating pattern of nineteen zones, the same plurality of communication channels being assigned to the fixed stations serving corresponding zones in repeating pattern.

4. The method of claim 3 wherein the zones overlap by an amount sufficient to permit the monitoring at any location in one zone of at least one of the plurality of the communication channels assigned to each of two different fixed stations.

5. The method of claim 1 including the steps of:

transmitting a call-up signal between a fixed station and the mobile unit over the monitored one of the plurality of communication channels; and, assigning, over the monitored one of the plurality of channels, an available one of the remaining plurality of channels assigned to the fixed station for two-way radio communication thereover between the fixed station and the mobile unit in response to the call-up signal.

6. The method of claim 5 including the steps of:

determining that none of the remaining plurality of channels assigned to the fixed station is available; and, assigning over the monitored one of the plurality of channels, an available one of the plurality of channels assigned to a fixing station serving an adjacent zone for two-way radio communication thereover between the fixed station serving the adjacent zone and the mobile unit.

7. The method of claim 5 including the steps of:

determining that none of the remaining plurality of channels assigned to the fixed station is available;

assigning another communication channel to the fixed station; and, assigning, over the monitored one of the plurality of channels, said another communication channel for two-way communication thereover between the fixed station and the mobile unit.

8. The method of claim 5 including the steps of:

assigning the monitored one of the plurality of communication channels for two-way radio communication between the fixed station and the mobile unit when none of the remaining plurality of channels is available.

9. A method for assigning a plurality of dual frequency communication channels to users in a mobile ratio telephone system comprising the steps of:

a. transmitting a call request between a fixed station and a mobile unit over a predetermined one of the plurality of channels;

b. assigning over the predetermined one of the plurality of channels an available one of the remaining plurality of channels for two-way radio communications thereover between the fixed station and the mobile unit; and, c. assigning the predetermined one of the plurality of channels for two-way radio communication between the fixed station and the mobile unit when none of the remaining plurality of channels is available.

10. A method for maintaining telephone communications between a fixed station and a mobile unit engaged in an established call over a radio communication channel in one of a plurality of overlapping zones as the mobile unit changes zones comprising the steps of:

a. monitoring the received signal level of the established call between a first fixed station and the mobile unit;

b. detecting a drop in the monitored received signal level below a predetermined threshold level;

c. generating a zone change request signal in response to the detected drop in received signal level, d. monitoring the signal level of transmissions from the mobile unit received at each of a plurality of fixed stations around the first fixed station in response to the zone change request signal; and, e. reestablishing the call between one of the plurality of monitoring fixed stations and the mobile unit in response to the monitoring of signal levels at the plurality of fixed stations.

11. The method of claim 10 wherein the received signal level of the established call between the first fixed station and the mobile unit is first monitored by monitoring, at the mobile unit, transmissions from the first fixed station.

12. The method of claim 11 wherein the drop in monitored received signal level is detected at the mobile unit by comparing the signal level of the transmissions received from the first fixed station with the predetermined threshold level.

13. The method of claim 12 wherein the zone change request signal is generated by the mobile unit in response to the signal level comparison and including the step of transmitting the zone change request signal to the fixed station over the radio communication channel serving the established call.

14. The method of claim 13 wherein the call is reestablished between the mobile unit and the one of the plurality of fixed stations over a communication channel differing from the communication channel serving the established call.

15. The method of claim 13 wherein the call is reestablished between the mobile unit and the one of the plurality of fixed stations over the same communication channel serving the established call.

16. The method of claim 10 including the steps of:

transmitting the zone change request signal to a central control terminal operatively connected to the first fixed station and each of the plurality of fixed stations;

transmitting a vote request signal to each of the plurality of fixed stations around the first fixed station in response to the transmitted zone change request signal;

receiving from each of the plurality of fixed stations a signal representative of monitored received signal level in response to the transmitted vote request signal;

comparing the signals representative of monitored received signal level; and, reestablishing the call between the mobile unit and the one of the plurality of fixed stations in response to the comparison.

17. The method of claim 16 wherein the received signal level of the established call between the first fixed station and the mobile unit is first monitored by monitoring, at the mobile unit, transmission from the first fixed station.

18. The method of claim 17 wherein the call is reestablished between the mobile unit and the one of the plurality of fixed stations over a communication channel differing from the communication channel serving the established call.

19. The method of claim 17 wherein the call is reestablished between the mobile unit and the one of the plurality of fixed stations over the same communication channel serving the established call.

20. The method of claim 10 wherein the call is reestablished by:

comparing the relative amplitudes of the received signal levels monitored at the plurality of fixed stations; and, reestablsihing the call between the mobile unit and the one of the fixed stations having an available communication channel and receiving the highest signal level.

21. The method of claim 10 wherein the call is reestablished by:

comparing the relative amplitudes of the received signal levels monitored at the plurality of fixed stations;

selecting the one of the fixed stations receiving the highest signal level for reestablishing the call;

determining that none of the plurality of communication channels assigned to the selected one of the fixed stations is available;

assigning another communication channel to the selected one of the fixed stations; and, reestablishing the call between the mobile unit and the selected one of the fixed stations over the assigned another communication channel.

22. the method of claim 10 wherein the call is reestablished by:

comparing the signal levels received at the plurality of fixed stations with a predetermined threshold level;

selecting the first one of the fixed stations having an available communication channel and receiving a signal level above the predetermined threshold for reestablishing the call; and reestablishing the call between the mobile unit and the selected first one of the fixed stations over the available channel.

23. A method for maintaining telephone communications between a fixed station and a mobile unit in a plural zone system as the mobile unit changes zones comprising the steps of:

a. establishing a plurality of overlapping zones which together define a service area, each of said zones including a fixed station;

b. assigning a plurality of communications channels to each of the zones, the plurality of channels assigned to adjacent zones being non-interfering;

c. establishing a call between a fixed station in a first zone and a mobile unit within a radio propagation contour defined by signal reception level around the fixed station in the first zone;

d. assigning the established call to an available one of the plurality of channels assigned to the first zone for two-way radio communication between the fixed station therein and the mobile unit;

e. monitoring the signal reception level of the radio signal from the mobile unit at the fixed station in the first zone as the mobile unit moves relative to the fixed station;

f. initiating a zone change request in response to a drop in the signal reception level below a predetermined threshold at the fixed station in the first zone without regard to the actual location of the mobile unit;

g. monitoring the signal reception level of the radio signal from the mobile unit at a plurality of fixed stations in a plurality of zones adjacent the first zone in response to the change request; and, h. reassigning the established call to an available one of the plurality of channels assigned to a selected one of the plurality of fixed stations in one of the zones adjacent to the first zone in response to the monitored signal reception levels without regard to the actual location of the mobile unit.

24. The method of claim 23 wherein the signal reception level is monitored at the fixed stations within all zones adjacent to the first zone.

25. The method of claim 24 wherein the selected one of the plurality of fixed stations is the one of the plurality of fixed stations having an available channel and having the highest relative monitored signal reception level.

26. A system for establishing telephone communications between a fixed station and a mobile unit within a service area comprising:

a fixed station serving each of a plurality of overlapping zones which together define a service area and each having a plurality of communication channels assigned thereto, the plurality of channels assigned to fixed stations serving adjacent zones being non-interfering and at least some of the plurality of channels being common to more than one of said fixed stations;

means at the mobile unit for initially monitoring a predetermined one of the plurality of channels assigned to a first one of said fixed stations from which the signal received has a signal level above a predetermined value;

means for determining that the monitored one of said plurality of channels has been assigned for two-way communications; and means responsive to said determining means for monitoring a predetermined one of the plurality of channels assigned to a second one of said fixed stations so that a call can be established between said second fixed station and the mobile unit.

27. The system of claim 26 wherein said fixed stations are a multiple of seven repeating overlapping zones; and, wherein the plurality of communication channels assigned to each of said fixed stations is common to the one of said fixed stations in corresponding zones in the repeating pattern of seven overlapping zones.

28. The system of claim 26 wherein the service area is defined by a repeating pattern of nineteen zones; and, wherein the plurality of communication channels assigned to one of said fixed stations is common to the one of said fixed stations located in the corresponding zone in the repeating pattern of nineteen zones.

29. The system of claim 28 wherein the overlap in each zone is sufficient to permit the monitoring at any location in each zone of at least one of the plurality of the communication channels assigned to each of two different ones of said fixed stations.

30. The system of claim 26 further comprising:

means for transmitting a call-up signal between each of said fixed stations and a mobile unit over the monitored one of the plurality of communication channels; and, means for assigning, over the monitored one of the plurality of channels, an available one of the remaining plurality of channels assigned to the fixed station called for two-way radio communication thereover between the called fixed station and the mobile unit.

31. A system of claim 30 further comprising:

means for determining that none of the remaining plurality of channels assigned to the called fixed station is available for the establishment of two-way radio communications; and, means for assigning, over the monitored one of the plurality of channels, an available one of the plurality of channels assigned to the adjacent one of said fixed stations for two-way radio communication thereover between said adjacent fixed station and the mobile unit.

32. The system of claim 30 including:

means for determining that none of the remaining plurality of channels assigned to the called one of said fixed stations is available;

means for assigning additional communication channels to each of said fixed stations; and means for assigning, over the monitored one of the plurality of channels, said another communication channel for two-way communication thereover between the called one of said fixed stations and the mobile unit.

33. The system of claim 30 including:

means for assigning the monitored one of the plurality of communication channels for two-way radio communication between the called one of said fixed stations and the mobile unit when none of the remaining plurality of channels is available.

34. A system for assigning a plurality of dual frequency communication channels to users in a mobile radiotelephone system comprising:

a fixed station, a mobile unit, means for transmitting a call request between said fixed station and said mobile unit over a predetermined one of a plurality of dual frequency communication channels;

means for assigning over said predetermined channel an available one of the remaining channels for two-way radio communication thereover between said fixed station and said mobile unit; and, means for assigning said predetermined channel for two-way radio communication between said fixed station and said mobile unit when none of the remaining channels is available for two-way radio communication.

35. A system for maintaining telephone communications between a fixed station and a mobile unit engaged in an established call over a radio communication channel in one of a plurality of overlapping zones as the mobile unit changes zones comprising:

a mobile unit;

a first fixed station;

a second fixed station;

means for monitoring the received signal level of the established call between said first fixed station and said mobile unit and for detecting a drop in the monitored received signal level below a predetermined threshold level;

means responsive to said monitoring means for generating a zone change request signal;

means at said second fixed station for monitoring the signal level of transmissions received from said mobile unit responsively to said zone change request signal; and, means for reestablishing the call between said second fixed station and said mobile unit responsively to said signal level monitoring means.

36. The system of claim 35 wherein said established call monitoring means includes means at said mobile unit for monitoring transmissions from said first fixed station.

37. The system of claim 36 wherein said established call monitoring means includes means for comparing the signal level of the transmissions received from said first fixed station with the predetermined threshold level.

38. The system of claim 37 wherein said zone change request signal generating means is responsive to said signal level comparing means and includes means for transmitting said zone change request signal to said second fixed station over the radio communication channel serving the established call and through said first fixed station.

39. The system of claim 38 wherein the channel over which the call is reestablished between said mobile unit and said second fixed station differs from the communication channel serving the established call.

40. The system of claim 38 wherein the channel over which the call is reestablished between said mobile unit and said second fixed station is the same communication channel as the channel serving the established call.

41. A system for maintaining telephone communications between a fixed station and a mobile unit in a plural zone system as the mobile unit changes zones comprising:

a plurality of fixed stations each located in one of a plurality of overlapping zones which together define a service area, each of said fixed stations including means for transmitting on a plurality of communications channels noninterfering with the plurality of channels of adjacent fixed stations;

a mobile unit;

means for establishing a call between one of said fixed stations in a first zone and said mobile unit within a radio propagation contour defined by signal reception level around said first zone fixed station;

means for assigning said established call to an available one of the plurality of channels of said first zone fixed station for two-way radio communication between said first zone fixed station and said mobile unit;

means for monitoring the signal reception level of the radio signal from said mobile unit at said first zone fixed station as said mobile unit moves relative to said first zone fixed station;

means for initiating a zone change request in response to a drop in the signal reception level below a predetermined threshold at the fixed station in the first zone without regard to the actual location of the mobile unit;

means for monitoring the signal reception level of the radio signal from the mobile unit at a plurality of fixed stations in a plurality of zones adjacent the first zone in response to the change request; and, means for reassigning the established call to an available one of the plurality of channels of a selected one of said plurality of fixed stations in adjacent zones in response to the monitored signal reception levels in said adjacent zones without regard to the actual location of the mobile unit.

* * * * *